US007299277B1

(12) United States Patent
Moran et al.

(10) Patent No.: US 7,299,277 B1
(45) Date of Patent: Nov. 20, 2007

(54) MEDIA MODULE APPARATUS AND METHOD FOR USE IN A NETWORK MONITORING ENVIRONMENT

(75) Inventors: Mike Moran, Sandwich, IL (US); Tauras Liubinskas, Aurura, IL (US); Jack Goral, Woodridge, IL (US)

(73) Assignee: Network General Technology, George Town, Grand Cayman (KY)

( * ) Notice: Subject to any disclaimer, the term of this patent is extended or adjusted under 35 U.S.C. 154(b) by 531 days.

(21) Appl. No.: 10/045,820

(22) Filed: Jan. 11, 2002

(51) Int. Cl.
*G06F 15/173* (2006.01)

(52) U.S. Cl. ...................................... 709/224; 370/230

(58) Field of Classification Search ........ 709/223–225, 709/232, 234, 240; 370/230–235, 389, 412, 370/429, 229
See application file for complete search history.

(56) References Cited

U.S. PATENT DOCUMENTS

| | | | |
|---|---|---|---|
| 4,942,569 A | 7/1990 | Maeno | |
| 5,197,127 A | 3/1993 | Waclawsky et al. | |
| 5,506,955 A | 4/1996 | Chen et al. | |
| 5,760,607 A * | 6/1998 | Leeds et al. | 326/38 |
| 5,878,420 A * | 3/1999 | de la Salle | 707/10 |
| 5,933,602 A | 8/1999 | Grover | |
| 5,958,010 A * | 9/1999 | Agarwal et al. | 709/224 |
| 5,964,837 A | 10/1999 | Chao et al. | |
| 5,974,457 A | 10/1999 | Waclawsky et al. | |
| 5,983,278 A | 11/1999 | Chong et al. | |
| 5,999,908 A | 12/1999 | Abelow | |
| 6,023,454 A * | 2/2000 | Deroux-Dauphin et al. | 370/235 |
| 6,023,507 A | 2/2000 | Wookey | |
| 6,078,956 A | 6/2000 | Bryant et al. | |
| 6,112,241 A * | 8/2000 | Abdelnour et al. | 709/224 |
| 6,137,782 A * | 10/2000 | Sharon et al. | 370/255 |
| 6,148,335 A * | 11/2000 | Haggard et al. | 709/224 |
| 6,279,037 B1 * | 8/2001 | Tams et al. | 709/224 |
| 6,285,658 B1 | 9/2001 | Parker | |
| 6,327,677 B1 * | 12/2001 | Garg et al. | 714/37 |
| 6,363,421 B2 | 3/2002 | Barker et al. | |
| 6,427,063 B1 | 7/2002 | Cook et al. | |
| 6,459,682 B1 | 10/2002 | Ellesson et al. | |
| 6,460,010 B1 | 10/2002 | Hanes et al. | |
| 6,469,991 B1 | 10/2002 | Chuah | |
| 6,480,901 B1 | 11/2002 | Weber et al. | |
| 6,542,466 B1 | 4/2003 | Pashtan et al. | |
| 6,570,875 B1 | 5/2003 | Hegde | |
| 6,601,020 B1 | 7/2003 | Myers | |
| 6,633,835 B1 * | 10/2003 | Moran et al. | 702/190 |
| 6,681,232 B1 | 1/2004 | Sistanizadeh et al. | |
| 6,701,363 B1 | 3/2004 | Chiu et al. | |
| 6,704,794 B1 | 3/2004 | Kejriwal et al. | |

(Continued)

FOREIGN PATENT DOCUMENTS

EP 1 063 818 A2 12/2000

(Continued)

*Primary Examiner*—Bunjob Jaroenchonwanit
*Assistant Examiner*—Duyen Doan
(74) *Attorney, Agent, or Firm*—Fenwick & West LLP

(57) ABSTRACT

A probe apparatus, method and computer program product for application monitoring are provided. A data collection module collects data from a network segment. A flow processor coupled to the data collection module classifies the collected data into a plurality of flows. A capture system coupled to the flow processor filters and buffers the collected data. A main processor processes the filtered data.

11 Claims, 32 Drawing Sheets

U.S. PATENT DOCUMENTS

| | | |
|---|---|---|
| 6,714,976 B1 | 3/2004 | Wilson et al. |
| 6,754,181 B1* | 6/2004 | Elliott et al. ................. 370/252 |
| 6,801,940 B1* | 10/2004 | Moran et al. ................ 709/224 |
| 6,885,641 B1 | 4/2005 | Chan et al. |
| 6,912,225 B1* | 6/2005 | Kohzuki et al. ............ 370/412 |
| 6,993,604 B2* | 1/2006 | Dixon ......................... 710/56 |
| 7,006,472 B1* | 2/2006 | Immonen et al. ........... 370/332 |
| 2001/0054045 A1 | 12/2001 | Shirasaka |
| 2001/0054086 A1 | 12/2001 | Miyahira |
| 2001/0056464 A1 | 12/2001 | Ishihara et al. |
| 2002/0059424 A1 | 5/2002 | Ferguson et al. |
| 2002/0073380 A1* | 6/2002 | Cooke et al. ................... 716/1 |
| 2002/0080180 A1 | 6/2002 | Manders et al. |
| 2002/0107710 A1 | 8/2002 | Takizawa et al. |
| 2002/0118640 A1 | 8/2002 | Oberman et al. |
| 2002/0122422 A1* | 9/2002 | Kenney et al. .............. 370/392 |
| 2002/0154653 A1* | 10/2002 | Benveniste .................. 370/447 |
| 2002/0186656 A1* | 12/2002 | Vu .............................. 370/229 |
| 2002/0186661 A1 | 12/2002 | Santiago |
| 2003/0002438 A1* | 1/2003 | Yazaki et al. ................ 370/229 |
| 2003/0065809 A1 | 4/2003 | Byron |

FOREIGN PATENT DOCUMENTS

| | | |
|---|---|---|
| WO | WO 00/08806 | 2/2000 |

* cited by examiner

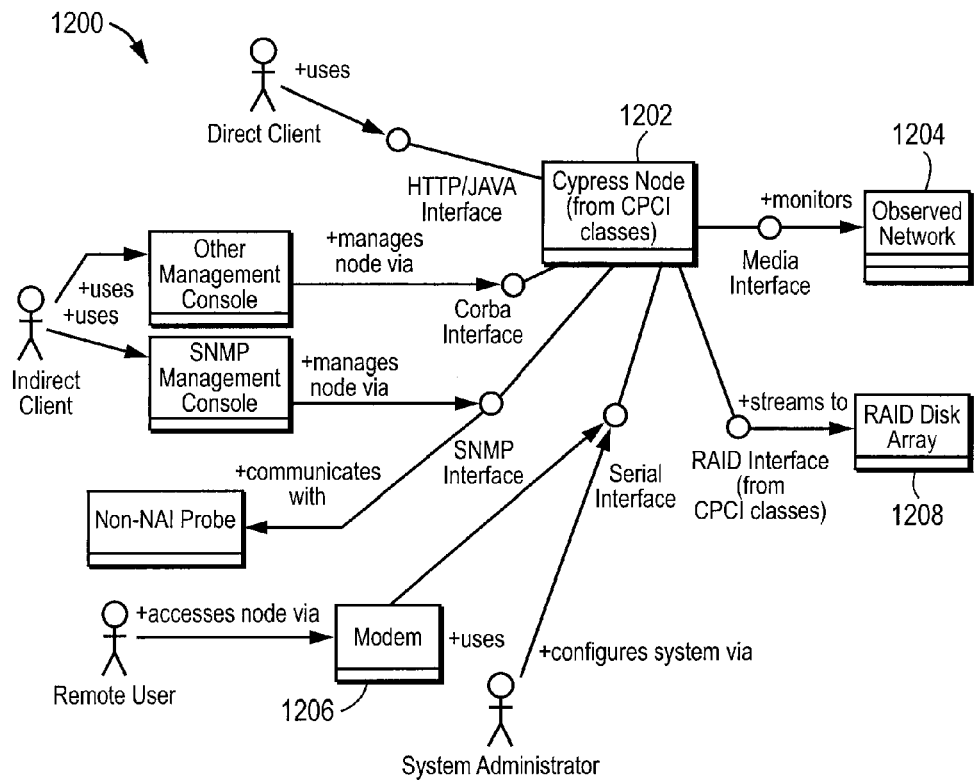

FIG. 12

| User Class | Operations Allowed |
|---|---|
| Network Administrators | System turn-up & configuration, add users, etc. |
| Business Users (CIO) | View reports, trends, accounting info, etc. |
| Security Managers | Access users e-mail, web activity, policies, etc. |
| Network Planners | Access to capacity, trend, load & distribution info. |
| Network Managers | General access to all but security related |
| Network Technicians | Access to diagnostics, alarms, trace files, etc. |

FIG. 13

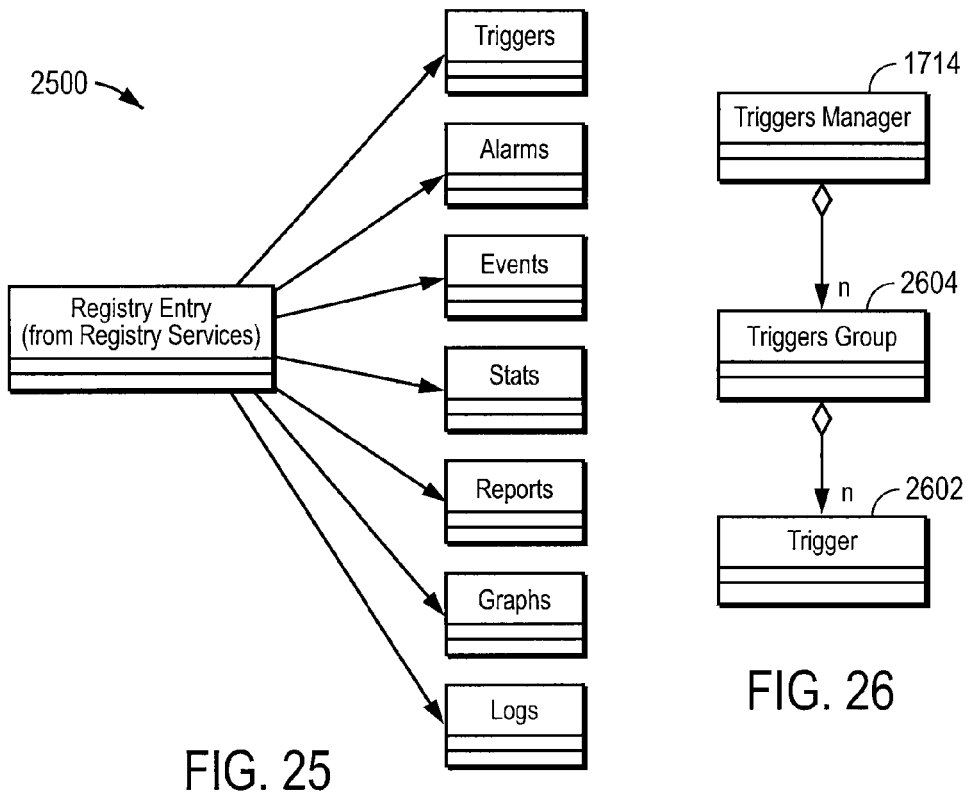
FIG. 25
FIG. 26
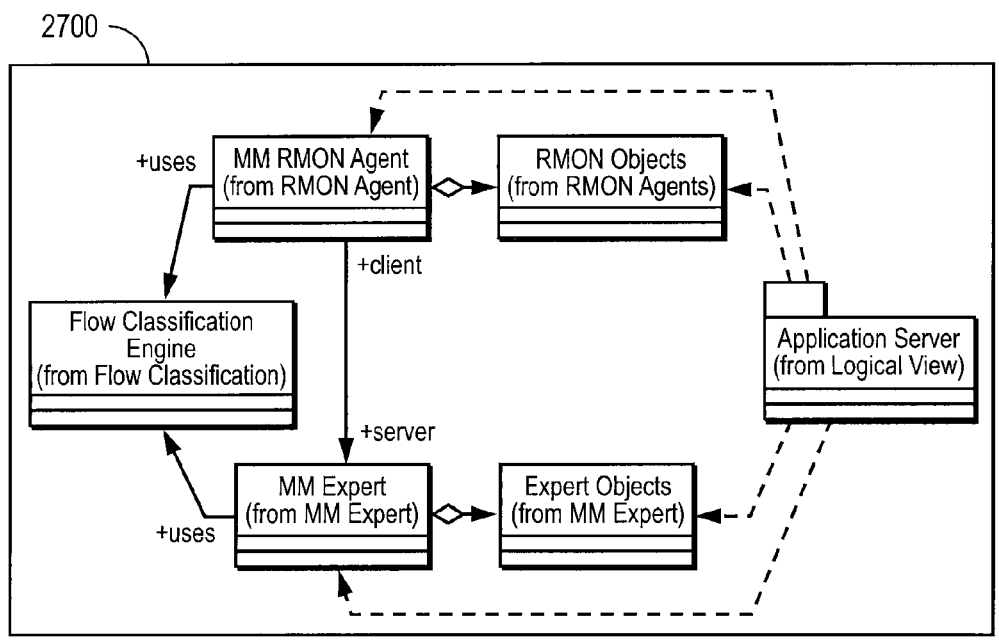
FIG. 27

LEGEND
1) Packet transferred to capture control
2) Address compared in CAM
3) If entry match: priority queue, else: normal queue
4) Notify flow process of entry
5) Flow proc retrieves pkt & classifies
6) Flow record updated in shared mem, expert include flag checked
7) If headroom, add addr to priority CAM
8) If expert include flag set in flow record, initiate DMA to focus buffer
9) Write parse descriptor to shared mem
10) Expert retrieves parse descriptor
11) Expert retrieves flow record
12) Expert retrieves packet from focus buf
13) Expert builds/updates object(s)
14) Expert sets include flaf in flow record (if interesting)
15) Object is persisted, packet is prepended and persis
16) Event/object descriptor built for app svr (optional)
17) Descriptor retrieved by app svr (optional)
18) Objects or packet are retrieved by app svr (optional)

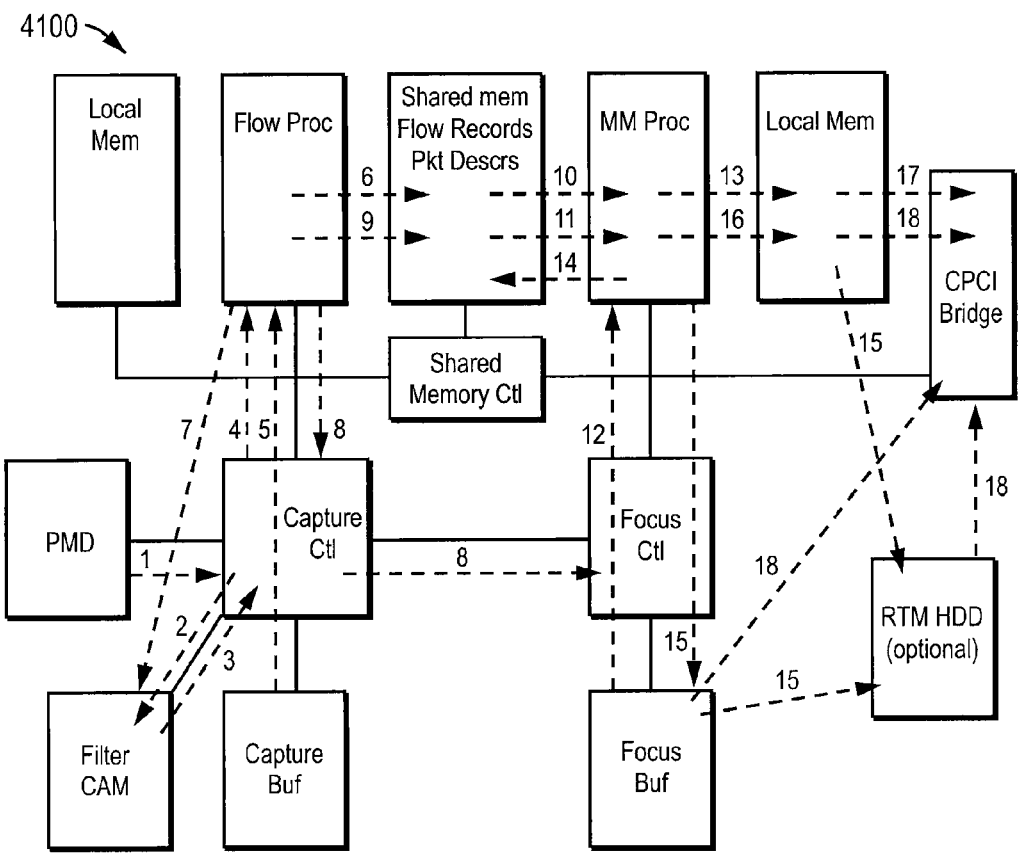

FIG. 41

MEDIA MODULE APPARATUS AND METHOD FOR USE IN A NETWORK MONITORING ENVIRONMENT

RELATED APPLICATION

This application is a continuation of a parent application entitled "MULTI-SEGMENT NETWORK APPLICATION MONITORING AND CORRELATION ARCHITECTURE" and naming Mike Moran, Tauras Liubinskas, and Jack Goral as inventors, and which was filed Jan. 10, 2002 under Ser. No. 10/043,501, and which is incorporated herein by reference in its entirety.

FIELD OF THE INVENTION

The present invention relates to network monitoring and management, and more particularly to an architecture for a network application monitoring system.

BACKGROUND OF THE INVENTION

Networks are used to interconnect multiple devices, such as computing devices, and allow the communication of information between the various interconnected devices. Many organizations rely on networks to communicate information between different individuals, departments, work groups, and geographic locations. In many organizations, a network is an important resource that must operate efficiently. For example, networks are used to communicate electronic mail (e-mail), share information between individuals, and provide access to shared resources, such as printers, servers, and databases. A network failure or inefficient operation may significantly affect the ability of certain individuals or groups to perform their required functions.

A typical network contains multiple interconnected devices, including computers, servers, printers, and various other network communication devices such as routers, bridges, switches, and hubs. The multiple devices in a network are interconnected with multiple communication links that allow the various network devices to communicate with one another. If a particular network device or network communication link fails or underperforms, multiple devices, or the entire network, may be affected.

Network management is the process of managing the various network devices and network communication links to provide the necessary network services to the users of the network. Typical network management systems collect information regarding the operation and performance of the network and analyze the collected information to detect problems in the network. For example, a high network utilization or a high network response time may indicate that the network (or a particular device or link in the network) is approaching an overloaded condition. In an overloaded condition, network devices may be unable to communicate at a reasonable speed, thereby reducing the usefulness of the network. In this situation, it is important to identify the network problem and the source of the problem quickly and effectively such that the proper network operation can be restored.

Often applications running on the network are a source of the aforementioned problems or adversely affected by such problems. There is thus a continuing need for a new application-monitoring system for domestic enterprise management. Such a system should enable administrators (such as Network Managers) and service providers to introduce real-time application monitoring into service offerings. There is also a need to offer application monitoring since a large number of business and end users stand to gain significant understanding of their networks applications, performance and security.

SUMMARY OF THE INVENTION

A probe apparatus, method and computer program product for application monitoring are provided. A data collection module (also referred to herein as a media module) collects data from a network segment. A flow processor coupled to the data collection module classifies the collected data into a plurality of flows. A capture system coupled to the flow processor filters and buffers the collected data. A main processor processes the filtered data.

In one embodiment, the data collection module prepends the data with descriptor information, which is used by the capture system to filter the collected data. In another embodiment, the capture system includes a capture buffer and a focus buffer. The capture system filters the collected data stored in the capture buffer, and the filtered data is sent to the focus buffer.

Preferably, the capture system captures the collected data in the capture buffer in a fill and stop mode, a wrap mode, a priority queuing mode, and/or a non-priority queuing mode. When in priority queuing mode, the capture buffer is segmented into priority and non-priority queues. The buffer space for each queue varies dynamically based on the arrival of data that meets priority criteria. Buffers are reallocated to the priority queue from the non-priority queue as the number of priority flows increases. Buffers are also reallocated to the non-priority queue from the priority queue as the number of priority flows decreases. This mechanism allows the flow processor to focus on servicing priority data over non-priority data to prevent data loss. The capture system is also able to selectively discard flows from the priority queue based on predetermined criteria such as the amount of priority data exceeding a processing capability of the system, user specifications, the flow matching a randomly selected identifier, etc.

In yet another embodiment, the main processor identifies a flow as being important. The flow processor uses the identification as criteria for forwarding additional data from the identified flow to the main processor. This mechanism provides another type of adaptive filtering capability to reduce the probability of dropped packets for post-classification analysis.

In a further embodiment, at least a portion of the probe apparatus is implemented on a Field Programmable Gate Array (FPGA). Preferably, the portion of the probe apparatus implemented on the FPGA includes dedicated FPGA engines for capture and filtering of the data.

BRIEF DESCRIPTION OF THE DRAWINGS

FIG. 12 depicts an operational environment including a node along with a set of environmental entities, which the node interacts with.

FIG. 13 is a table that listing a sub-classification of users.

FIG. 25 depicts registry entry object associations.

FIG. 26 shows a collection of triggers and trigger groups.

FIG. 27 depicts the major subsystems of the media module and their dependencies.

FIG. 41 is a media module general processing flow.

DESCRIPTION OF THE PREFERRED EMBODIMENTS

Embodiments of the present invention identify electronic mail messages and other types of network communications that are suspected of being infected by malicious code, and quarantines such messages and communications having potentially malicious content. The identification of this potentially malicious content may be accomplished utilizing heuristics. Examples of such heuristics are provided below.

Figure 1:
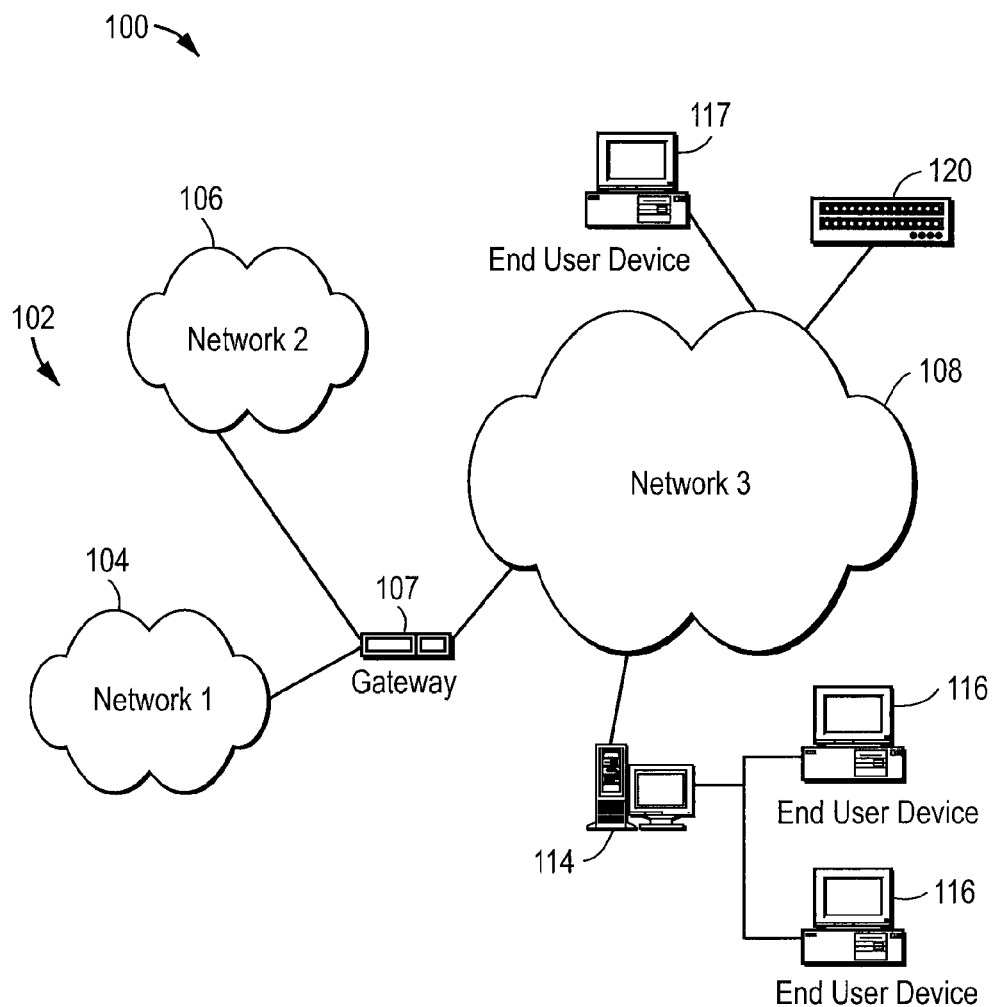
FIG. 1 is a representation of a system architecture according to one embodiment.

FIG. 1 illustrates a network architecture 100, in accordance with one embodiment. As shown, a plurality of remote networks 102 are provided including a first remote network 104 and a second remote network 106. Also included is at least one gateway 107 coupled between the remote networks 102 and a proximate network 108. In the context of the present network architecture 100, the networks 104, 106 may each take any form including, but not limited to a local area network (LAN), a wide area network (WAN) such as the Internet, etc.

In use, the gateway 107 serves as an entrance point from the remote networks 102 to the proximate network 108. As such, the gateway 107 may function as a router, which is capable of directing a given packet of data that arrives at the gateway 107, and a switch, which furnishes the actual path in and out of the gateway 107 for a given packet.

Further included is at least one data server 114 coupled to the proximate network 108, and which is accessible from the remote networks 102 via the gateway 107. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 117 may also be directly coupled to any of the networks, in one embodiment.

A monitoring system 120 is coupled to a network 108. Illustrative monitoring systems will be described in more detail below. It should be noted that additional monitoring systems and/or components thereof may be utilized with any type of network element coupled to the networks 104, 106, 108. In the context of the present description, a network element may refer to any component of a network.

Figure 2:
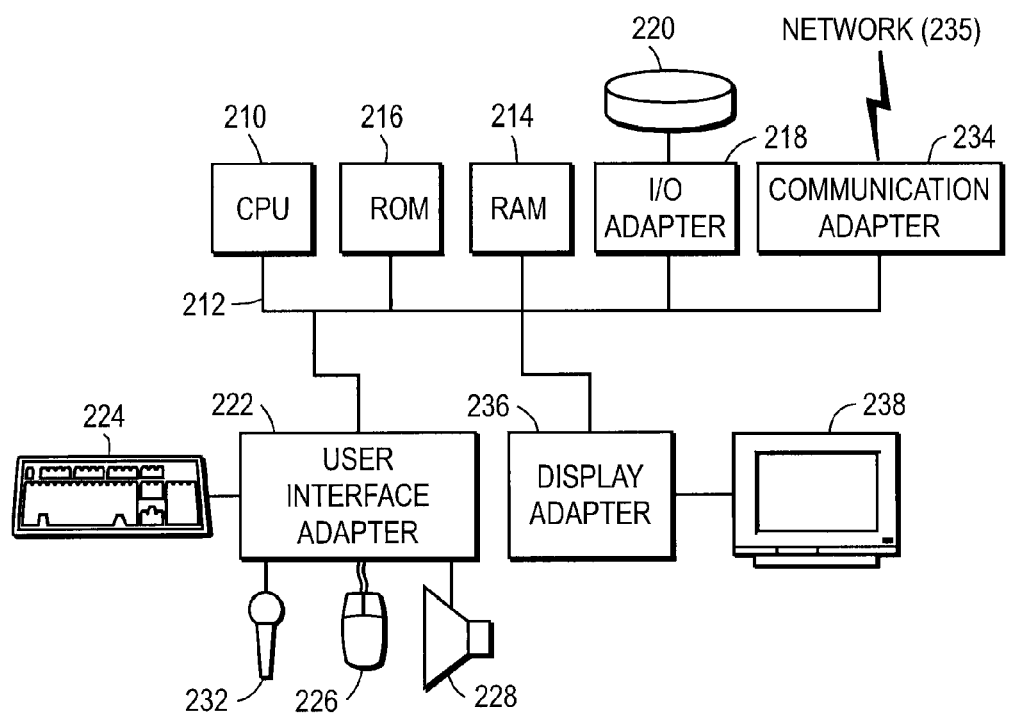
FIG. 2 shows a representative hardware environment that may be associated with the workstations of FIG. 1, in accordance with one embodiment.

FIG. 2 shows a representative hardware environment associated with a user device 116 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235

(e.g., a data processing network) and a display adapter 236 for connecting the bus 212 to a display device 238.

The workstation may have resident thereon an operating system such as the Microsoft Windows® NT or Windows® 2000 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

The following sections provide a high-level description of an architecture of a system for monitoring and managing a network according to an embodiment. The system includes a set of application monitoring and management tools that provide business critical application and network performance information to administrators such as CIOs and enterprise network managers.

The new application-monitoring system is provided for domestic enterprise management. One purpose of this system is to enable administrators (such as CIOs and Network Managers) to introduce real-time application monitoring into service offerings. There is a need to offer application monitoring since a large number of business and end users stand to gain significant understanding of their networks applications, performance and security.

One embodiment provides distributed multi-segment network monitoring and correlation, with a focus on application performance. This multi-segment capability can be extended to multi-site monitoring and correlation (e.g. nodes placed at different geographical locations). The system is preferably based on a scalable, high-performance, open architecture, which can be easily adapted to support many different topologies and features.

Topologies

Figure 3:
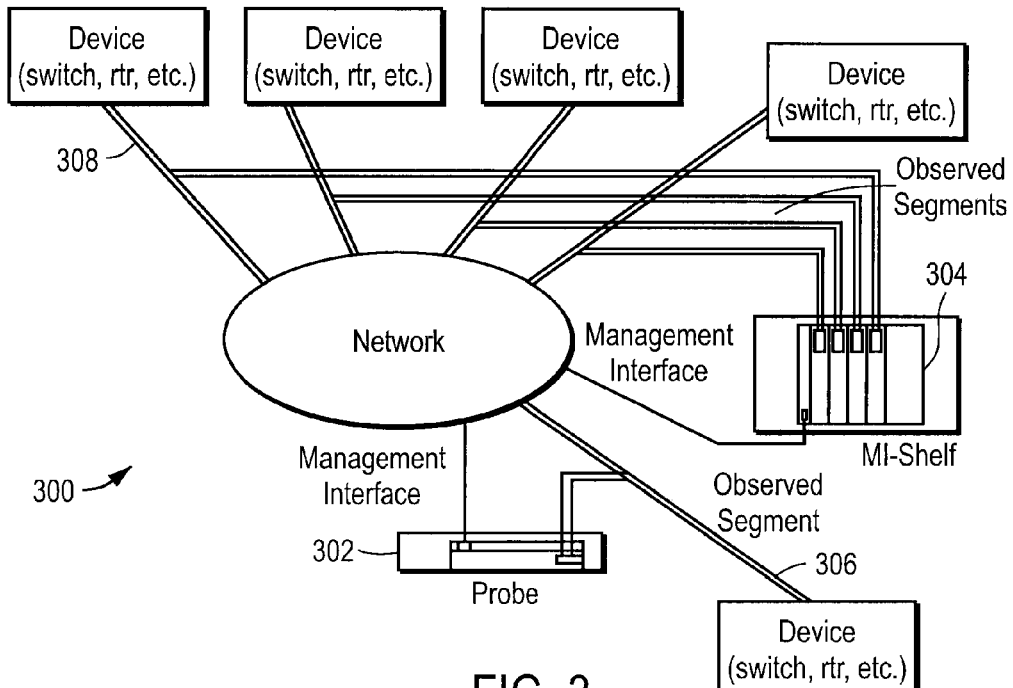
FIG. 3 illustrates an Application Monitor system according to one embodiment.

FIG. 3 illustrates an Application Monitor system 300 according to one embodiment. As shown, the system can include the following topologies:

1. Single-interface probe 302
2. Multi-interface (shelf-based) system 304

In any topology, the system includes two major components: a single application server module and one or more Media Modules. The role of the media module is to provide a physical observation point of network traffic on a given segment 306. The application server provides all administrative functions (i.e. user interface, provisioning, reports, alarms and statistics, Simple Network Management Protocol (SNMP) agent, etc.) for the system. In the single-interface configuration, a single monitoring interface is available in a self-contained, managed device, similar to a typical Remote Network Monitoring (RMON) probe.

In the multi-interface configuration, a larger system is possible by providing multiple interfaces (Media Modules), which allows monitoring and real-time correlation of multiple (co-located) network segments 308. Preferably, in both arrangements, no higher-layer management console is required. This second configuration also allows the mixing and matching of different media module types. One exemplary benefit of this configuration would be to monitor traffic seen on the WAN-side of a router, on a backbone, and on individual branch segments all from the same system, providing a complete network view from a single administrative point.

Administrative Domains

As mentioned in the previous section, the system is a self-managed device, meaning that no additional EMS/NMS functionality is required for any of the supported features. In use, a user can connect directly to the node using any standard web browser and immediately receive alarms, statistics and diagnosis, configure triggers, view reports, etc.

Figure 4:
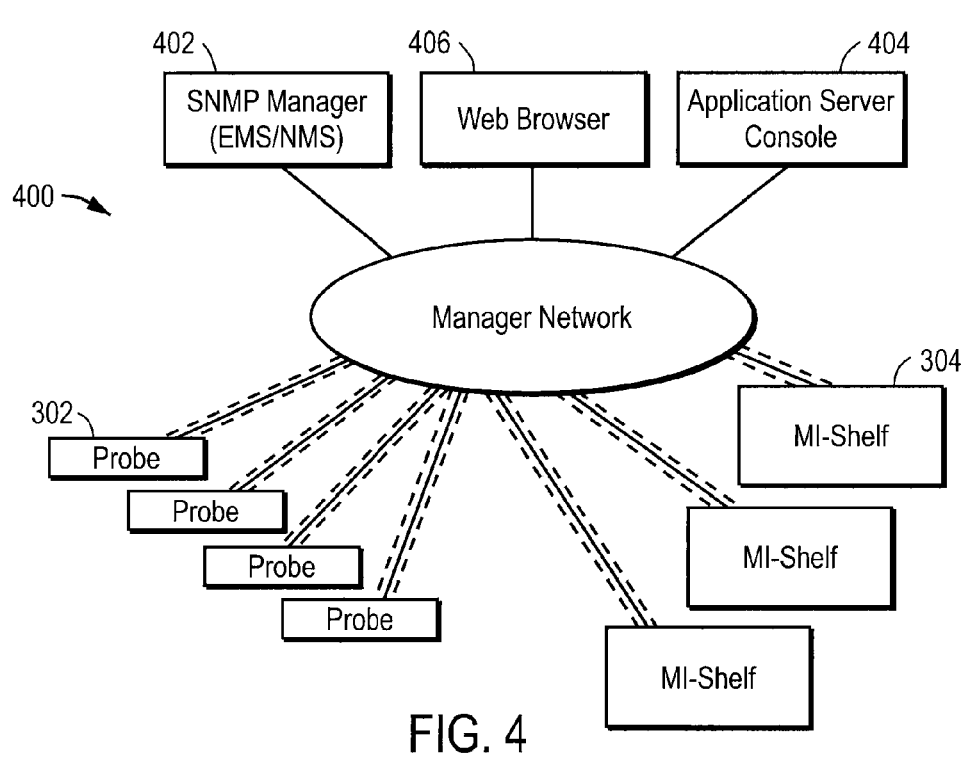
FIG. 4 is a diagram illustrating a system configuration for incorporating multiple nodes with centralized management.

In a multi-location topology, however, a network manager may desire to incorporate multiple, physically separate nodes (shelf 304 or probe 302) under one management umbrella. FIG. 4 is a diagram illustrating a system configuration 400 for incorporating multiple nodes with centralized management. As shown, this may be accomplished using one of the following approaches:

1. Using Simple Network Management Protocol (SNMP) from a central management console 402
2. Using application server software 404 running on a workstation Again, a user can connect directly to the node using any standard web browser 406. The second approach offers many benefits over a standard SNMP manager including enhanced correlation, multi-interface "Expert" functions, self-similar topology views, a rich set of triggers, system auto-discovery, etc.

Illustrative Features

The Application Monitoring system is a high performance, scalable monitoring and analysis tool using custom, purpose-built hardware. Furthermore, the system provides advanced network and application performance monitoring capability to enterprise network managers and CIOs.

Table 1 lists some exemplary features.

TABLE 1

Robust 24 × 7 "always-on" network and application monitoring
High performance Compact PCI based architecture
Single or multiple (co-located) interfaces in common chassis
Full gigabit line rate statistics and capture
Real-time deep packet flow classification and filtering per interface
RMON 1, 2 and 3 (APM) functionality per interface
Real-time Expert monitoring and alarms
Multi-interface (correlated) RMON and Expert statistics and alarms
Integrated network management and web-based user interface functionality
Flexible application customization via trigger scripts
Capability to mix and match multiple interfaces and interface types in same shelf
Completely field upgradeable (remote download and configuration)
Secure multi-client, multi-privilege-level end user authentication Applications The system platform can support a multitude of monitoring and analysis applications due to its open architecture and inherent flow classification capabilities. Table 2 is a partial list of applications provided by the system. These include real-time application monitoring and diagnostic services

TABLE 2

Performance and SLA management - Application and network response time, distributions, etc.
RMON1, 2 and 3 (Application Performance Monitoring)
Security management - IDS, Theft Of Service, DOS, DDOS, etc.
Policy management - Access violations, illegal content, bandwidth overuse, etc.
Network engineering - Reports showing where to increase capacity, add routers, etc.
Accounting - Bill-back by application usage, department, lost revenue, etc.
Quality of Service (QOS) management
Report generation and logging TABLE 2-continued Fault isolation and troubleshooting
Application performance monitoring (single and multi-interface)
Application distribution statistics (by user, domain, VLAN, server, interface, etc.)
RMON1, 2 and 3 (APM) capabilities via SNMP agent
Flow classification for tracking applications between endpoints (servers, hosts, groups)
Observed QOS and SLA metrics
Security monitoring and alerts
Generation of alarms and traps on any user selected criteria
Diagnostic information for detected anomalies
Fault isolation (when used in multi-site configurations)
Multi-user, multi session web-based user interface
User-customizable applications via trigger scripts Extensibility Again, given the open architecture, the system according to one embodiment is extensible in the areas shown in Table 3.

TABLE 3

New or enhanced applications via software download
New or higher performance media modules
Addition of new hardware feature modules (GPS, etc.)
Custom applications via trigger scripting System Hardware Components A system hardware architecture according to a preferred embodiment is described below. The system hardware architecture in this example is based on the Compact PCI (CPCI) multi-processor computer platform. The configurations can use a chassis, power supplies and system controller (single board computer) module. Hardware modules can be developed per physical media type (i.e. ATM, Gigabit Ethernet, etc.) but all share a common design above the media-dependent portion. Note that the description of this preferred embodiment is presented by way of example only and one skilled in the art will appreciate that variations may be made to the various embodiments without straying from the spirit and scope of the present invention.

Illustrative components included in the system are listed in the Table 4.

TABLE 4

Application Server Module - system controller, administrative functions and user interface
Gigabit Ethernet Media Module - analysis engine, physical line I/Fs, RMON and Expert applications
Probe Enclosure - small 2U CPCI chassis, houses one Application Server and one Media Module
Shelf Enclosure - 16 slot CPCI chassis, houses one Application Server and several Media Modules The system can include the following Compact PCI compliant components, for example:

Backplanes:
 1. The 2U backplane supports 64-bit or 32 bit bus transfers at 66 or 33 MHz
 2. The multi-slot backplane supports 64-bit or 32 bit bus transfers at 33 MHz Primary Hardware modules (6U CPCI cards):
 1. A single "Application Server" module—CPCI single board computer
 2. One or more "Media Modules"—analysis engine and monitoring interface
 3. CPCI option boards—GPS timing module, RAID interface, etc. as needed Additional Modules
 1. Rear Transition Module (RTM) HDD board—provides hard drive, serial port and Ethernet for any primary hardware module. Note that this module is always required for the application server and is optional for media modules (in multi-slot configurations).
 2. PMC (daughter-card) option modules for application server The Compact PCI specification allows the use of multiple bus masters in a system and includes support for the items shown in Table 5.

TABLE 5

Figure 5:
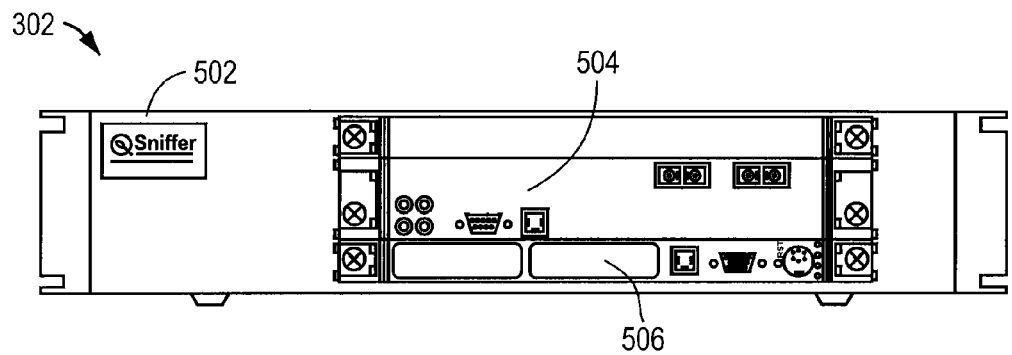
FIG. 5 shows the basic hardware configuration of a Probe.

Plug and Play detection of hardware and auto configuration of memory and interrupts
Transfer rates of 66+ MHz at 64+ bits (e.g. 4.2 Gb/S)
Multi-master arbitration for shared resources (targets)
Burst DMA to/from any target by any master
Dual-mode (target/initiator) operation for transparent agents FIG. 5 shows the basic hardware configuration of a Probe 302. Various combinations are possible for the two configurations; however in general the stand-alone probe can use a 2U pizza-box chassis 502 populated with a single media module 504 and application server Module 506.

Figure 6:
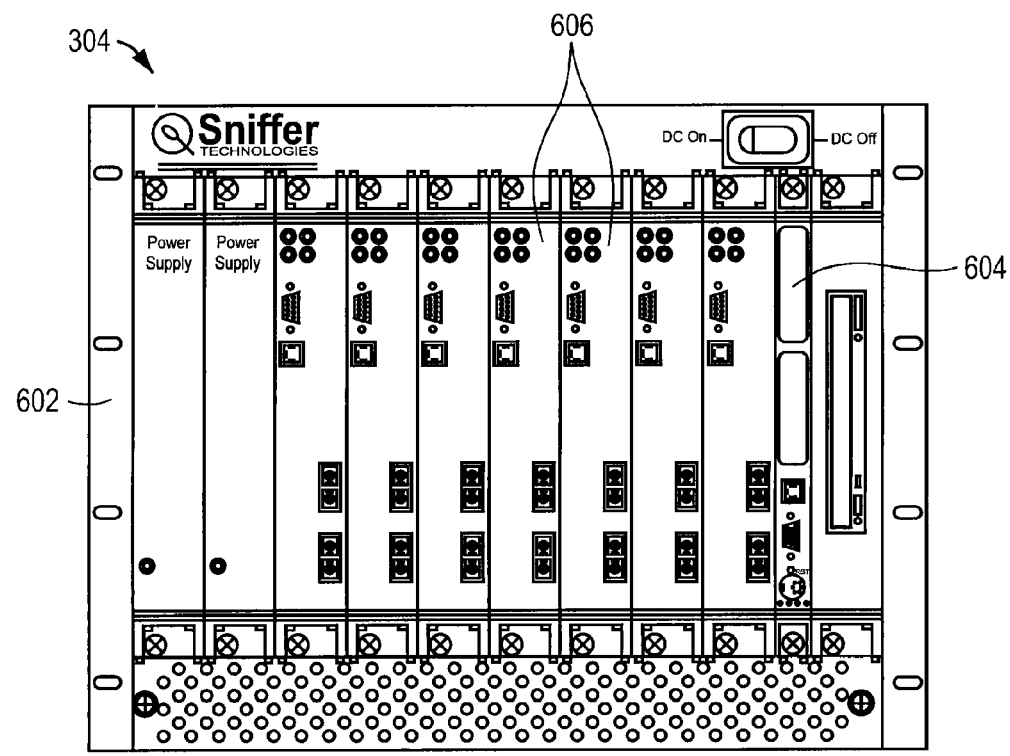
FIG. 6 shows the basic hardware configuration of the shelf system.

FIG. 6 shows the basic hardware configuration of the shelf system 304. The shelf system can use a 16-slot chassis 602 populated with a single application server Module 604 and one or more Media Modules 606. It should be noted that the application server and media module designs are reusable in any CPCI enclosure.

CPCI Modules

Figure 7:
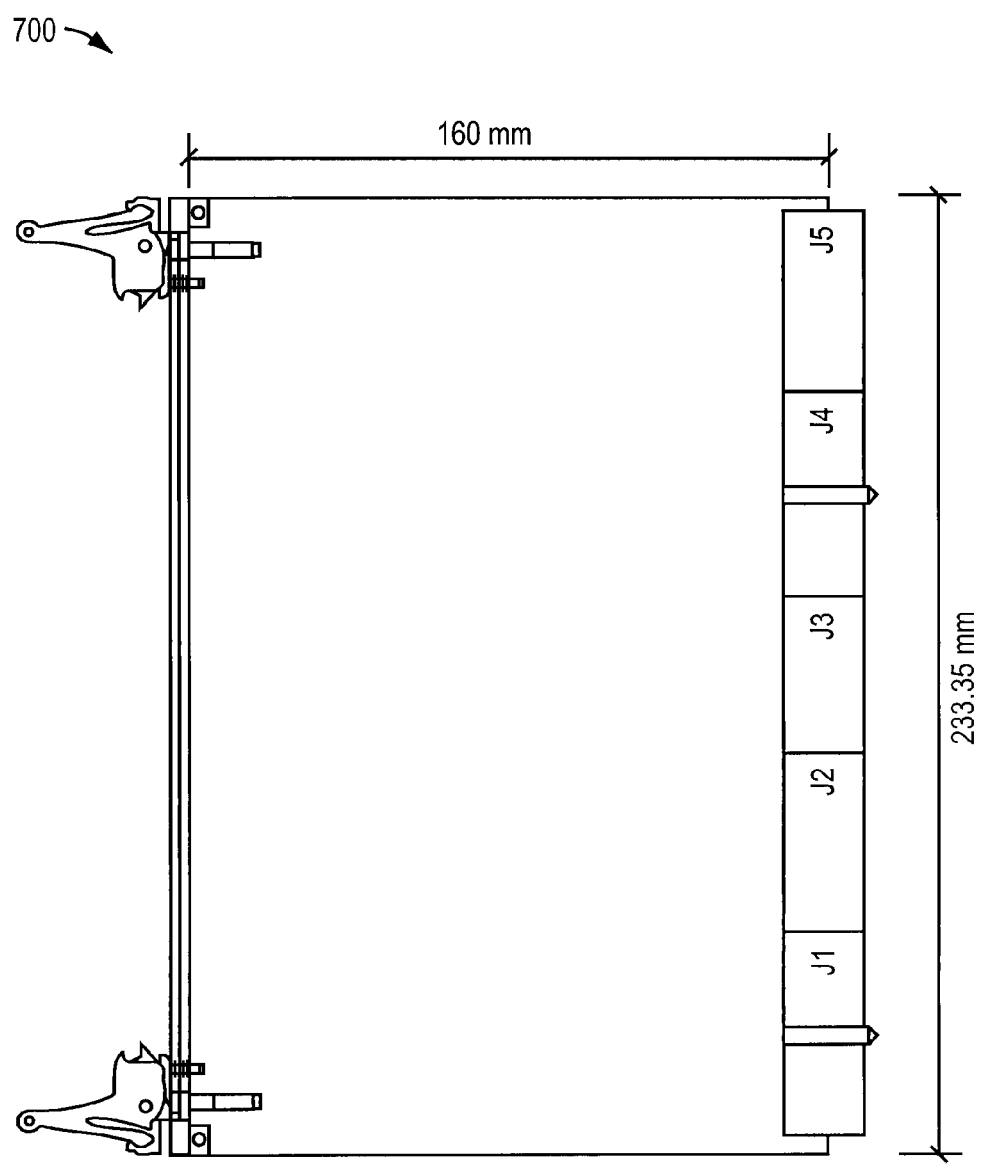
FIG. 7 depicts an illustrative CPCI module.

FIG. 7 depicts an illustrative Compact PCI (CPCI) module 700. All hardware modules can conform to the to PICMG 2.0 R3.0 Compact PCI Core Specification, which defines a shared 32 or 64-bit data transfer path running at 33 or 66 MHz, a set of standard board profiles, an optional rear transition module (rear I/O) per slot, and one or more optional PMC (mezzanine) daughter cards per standard board.

The standard board sizes can be based on a Euro-card format and are typically available in two primary sizes, as listed in the following table.

TABLE 6

3U Profile - 116.675 mm by 160 mm
6U Profile - 233.35 mm by 160 mm (type used in system)

In addition, these boards have a height profile, which dictates how many backplane slots they occupy. The common single-slot profile is referred to as "4HP". Boards may be of this unit height or multiples of it such as 8HP (double-slot), 12HP (triple-slot), etc.

Application Server Module

The application server module according to an illustrative embodiment a 6U, 4HP (single-slot) CPCI single-board computer (SBC) module which acts as the CPCI system controller in any configuration. The role of the system controller is generally to configure any peripheral modules via plug-and-play auto detection. This includes assignment of memory address ranges, identifying bus number, slot number, hot-swap and bus-master capabilities, etc. All CPCI backplanes have at least one designated "system-slot" where the system controller resides. The application server therefore is responsible for detecting, configuring, managing and downloading software to all media modules in a given system. The following table lists some of the application server hardware attributes.

TABLE 7

SBC conforming to PICMG 2.0 R3.0 Compact PCI Core Specification
Conforms to PICMG 2.1 R2.0 Compact PCI Hot Swap Specification
Supports requirements for the Compact PCI system slot controller
Supports 32-bit, 33 MHz PCI-to-PCI bridge operation
Supports 64-bit, 33 MHz PCI-to-PCI bridge operation
Supports 64-bit, 66 MHz PCI-to-PCI bridge operation
Supports the 6U Euro-card 4HP single slot size (233.35 mm by 160 mm) format
Uses the Intel Pentium 3 processor (850 MHz)
Supports removable SODIMM memory in the following configurations:

128 Mbytes
256 Mbytes
512 Mbytes
1 Gbyte
Supports the Compact PCI Compact-Flash IDE interface
Contains two PMC expansion sites
Supports remote Ethernet booting
Contains one 10/100 Ethernet interface through the front bezel faceplate
Supports an additional 10/100 Ethernet port through the RTM interface
Contains SVGA interface through the front bezel faceplate
Contains a keyboard interface through the front bezel faceplate
Contains a mouse interface through the front bezel faceplate
Contains a serial port interface through the RTM interface
Supports an IDE HDD mini-drive through the RTM interface
Contains a system reset button through the front Bezel faceplate
Supports the RedHat Linux version operating system Media Module The media module, according to an illustrative embodiment, is a 6U, 8HP (double-slot) CPCI custom hardware module which acts as the network analysis interface in any system configuration. The role of the media module is generally to monitor a physical network segment, perform various levels of real-time analysis and to report events and statistics to the application server Module via the CPCI backplane. In addition, the media module supports plug-and-play auto detection, assignment of memory address ranges, reporting bus number, slot number, hot-swap and bus-master capabilities, etc. Table 8 lists some of the media module hardware attributes.

TABLE 8

Figure 8:
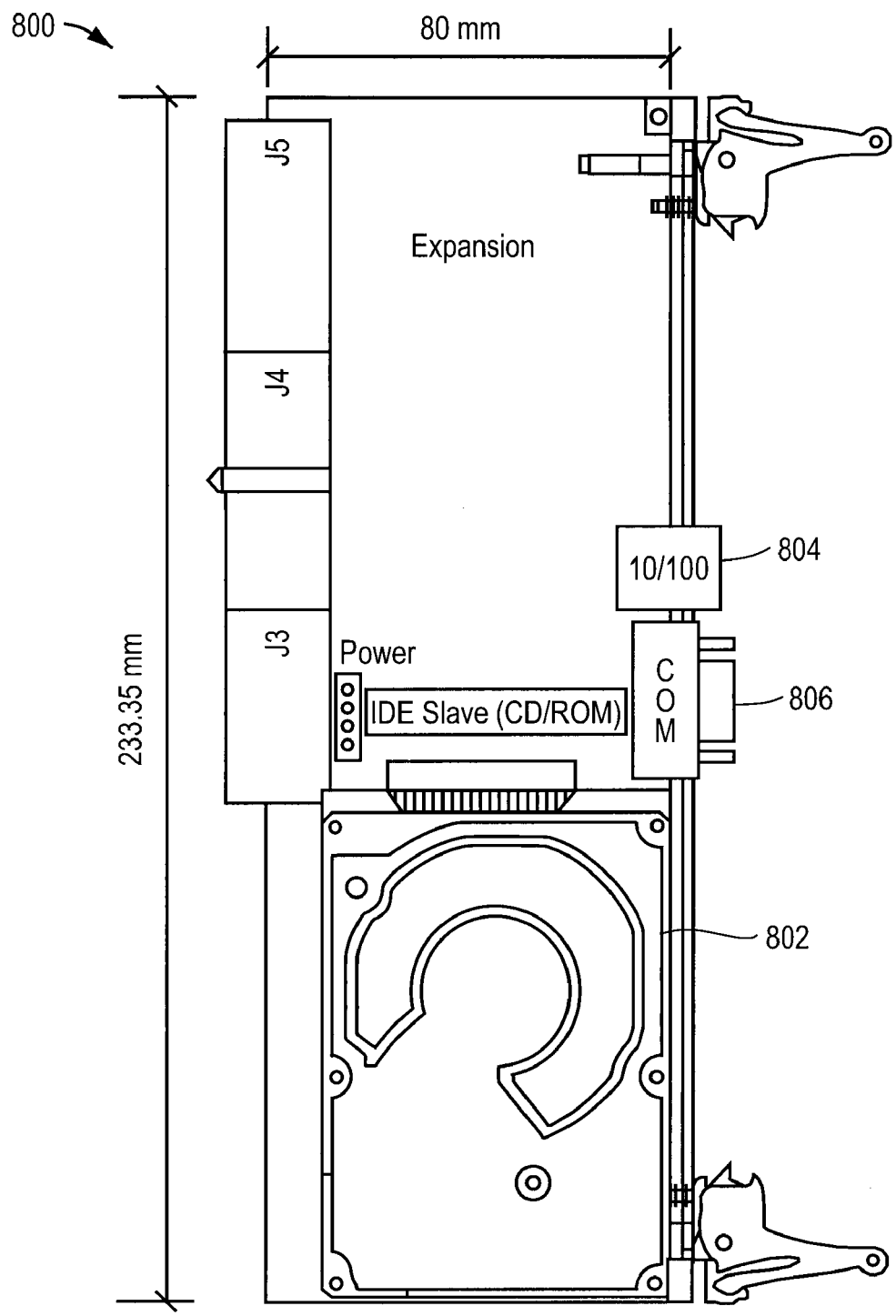
FIG. 8 depicts an HDD rear transition module (RTM).

Module conforming to PICMG 2.0 R3.0 Compact PCI Core Specification
Conforms to PICMG 2.1 R2.0 Compact PCI Hot Swap Specification
Supports requirements for a Compact PCI peripheral slot controller
Supports 32-bit, 33 MHz PCI-to-PCI transparent bridge operation
Supports 64-bit, 33 MHz PCI-to-PCI transparent bridge operation
Supports 64-bit, 66 MHz PCI-to-PCI transparent bridge operation
Supports the 6U Euro-card 8HP double slot size (233.35 mm by 160 mm) format
Provides a PowerPC main board processor (850 MHz)
Provides an additional analysis processor (850 MHz)
Supports 1 Gbyte of 64-bit SDRAM capture memory
Supports 1 Gbyte of 64-bit SDRAM main processor memory
Supports 1 Gbyte of 64-bit SDRAM analysis processor memory
Provides hardware accelerated primary packet filtering and DMA
Provides hardware accelerated secondary packet filtering and DMA
Provides share memory interface between two on-board processors
Provides hardware triggering functions
Contains one 10/100 Ethernet interface through the front bezel faceplate
Supports a serial port through the RTM interface TABLE 8-continued Supports an IDE HDD mini-drive through the RTM interface
Supports the VxWorks real-time operating system Rear Transition Modules FIG. 8 depicts an HDD Rear Transition Module (RTM) 800. The system architecture supports a single RTM for each primary board in the system (i.e. application server or Media Module). The RTM is an ancillary module which provides the functions set forth in Table 9.

TABLE 9

Figures 9A, 9B:
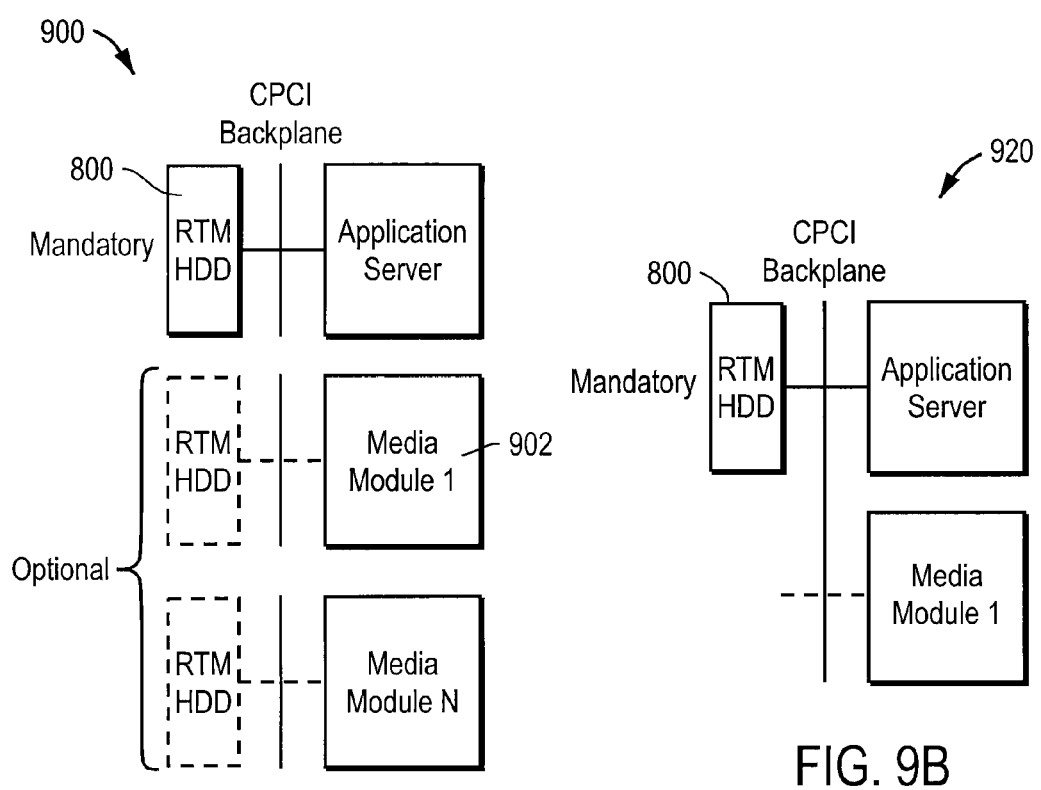
FIG. 9A is a drawing of RTM usage in a multi-interface configuration.
FIG. 9B depicts RTM usage in a single-interface configuration.

On-board 2.5" (HDD) 802 for the primary module
Auxiliary 10/100 Ethernet interface 804 for the primary module
Auxiliary serial port interface 806 for the primary module The RTM module 800 may be required for the application server module in some systems, and is optional for each media module in a multi-interface system. FIG. 9A is a drawing of RTM usage in a multi-interface configuration 900. In multi-interface configurations, an RTM 800 may provide each media module 902 with the ability to perform autonomous capture and statistics logging to disk and enables multi-segment post capture analysis without requiring disk sharing.

FIG. 9B depicts RTM 800 usage in a single-interface configuration 920. In a single-interface (probe) configuration, streaming to the Application Server's RTM disk via the backplane may be adequate for this purpose.

PMC Modules

The application server supports multiple general-purpose PMC (daughter-card) modules with connector access through the front bezel.

System Connectors

All primary connectors can be provided via the front bezel of the system boards. The auxiliary connectors (ETH and COM) can also be provided on the RTM modules.

CPCI Bus Usage Model

Figure 10:
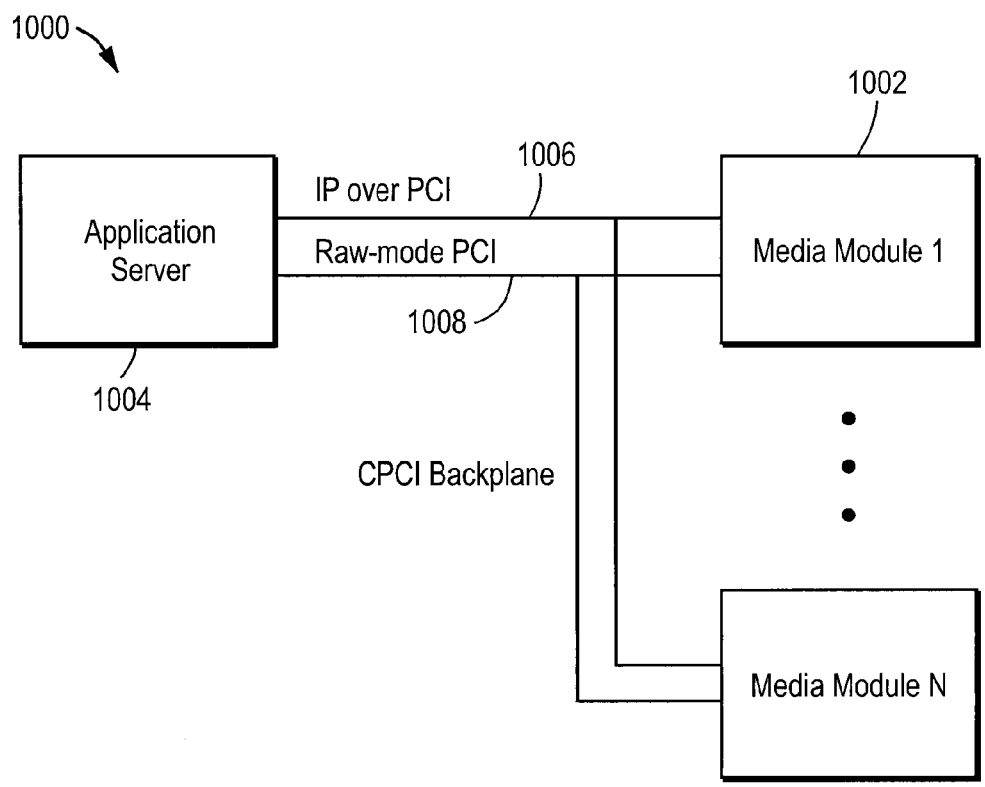
FIG. 10 depicts CPCI bus transfer modes.

FIG. 10 depicts CPCI bus transfer modes. The general transfer model taken for the system architecture is to utilize the CPCI backplane 1000 primarily for configuration, statistics, events and post capture (disk) transfers between the Media Module(s) 1002 and the Application Server 1004. The bulk processing of packet data is handled directly by the Media Module 1002, whereby the application server 1004 is essentially responsible for providing statistics and correlated data to the end user or management station. This approach improves performance and scalability.

One exception to this case is if high-speed streaming to disk (RAID) is required, whereby a fiber-channel transceiver module may be placed in the chassis and performs full-rate transfers from a media module 1002 to an off-shelf striped disk array. Other exceptions may arise, such as incorporation of a system SBC, and are not precluded.

Given the high-speed capacity of the CPCI bus (132 Mbytes/S in the slowest configuration), most transfers between the application server 1004 and media modules 1002 can use an "IP over PCI" driver mechanism 1006, allowing a flexible and scalable communications approach. This model still provides approximately 40 Mbytes/S capacity, but greatly extends the system functionality and addressing capability. A "raw-mode" transfer capability 1008 can also be supported for block transfers requiring more speed.

The method used for moving data between the media modules 1002 and application server 1004 can be based on a "pull" model, whereby higher-level entities retrieve data (i.e. statistics and data objects) from the lower-level entities. The lower-level objects are maintained by the media modules 1002 "in-place". Therefore all requests for media module generated objects (from a user or management station) result in the application server 1004 retrieving data directly from the media module(s) 1002 of interest.

Events however are sent upward asynchronously to notify the higher-level entity of data availability, alarms, etc. This prevents a number of media modules from overloading the application server and scales at the system management level as well. This model is applied at the application server to client level as well and is consistent with the SNMP management environment.

Functional Architecture

Whereas the previous section provided an overview of the physical components of an illustrative system architecture, this section will focus on a functional decomposition of the system. This first-level decomposition will include both hardware and software subsystems as functional entities.

Methodology

The system architecture may be open and extensible at every level. To this end, an object-oriented approach has been used in decomposing the system into sets of self-contained subsystems with common interfaces. These subsystems may be overloaded with different components of the same "class" to extend functionality over time without creating additional complexity. This approach applies not only to specific hardware and software components, but also to combined functional entities as a whole. Each of these entities may be viewed as an encapsulated subsystem comprised of hardware, software, or both which provides a particular class of functionality within the system. Many of the diagrams referred to herein assume some level of understanding of the UML (Unified Modeling Language) by the reader. UML is a standard notation for the modeling of real-world objects as a first step in developing an object-oriented design methodology.

Figure 11:
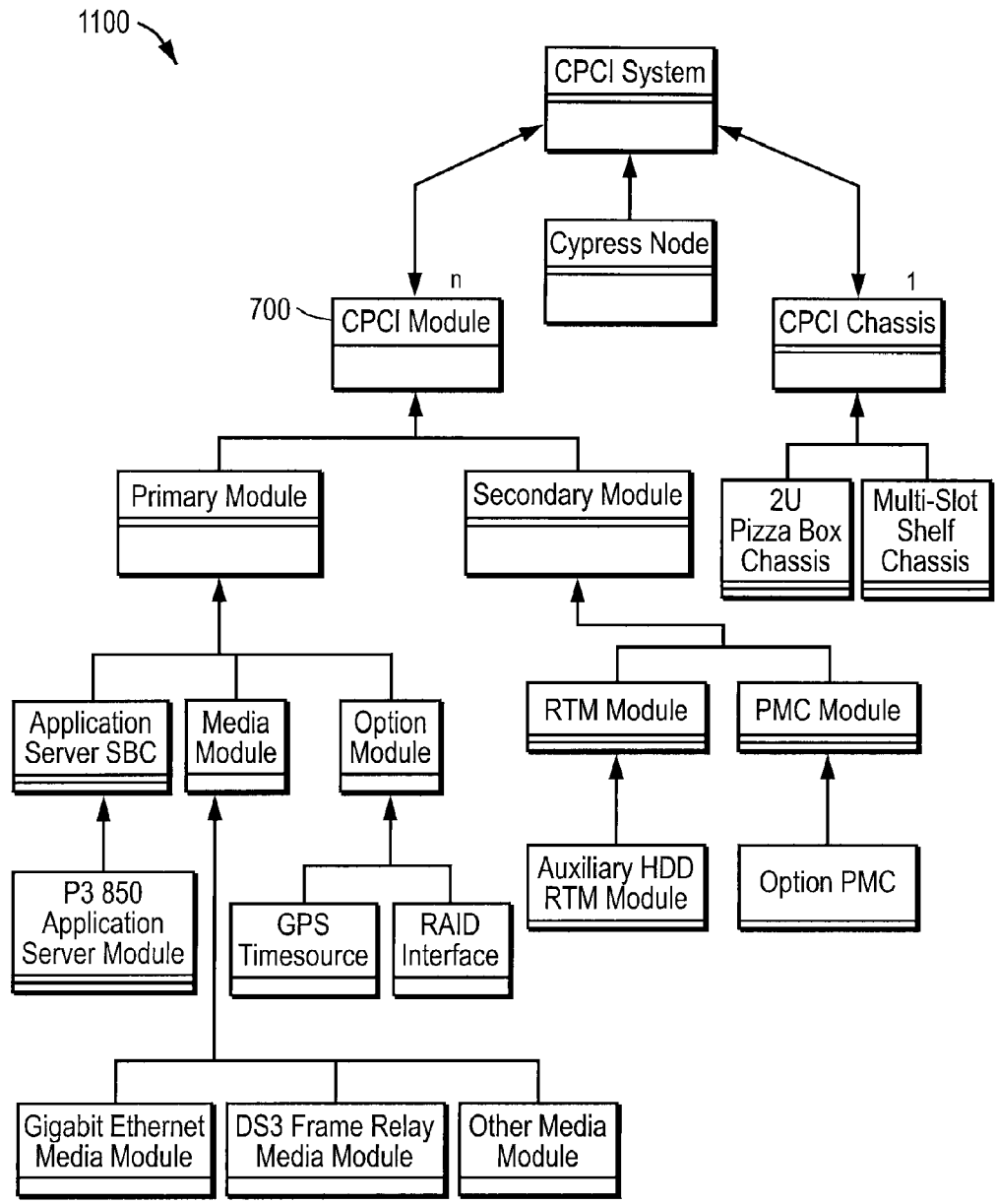
FIG. 11 shows an illustrative CPCI related hardware subclassification tree.

FIG. 11 shows an illustrative CPCI related hardware subclassification tree 1100. The subclassification example while quite simple, illustrates the potential overloading of media modules and CPCI enclosures within the system.

System Operational Environment

The operational environment generally includes the elements listed in Table 10.

TABLE 10

The network under observation
The set of equipment the system interacts with
The set of human clients who will interact with the system FIG. 12 depicts an operational environment 1200 including a node 1202 along with a set of environmental entities, which it interacts with. These environmental entities will be described in the next subsections.

Observed Network 1204

The network 1204 under observation may include one or more network segments, which may or may not have a logical relationship to one another. Some examples of segments with relation to one another are listed in Table 11.

TABLE 11

Individual physical members of a logical trunk group (e.g. EtherChannel, IMA, etc.)
Redundant or multi-homed backbones
Segments on two sides of a switch (i.e. an aggregation relationship)
Segments on two sides of a router carrying the same traffic (i.e. flow path related)
Etc . . .

Segments without relation to one another include those listed in Table 12.

TABLE 12

Isolated backbone segments
Links connected to isolated routers and switches (islands)
Etc . . .

All observed network segments can be monitored via connections with one or more media interfaces, which are in turn realized by media modules in the system.

Environmental Equipment

Environmental equipment that the system can interact with includes three main classes:

1. Supporting equipment
2. Machine clients (i.e. network management systems)
3. Other servers (i.e. RMON probes)

Supporting equipment includes any external equipment that adds feature capability to the node itself in its monitoring role. In FIG. 12, the Modem 1206 and RAID array 1208 are considered to be of this supporting class. Many other types of supporting equipment may be interfaced to through CPCI option boards, PMC modules, or auxiliary interfaces.

Machine clients however, play a different role in that they have direct access to the managed objects of the system. Because of this, they can affect the behavior and state of the node and may be treated with the same security precautions as a human client. Machine clients supported by the node include SNMP managers and CORBA managers.

The application server itself may act as a higher-layer manager to a group of elements, which may be remotely located. In this case, the application server software may be running on a dedicated management workstation and uses CORBA as a direct object-level access protocol. Another example of a CORBA client would be a second level OSI NMS. The ODMG and other bodies have standardized on CORBA as the management interface above the element (EMS) level. The third class of equipment includes RMON probes.

Human Clients

Human clients fall generally into two categories:

1. Those clients who are directly connected to the node via a web browser
2. Those clients who are indirectly connected to a node via an intermediate manager For clients in the first category, the node provides authentication and access to resources based on user privileges and provisioned policies. For the second type of users (indirect), the intermediate management system provides the majority of authentication and policy enforcement. In this case, the node treats the management machine as a "trusted" user and only enforces provisioned blanket policies for the machine.

It should be noted that there may be situations where the node may be required to support both human and machine clients simultaneously. This type of situation is not precluded in the architecture.

In addition to these user categories, another sub-classification of users may be required based on how the client uses the node. For the present discussion, this sub-classification pertains to users from the first category (i.e. direct human clients). The sub-classification of these users can be based on the operations each class of user is interested in or allowed to perform. FIG. 13 is a table 1300 that lists these classes.

Application Server Module

The application server Module is the single point of user or management interaction with the monitoring node. In addition the application server Module acts as the CPCI "system controller" in any configuration, as such it resides in the system slot of a CPCI chassis. The hardware for this module can be a Pentium 4 based single board computer running Linux, for example. Table 13 lists some of the features of this module.

TABLE 13

Multi-user, multi session active web client interface
Enterprise Java Beans based UI servlets
Three-level RMON agent/proxy agent/manager functionality
Multi-interface RMON and Expert correlation capability
Object database for all configuration, event, statistics, alarm, expert, RMON and management objects
Extensible CORBA based communications between all subsystems
Client registry stores per-user session information including triggers, etc.
Multi-level privilege policies provided by security manager
Hardware auto-discovery, version checking and auto-configuration
Per-user logging of alarms, events, statistics and reports
Dedicated Ethernet management interface
Dedicated serial port with command-line interface for administrative and remote dial-up functions
Auxiliary Ethernet interface for non-service affecting maintenance functions (backup, etc.)

The application server is generally responsible for the functions listed in Table 14.

TABLE 14

Acting as the system controller in a CPCI backplane
Performing hardware detection, configuration and version management for Media Modules
Retrieving information from media modules for presentation to clients
Handling and dispatching events (alarms, traps, trigger events) from media modules
Providing a command line interface for initial system configuration and maintenance
Providing all direct (web) user interface functionality via HTTP/JAVA
Providing the primary management interface to machine clients (i.e. SNMP, CORBA, etc)
Providing system and application configuration interface to all human and machine clients
Detecting and reporting system faults (i.e. failed modules, etc.)
User session management (security, authentication, privileges, event registry, etc.)
Maintenance and upgrade functions (SW download adding new features/hardware, etc.)
Providing graphs, reports, topology maps, alarms and statistics to end users
Providing application customization via installable triggers
Providing correlated events and statistics across multiple interfaces (Media Modules)
Providing RMON functionality as a proxy agent for multiple sub-agents (Media Modules)
Providing RMON functionality as a correlation agent for multiple sub-agents (Media Modules)

Hardware Description

Figure 14:
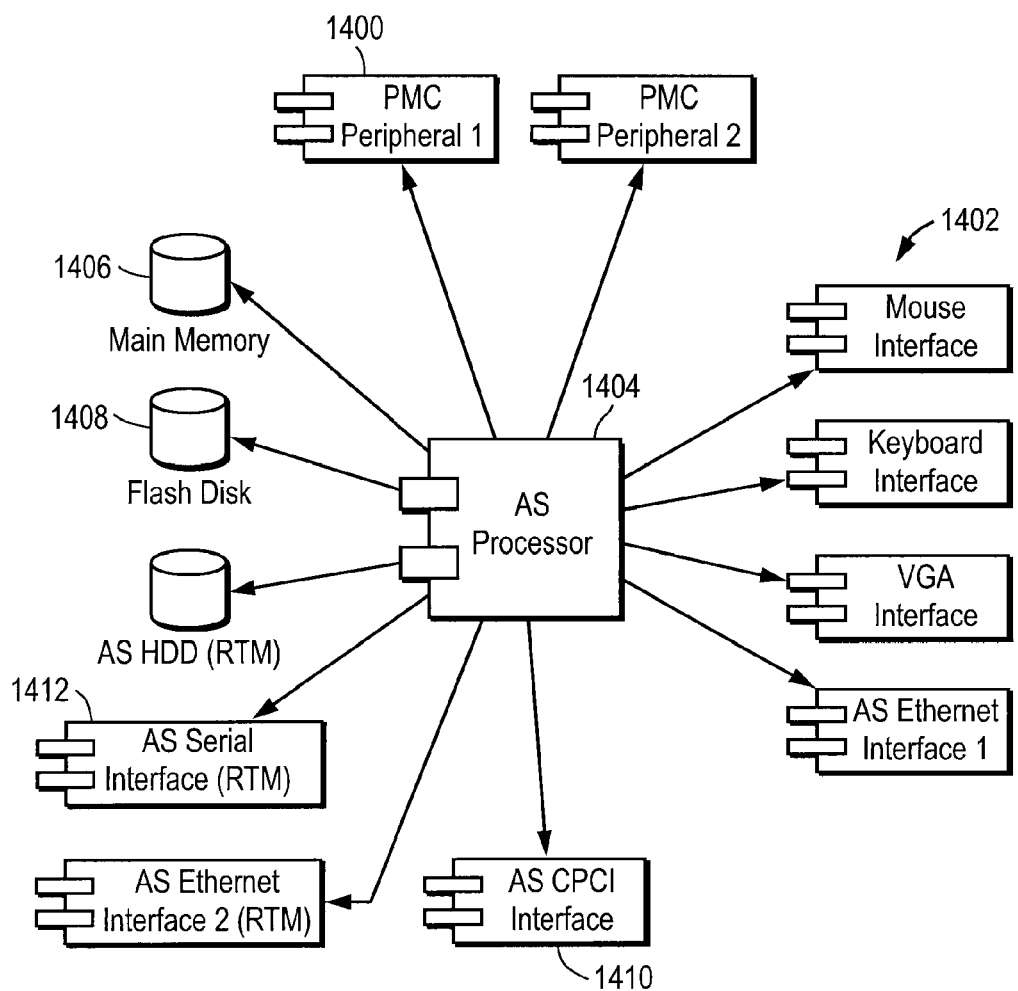
FIG. 14 is a high-level diagram that shows basic components of application server hardware.

As mentioned in a previous section, the application server software can rely on a CPCI single board computer board running Linux. This board is essentially a high-powered workstation on a CPCI module. FIG. 14 is a high-level diagram that shows the basic components 1400-1410 of the application server hardware. Illustrative components are briefly described in Table 15.

TABLE 15

PMC Peripherals 1400 - daughter-cards, I/O through front bezel
Front bezel interfaces 1402 - Standard I/O (mouse, keyboard, SVGA, 10/100 Ethernet)
AS Processor 1404 - e.g., Pentium 3, 850 MHz Intel processor
Main Memory 1406 - 1Gbyte SODIMM DRAM
Flash Disk 1408 - 128 Mbyte, on-board, non-volatile storage
AS CPCI Interface 1410 - CPCI system controller bridge
Rear Transition Module Interfaces 1412 - 40 Gbyte mini hard-drive, serial and second Ethernet Software Description This section will describe an illustrative software subsystems and interfaces which can comprise the application server module. A top-down approach will be used to introduce the overall architecture and each of the constituent subsystems. This architecture should be viewed as a basic model, which can be changed as more focused resources are added to the system.

Figure 15:
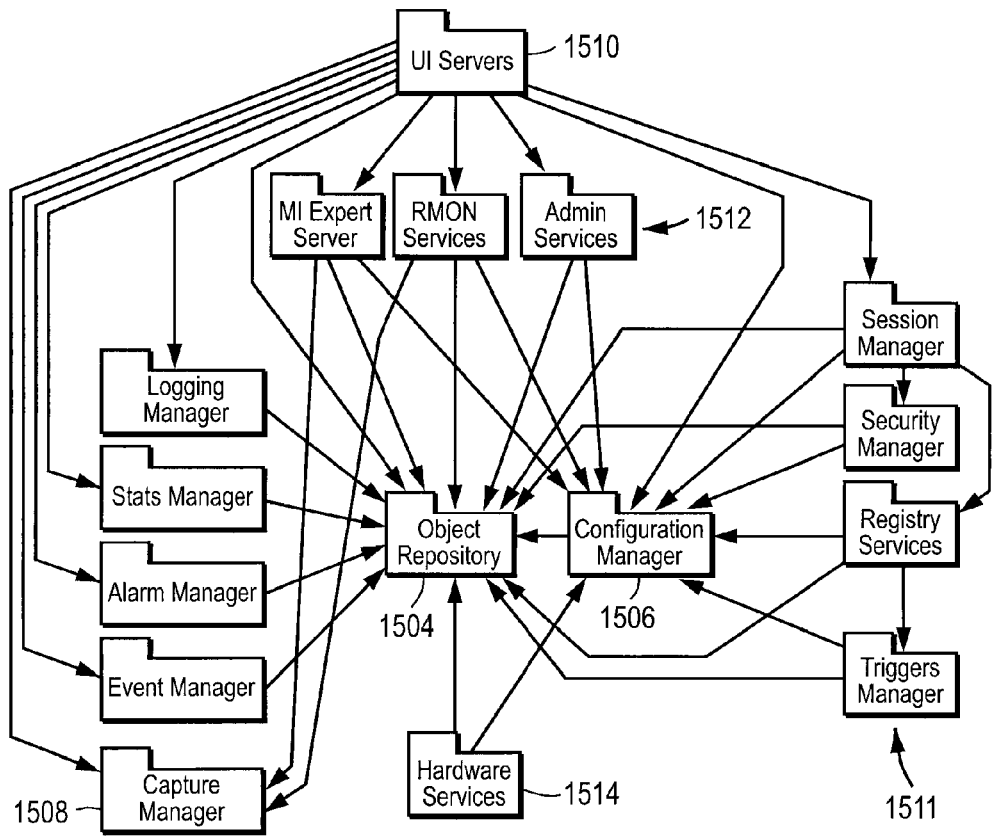
FIG. 15 shows the application server top-level subsystems and dependencies.

FIG. 15 shows the application server top-level subsystems and dependencies. In FIG. 15, a set of top-level packages, representing major architectural components are shown. In the following subsections, each will be described and further decomposed into additional subsystems with their descriptions. Preferably, the architecture is very centered around the common object repository 1504 (and configuration manager 1506). This repository is preferably an active object database, which supports event generation when certain operations are performed on (or attributes change in) active objects. As will be seen, this portion of the architecture is used to support inter-subsystem communications and triggering functions.

A set of common engines 1508 for supporting user interface functions (i.e. logging, statistics, alarm and event managers) is also shown in FIG. 15. These engines each provide a consolidated point for sending common types of information from various sources to the UI servers 1510.

Also shown in FIG. 15 is another set of related subsystems 1511, which handle user session management including security, registering for services, and setting up triggers. A set of subsystems 1512 provide analysis, monitoring and administrative services either directly to clients (i.e. RMON) or through the UI servers. Also shown is the hardware services subsystem 1514, which provides all access to hardware objects (Media Module), including events, configuration, statistics, and maintenance functions. Note that throughout this section it is assumed that inter-subsystem object access is provided through the object repository (via CORBA) and events are passed between subsystems using CORBA.

UI Servers

Figure 16:
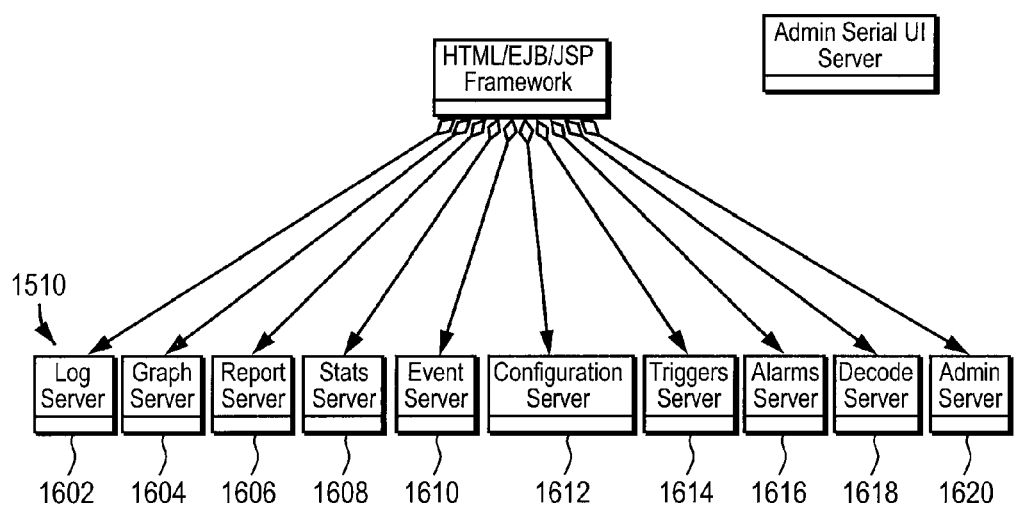
FIG. 16 shows the UI servers provided by the Application Server.

FIG. 16 shows the UI servers 1510 provided by the Application Server. The UI servers are responsible for providing web clients various UI elements for configuring the system or a session, creating triggers, creating and viewing reports, graphs and logs, viewing alarms, statistics and events, and performing maintenance or administrative functions.

There are two basic user interface presentation classes:
1. Web based UI
2. Serial configuration and administrative UI (command-line interface)

The web-based interface can rely on an Enterprise Java Beans (EJB) framework and can provide dynamic HTML generation via Java Server Pages (JSP) for passive clients. Optionally, the framework can support connections with active clients for providing an event interface and enhanced functionality. In the second case, clients may retrieve active applets (or beans) from the Application Server, which may use Java remote method invocation (RMI) to support real-time event notification and direct operations on the server. In addition, this mechanism allows a greater level of scalability by leveraging the power of the client machine for distributed graphics generation and logging, etc.

The serial UI is essentially a terminal (command-line) interface for administrative and maintenance functions such as setting the IP addresses of the node, running system diagnostics, etc. It should be noted that many of the administrative functions are available through the web interface as well.

Figure 17:
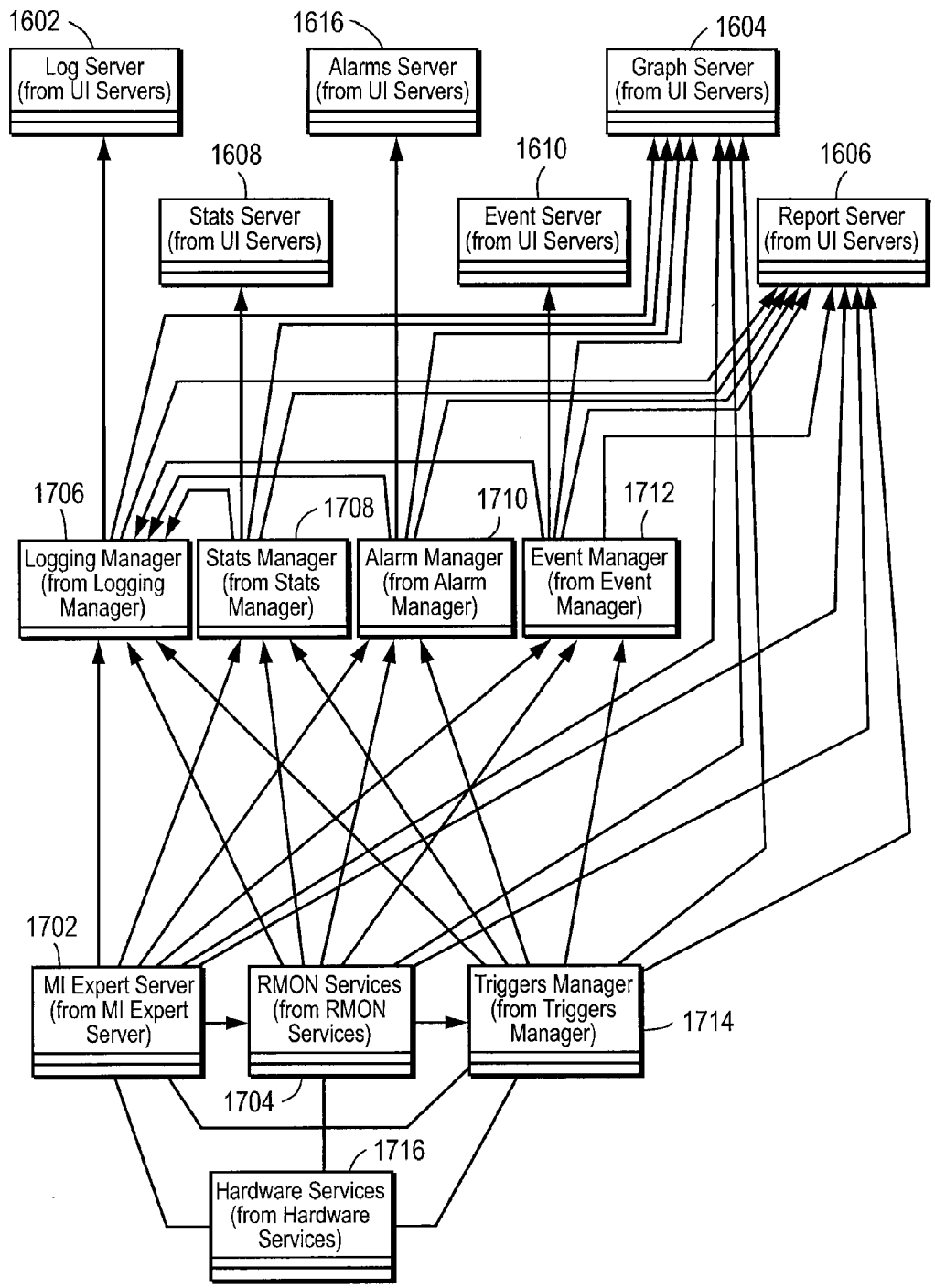
FIG. 17 shows the primary run-time flows between application server subsystems and UI servers.

FIG. 17 shows the primary run-time flows between application server subsystems and UI servers 1510.

The graphical UI components of FIG. 16 are briefly described in the following subsections.

Log Server 1602

The log server is the element that provides access to log files on a per user basis. Log files provide a time-stamped persistence mechanism for transient data and events. Logs may be created as user specific or as system global. The system global logs may be stored on the application server module, whereas user specific logs can reside on the application server or on the client machine (assuming an active client). The log server provides operations for creating, deleting, enabling and disabling each log. Per-user logs are created by adding alarms, triggers, statistics and events as "logged" in the user's registry entry. Global logs are created by adding alarms, triggers, statistics and events as "logged" in the SYSTEM registry entry. Once a log is created, it is accessible via the log server screens. The logging manager subsystem provides the actual functions for creating and adding entries to logs and dispatching information to the log server.

Graph Server 1604

The graph server is the element that provides access to various graphs on a per user basis. Graphs provide a useful mechanism for viewing of multi-dimensional data. Graphs may be generated based on user specified or system global data and events. The graph server provides operations for creating, deleting, enabling and disabling each graph view. Per-user graphs are created via the user's registry entry. Global graphs are created via the SYSTEM registry entry. The graph server additionally provides functions for creating and adding entries to graphs along with the graph type and criteria. Graphs may be generated using dynamic data or data from log files. In general the graph server receives data from the subsystems listed in Table 16.

TABLE 16

MI Expert Server
RMON Services
Logging Manager
Statistics Manager

TABLE 16-continued

Alarm Manager
Event Manager

Report Server 1606

The report server like the graph server provides access to report files on a per user basis. Reports may be generated based on user specified or system global data and events. The report server provides operations for creating, deleting, enabling and disabling each report view. The report server additionally provides functions for creating and adding entries to reports along with the report type and criteria. Per-user reports are created via the user's registry entry. Global reports are created via the SYSTEM registry entry. Reports may be generated using dynamic data or data from log files. In general the report server receives data from the subsystems set forth in Table 17.

TABLE 17

MI Expert Server
RMON Services
Logging Manager
Statistics Manager
Alarm Manager
Event Manager Statistics Server 1608

The statistics server is the element that provides access to groups of statistics on a per user basis. Statistics groups may be created as user specific or as system global. The system global statistics can be stored on the application server module, whereas user specific statistics can reside on the application server or on the client machine (assuming an active client). The statistics server provides operations for creating, deleting, enabling and disabling statistics groups. Adding statistics in the user's registry entry creates per-user groups. Adding statistics in the SYSTEM registry entry creates global groups. Once a statistics group is created, it is accessible via the statistics server screens. The statistics manager subsystem provides the actual functions for creating and adding entries to statistics groups and dispatching information to the statistics server.

Event Server 1610

The event server, like the statistics server provides access to groups of events on a per user basis. Event groups may be created as user specific or as system global. The system global events may be stored on the application server module, whereas user specific events can reside on the application server or on the client machine (assuming an active client). The event server provides operations for creating, deleting, enabling and disabling event groups. Adding events in the user's registry entry creates per-user groups. Adding events in the SYSTEM registry entry creates global groups. Once an events group is created, it is accessible via the event server screens. The event manager subsystem provides the actual functions for creating and adding entries to event groups and dispatching information to the event server.

Configuration Server 1612

The configuration server provides access to system configuration functions and information. Table 18 lists some of the types of configuration information available.

TABLE 18

Supported hardware and software versions, compatibility rules and default settings
Current hardware and software modules, types, versions, capabilities and status
Supported RMON functions and their status (enabled, etc.)
Supported Expert functions and their status (enabled, etc.)
Supported Administrative functions and their status (enabled, etc.)
User session information
Security and user policy information
User registry information
System and user triggers and their status (enabled, etc.)
Logging capabilities and their status (enabled, etc.)
Statistics capabilities and their status (enabled, etc.)
Alarm capabilities and their status (enabled, etc.)
Event capabilities and their status (enabled, etc.)

The configuration server relies primarily on the configuration manager for accessing system information, but also depends on administrative services and the session manager for controlling access to privileged configuration operations.

Triggers Server 1614

The triggers server is the element that provides access to triggers on a per user basis. Triggers may be created as user specific or as system global. The triggers server provides operations for creating, deleting, modifying, enabling and disabling triggers. The triggers server presents the system events and actions available to triggering functions. Adding triggers to the user's registry entry creates per-user triggers. Adding triggers in the SYSTEM registry entry creates global triggers. Once a trigger is created, it is accessible via the triggers server screens. The triggers manager subsystem provides the actual functions for creating and adding triggers and exchanges events and actions with other subsystems and the object database.

Alarms Server 1616

The alarms server, like the event and statistics servers, provides access to groups of alarms on a per user basis. Alarm groups may be created as user specific or as system global. The system global alarms may be stored on the application server module, whereas user specific alarms can reside on the application server or on the client machine (assuming an active client). The alarms server provides operations for creating, deleting, enabling and disabling alarm groups. Adding alarms in the user's registry entry creates per-user groups. Adding alarms in the SYSTEM registry entry creates global groups. Once an alarm group is created, it is accessible via the alarms server screens. The alarms manager subsystem provides the actual functions for creating and adding entries to alarm groups and dispatching information to the alarms server.

Decode Server 1618

The decode server provides various views of captured packets in a human readable format. The decode server receives data from the capture manager subsystem.

Administrative Server 1620

The administrative server provides a system administrator with a set of functions for provisioning, maintaining and managing the system. Access to these services is typically restricted from all users except those with administrative privileges. The administrative services subsystem provides the actual functions for administering the system and provides an interface to the administrative server (and the administrative serial UI server). Table 19 lists some of the operations available via the administrative server.

TABLE 19

General system setup and configuration
Access to the SYSTEM entry in the registry
Software download functions
Backup and restore functions
Adding and removing hardware modules
Maintenance functions
Etc.

MI Expert Server 1702 (See FIG. 17)

Figure 18:
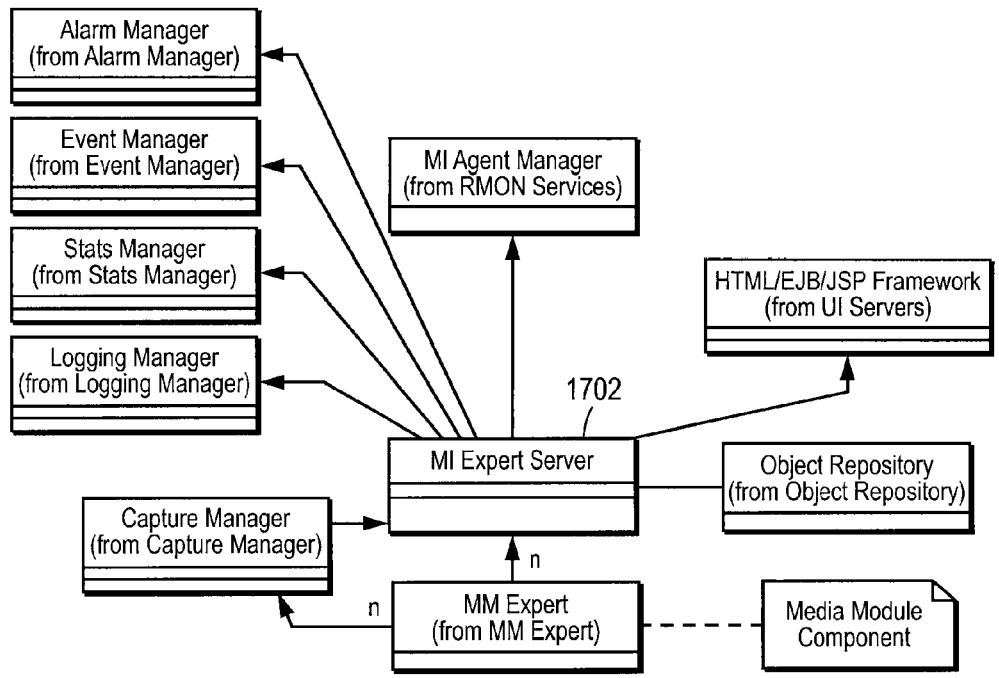
FIG. 18 is a diagram showing a Multi-Interface (MI) Expert server and its related subsystems.

FIG. 18 is a diagram showing the MI Expert server 1702 and its related subsystems. The MI expert server subsystem is responsible for creating, deleting, enabling and disabling expert monitoring and analysis functions on the application server. There are two basic modes of operation provided by the expert server:

1. Proxy expert mode
2. Multi-interface (MI) expert mode

In the proxy mode (much like the RMON proxy module), the expert server relays expert objects, alarms, statistics and events from media modules to one or more of the UI servers or supporting engines. In MI mode, the expert server collects expert objects, alarms, statistics and events from multiple media modules to perform correlation across multiple interfaces based on rules sets. This second mode may also be used to provide information to the application server RMON agent for correlation MIBs. Additionally, when in MI mode the expert server may request media modules to capture packet data to disk, which may be used to further correlate information across multiple interfaces. It should be noted that both modes could be in operation simultaneously.

RMON Services 1704 (See FIG. 17)

Figure 19:
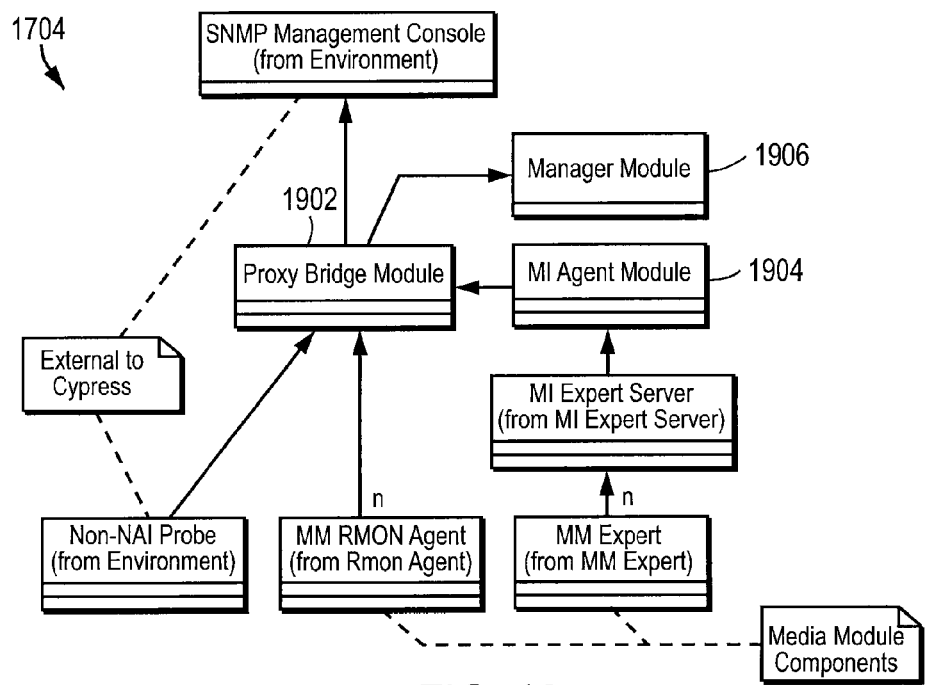
FIG. 19 depicts an RMON services subsystem and its primary flows.

FIG. 19 depicts an RMON services subsystem 1704 and its primary flows. The RMON services subsystem is responsible for providing access to local MIB objects for external SNMP management systems as well as internal UI servers. There are three basic subsystems provided by the RMON services on the Application Server:

1. Proxy (bridge) module 1902
2. Multi-interface (MI) agent module 1904
3. Manager module 1906

The proxy module (much like the expert proxy mode) relays SNMP objects alarms, statistics and events from agents on media modules and the MI agent to external SNMP managers, as well as to the local manager module.

The MI agent module provides correlation across multiple interfaces based on rules sets. This second module may use information generated by the MI expert to generate the correlation MIBs, which are available to external managers as well as to the local manager module.

The manager module collects information from the MI agent and the media module agents (and potentially external agents) for presentation to a direct (web) user. The manager module may rely on local engines (logging manager, statistics manager, event manager, alarm manager and capture manager) and the UI servers to provide RMON management views to users.

Note that this is but one illustrative architecture.

Administrative Services

The administrative services subsystem is responsible for providing administrative functions to a (direct) client with administrative privileges. Two user interface servers have access to the services provided by this subsystem:

1. Administrative Serial UI (CLI based)
2. Administrative Server (web based)

In addition, triggers may be configured to perform a subset of administrative functions based on system events, time of day, etc.

The functions listed in Table 20 below are available via the administrative services subsystem.

TABLE 20

Access to the SYSTEM registry entry
System and individual module reset functions
System and module initialization and self-test functions
Hardware installation and maintenance procedures
IP address provisioning
User login and authentication provisioning
Machine client login and authentication provisioning
User privilege levels and policy administration
System backup and restore functions
Software download functions
Type, version and compatibility verification for all hardware and software modules
System status reports Logging Manager 1706 (See FIG. 17)

Figure 20:
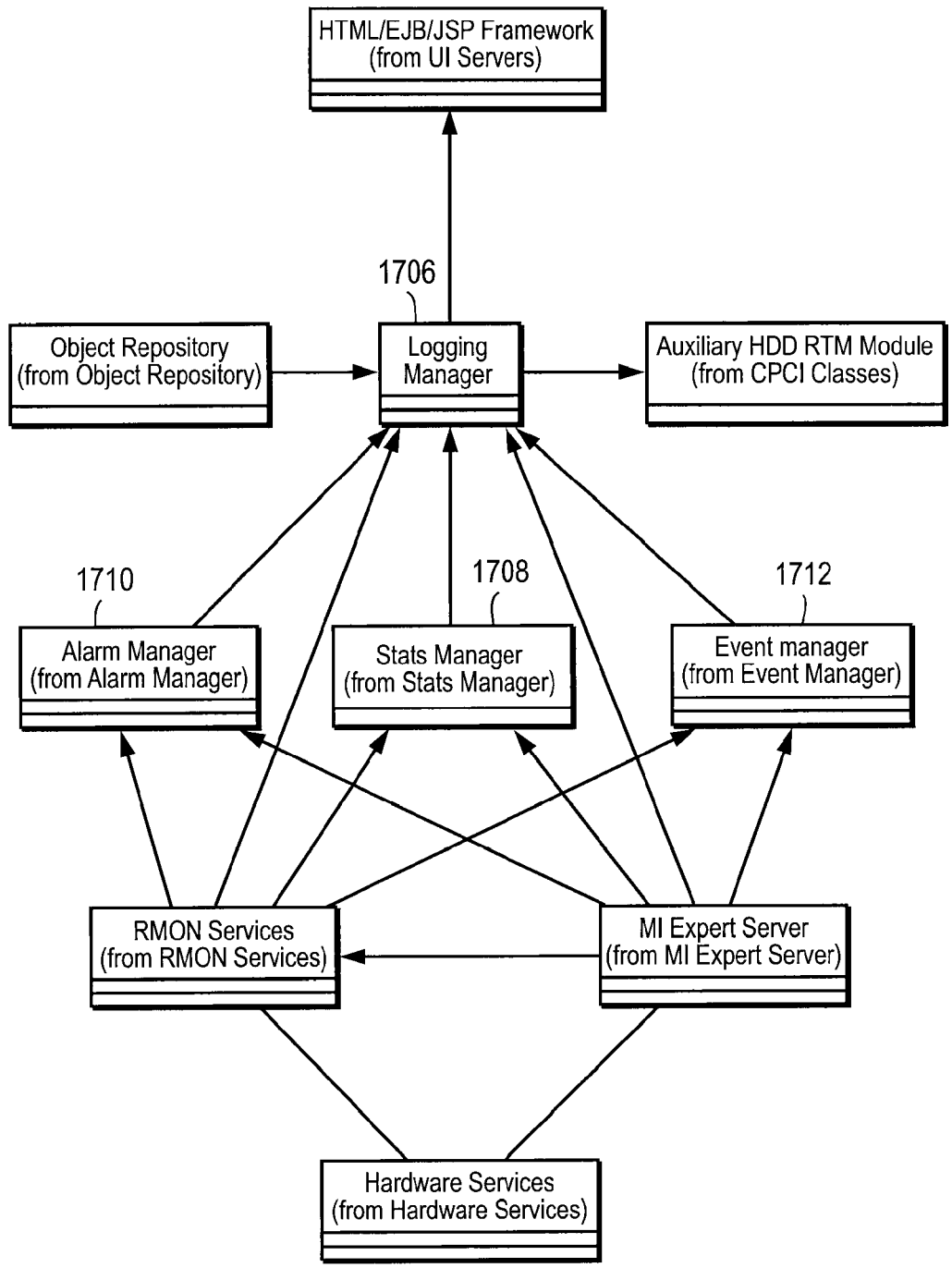
FIG. 20 shows the primary flows associated with the logging manager.

FIG. 20 shows the primary flows associated with the logging manager 1706. The logging manager subsystem is responsible for creating and storing system and user logs, which include time-stamped events, alarms, statistics, and other information as requested on a per session basis. In addition, the logging manager provides the requested log information to the log server UI element based on logging criteria in the user and SYSTEM registry entries. The logging manager uses the application server hard drive to persist this data and may additionally use secondary storage (i.e. a file server) for extended capability. It should be noted that equivalent functionality may be provided on each media module when equipped with a local hard drive. In this case, the logging manager on the application server treats each logging manager on the media modules as a remote file server.

Statistics Manager 1708 (See FIG. 17)

The statistics manager 1708 is a common shared resource for all application engines (i.e. RMON, Expert, etc.) on the application server and equivalent functions on the media modules. This subsystem is used to provide (dispatch) statistics to the statistics server, graph server and report server UI elements, as well as to the logging manager. The various statistics may be dispatched based on intervals, change occurrence, etc. as defined in the user and SYSTEM registry entries. This subsystem provides dispatch filtering on a per user basis for multiple client sessions. System triggers may be provided by this subsystem to invoke actions based on statistics. The actual statistics objects are maintained in the object repository.

Alarm Manager 1710 (See FIG. 17)

The alarm manager 1710 is a common shared resource for all application engines (i.e. RMON, Expert, etc.) on the application server and equivalent functions on the media modules. This subsystem is used to provide (dispatch) alarms to the alarms server, graph server and report server UI elements, as well as to the logging manager. The various alarms may be dispatched based on severity, intervals, change occurrence, etc. as defined in the user and SYSTEM registry entries. This subsystem provides dispatch filtering on a per user basis for multiple client sessions. System triggers may be provided by this subsystem to invoke actions based on alarms (i.e. dial a pager, etc.). The actual alarm objects are maintained in the object repository.

Event Manager 1712 (See FIG. 17)

The event manager 1712, like the alarm manager 1710 is a common shared resource for all application engines (i.e. RMON, Expert, etc.) on the application server and equivalent functions on the media modules. This subsystem is used to provide (dispatch) alarms to the events server, graph server and report server UI elements, as well as to the logging manager. The various events may be dispatched based on severity, intervals, change occurrence, etc. as defined in the user and SYSTEM registry entries. This subsystem provides dispatch filtering on a per user basis for multiple client sessions. System triggers may be provided by this subsystem to invoke actions based on events.

Capture Manager

The capture manager subsystem, like the logging manager is responsible for creating and storing trace files, which include filtered packets as requested on a per session basis. In addition, the capture manager provides the requested information to various clients including the decode server UI element, based on capture criteria in the user and SYSTEM registry entries. The capture manager uses the application server hard drive to persist this data and may additionally use secondary storage (i.e. a file server) for extended capability. It should be noted that equivalent functionality may be provided on each media module when equipped with a local hard drive. In this case, the capture manager on the application server treats the capture managers on the media modules as a remote file server.

Object Repository 1504 (see FIG. 15)

Figure 21:
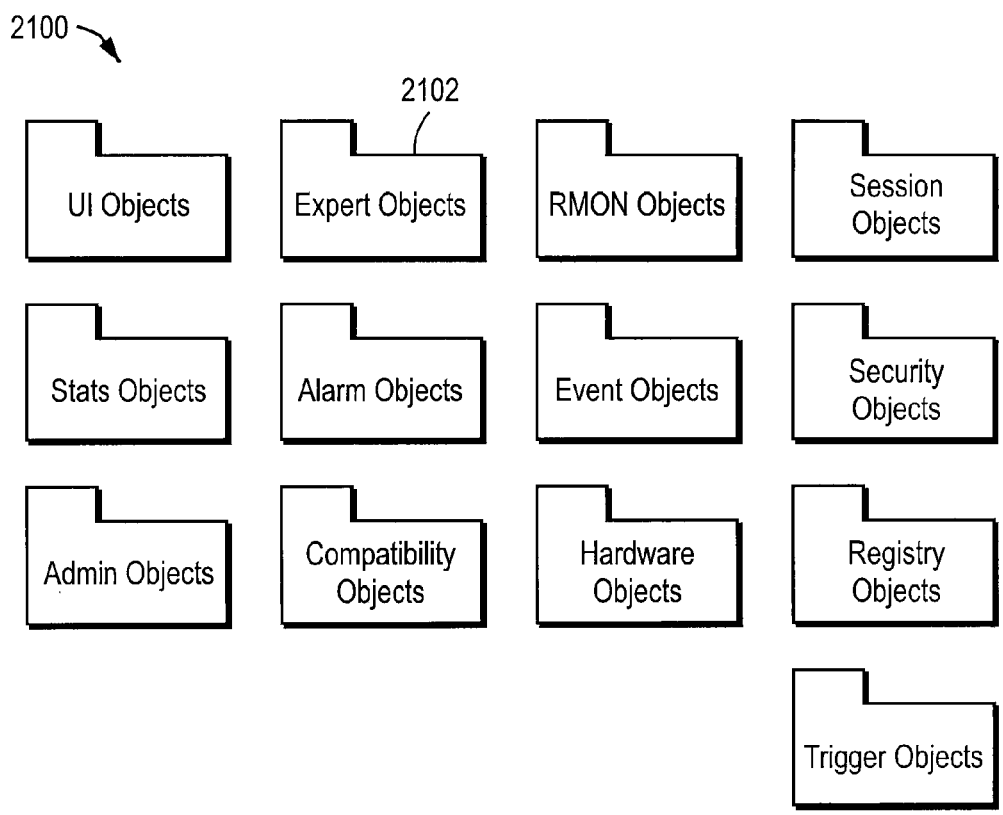
FIG. 21 depicts several application server object repository packages.

FIG. 21 depicts several application server object repository packages 2100. The object repository 1504 is the heart of the application server and is used to store all application server objects. Virtually all application server subsystems use the object repository to store and access their objects. Several types of objects 2102 in the object repository are shown in FIG. 21.

The object repository can also provide active object capabilities meaning that objects may create notification events on creation, deletion or change of state. This functionality may be used as a triggering mechanism allowing virtually any system capability to be invoked by triggers.

Configuration Manager

Figure 22A:
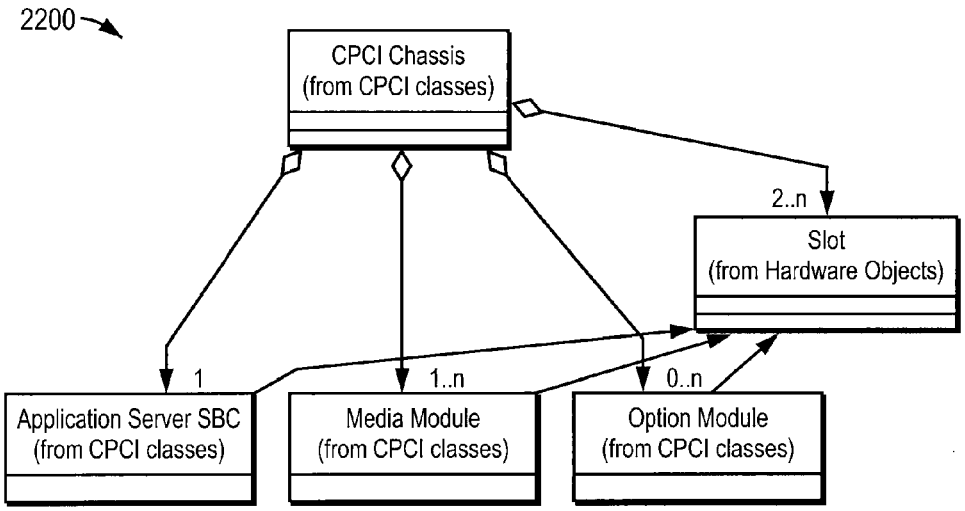
FIG. 22A shows an example managed object containment view of a node as seen by the application server.
Figure 22B:
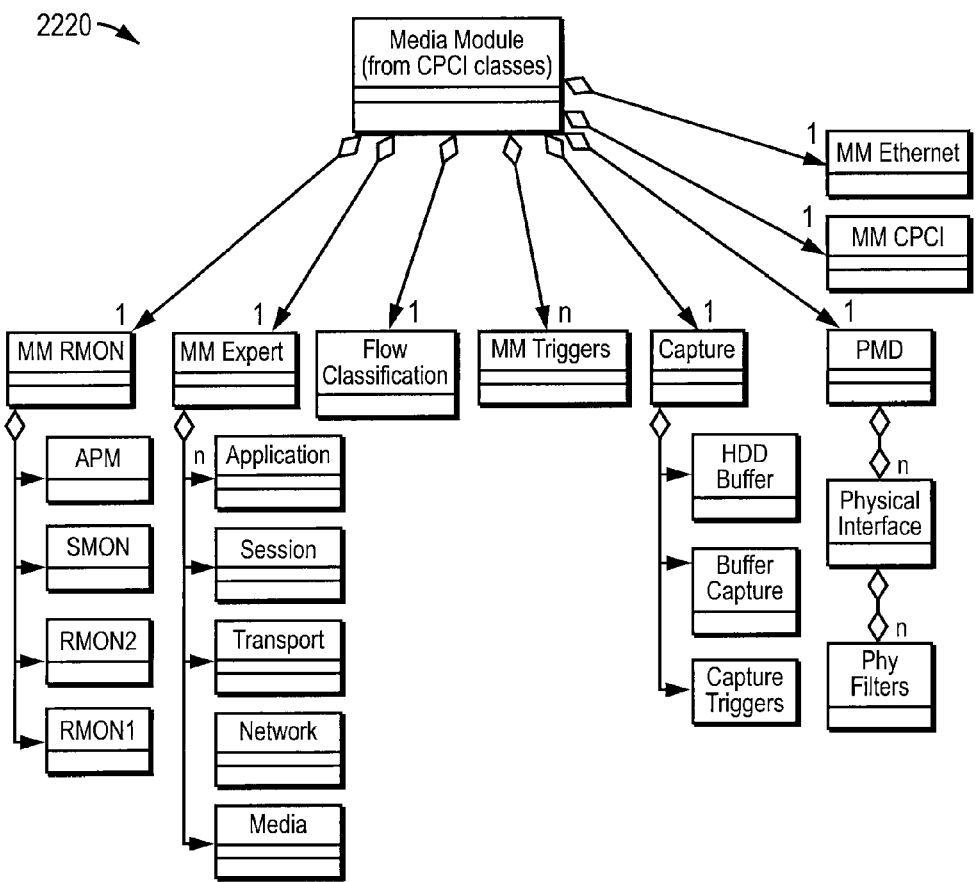
FIG. 22B depicts an example managed object containment view of a media module as seen by the application server.

FIG. 22A shows an example managed object containment view 2200 of a node as seen by the application server. FIG. 22B depicts an example managed object containment view 2220 of a media module as seen by the application server.

The configuration manager is responsible for providing all access to managed objects in the system. This includes managing the state and availability of hardware objects, compatibility objects, application objects, administrative, session and security objects, UI objects and trigger objects.

The managed objects accessed by the configuration manager are not the actual transient objects produced by applications, but are rather configuration objects, which control and reflect the state of applications, hardware, etc. Note that the media module object is created upon insertion into the chassis. The media module sub-objects reside on the media module.

Figure 23:
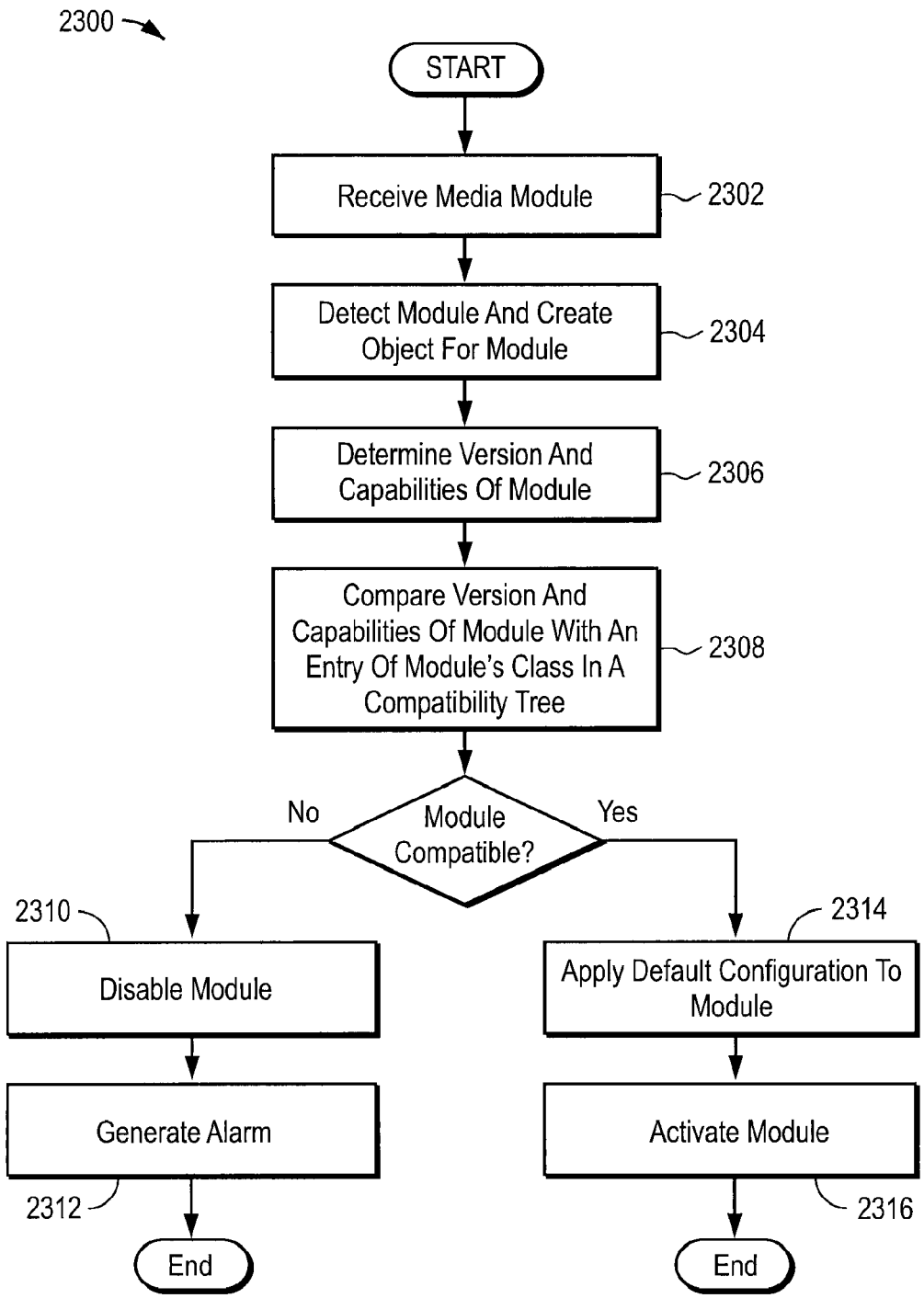
FIG. 23 is a flow diagram of a process in which the configuration manager uses the compatibility objects as a rules base for managing version and capability relationships between the system and its modules (hardware and software).

FIG. 23 is a flow diagram of a process 2300 in which the configuration manager uses the compatibility objects as a rules base for managing version and capability relationships between the system and its modules (hardware and software). In operation 2302, a media module is received into the chassis. The application server detects the module and creates an (root) object for it in operation 2304. The version and capabilities of the module are detected in operation 2306, and in operation 2308, are compared with an entry of its class in the compatibility tree. If the version is incompatible, the new module is disabled in operation 2310 and an alarm is generated in operation 2312. Otherwise, the default configuration is applied to the module in operation 2314 and in operation 2316, the module is activated. The state of the module and all of its sub-objects are now available for further operations. This same process may apply for any additional hardware or software modules.

Session Manager

The session manager is responsible for controlling users logging into the system, authenticating them, validating access privileges, etc. The session manager uses the security manager, configuration manager and registry services subsystems to perform much of this functionality. In addition, previously created session configurations may be loaded for the client by the session manager.

Security Manager

The security manager provides authorization levels to users based on provisioned privilege and authentication policies.

Registry Services

The registry services subsystem provides a capability to associate items of interest to individual users of the system or to the system itself. The registry can have two major classes of entries:

1. "User" entry
2. "System" entry

Where the system entry is a global entry, which can only be accessed by the system administrators or users with appropriate privileges. The user entries are created when a user configures a session on the system. In both cases, the types of information listed in Table 21 are maintained in the registry:

TABLE 21

The set of triggers associated with the user or system and their state.
The set of alarm objects the user or system has registered to receive.
The set of event objects the user or system has registered to receive.
The set of statistics objects the user or system has registered to receive.
The set of reports (and their criteria) for the user or system.
The set of graphs (and their criteria) for the user or system.
The set of logs (and their criteria) for the user or system.

In general items the SYSTEM registry entry are those that are viewed as "always important" on a global basis. These items may be available for viewing by all users, higher-level managers, etc. or according to individual user policies. The registry therefore creates a type of customizable steering mechanism that prevents events and data, which are not of interest to everyone from flooding all clients.

Figure 24:
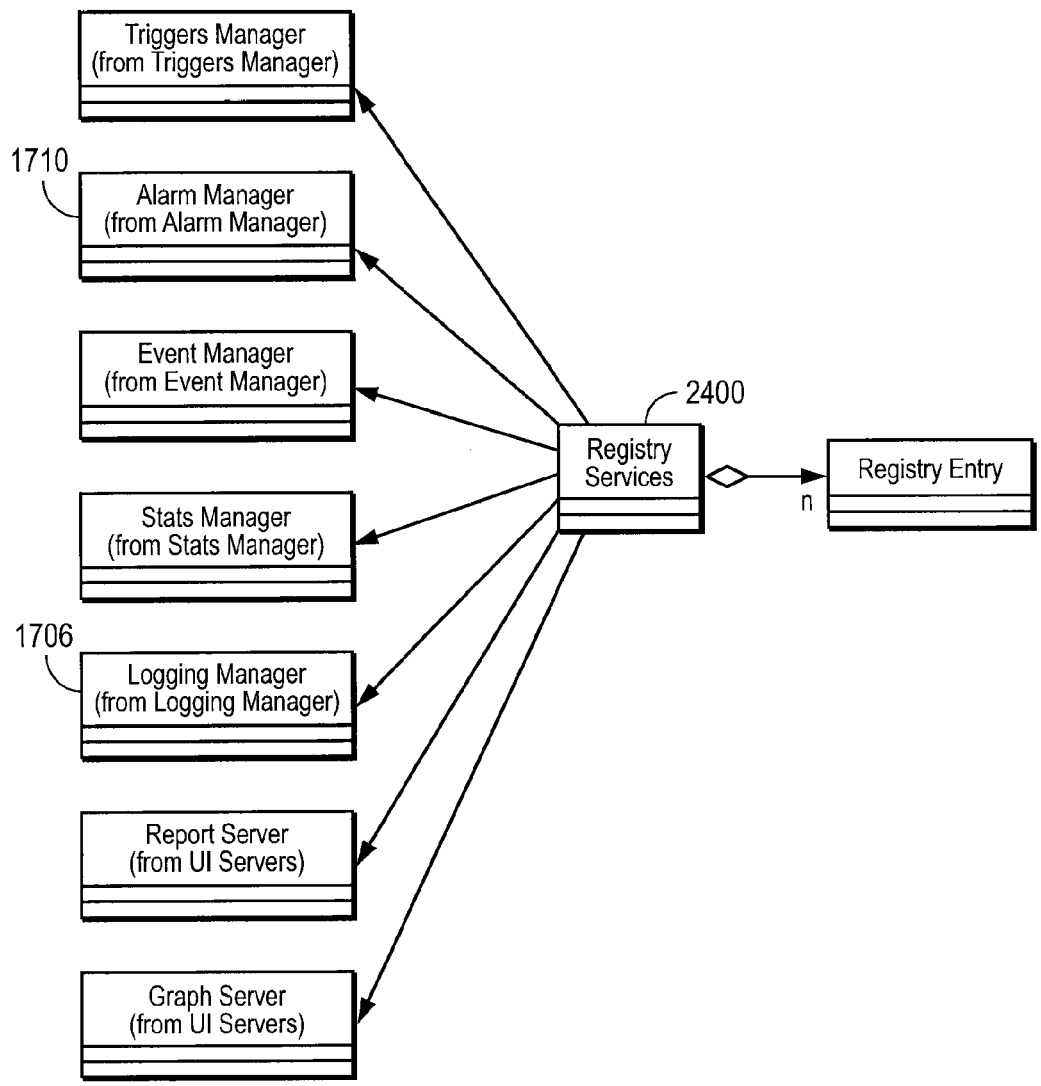
FIG. 24 show some of the relationships between the registry services and other subsystems.

FIG. 24 show some of the relationships between the registry services 2400 and other subsystems. FIG. 25 depicts registry entry object associations 2500.

Triggers Manager 1714 (See FIG. 17)

FIG. 26 shows a collection of triggers 2602 and trigger groups 2604. The triggers manager 1714 is indirectly responsible for the creation, deletion, activation and deactivation of triggers and directly responsible for the scheduling and invocation of actions based on triggers. This includes listening for events for enabled triggers, evaluating conditions required to fire the trigger, and invoking the action(s) for the trigger. The set of triggerable events and actions needs to be published by each subsystem via the configuration manager (i.e. through the managed objects for the subsystem). Trigger groups may be created per-user or globally via the registry.

Hardware Services 1716 (See FIG. 17

The hardware services subsystem provides all event and object communication between the application server and other system modules. This includes CPCI backplane drivers, hardware detection and initial configuration, interrupts, data transfers, etc. Table 22 lists two mechanisms for communication over the CPCI backplane.

TABLE 22

IP over PCI
Native PCI (memory mapped)

The first mechanism allows the application server flexible access to all media modules in the system using an IP transport. This mode can be used to provide RMON (SNMP) access to agents on media modules and supports other direct object access protocols. Since the majority of traffic between media modules and the application server is based on configuration, events and statistics the performance is adequate. The second mechanism provides a "raw" transfer mode using the PCI (memory mapped) target/initiator approach. In this mode, very high-speed shared memory transfers are possible using the PCI burst DMA mechanism. This mode may be useful for accessing trace files captured to disk on the media modules, etc.

Media Module

The media module is effectively a single-board, real-time monitor/analyzer and is the single point of network monitoring for the monitoring node. In addition the media module acts as a CPCI (master/slave) "peripheral controller" in any configuration and as such it may always reside in a peripheral slot of a CPCI chassis. The hardware for this module includes multiple microprocessors, FPGAs and other application-specific circuitry. The media module supports Gigabit Ethernet (and others). The main processor on the media module can run a real-time embedded OS (VxWorks). Table 23 lists some of the features of this module.

TABLE 23

Two fully independent pipelined RISC processors providing over 1.6 GHz total performance
Common, reusable base design (media independent portion)
Application-specific PMD subsystem encapsulates all media-dependent functionality
Dedicated FPGA engines for PMD, capture, filtering and other HW assist functions
Flexible multi-stage HW filtering including adaptive modes for loss-less flow processing
Wire-speed capability for capture and low-level statistics
Multi-level RMON functionality - RMON 1, RMON 2, RMON 3 (TPM and APM)
Multi-level Expert monitoring - Media, Network, Transport, Session, Service and APM
Multi-mode adaptive filtering for Expert functions
Per-application time-slice priority scheduling for "Roving Expert" mode
On demand enabling of additional expert functions in diagnostic modes
On-board RMON agent functionality
Flexible triggers support for application customization
Persistent logging of alarms, events, statistics and reports
Optional secondary (HDD) capture storage
Dedicated supplementary Ethernet management interface The media module is generally responsible for the functions listed in Table 24.

TABLE 24

Acts as self-contained monitor/probe in system
Provides capability, configuration and version information to application server
Dispatches events (alarms, traps, trigger events) to application server
Provides all monitoring functions for one or more network segments
Provides RMON functionality as a "virtual probe"
Provides maintenance and upgrade functions (SW download, new features/hardware, etc.)
Provides statistics, alarms, events, traces, RMON and expert objects to application server
Provides application customization via installable triggers The media module hardware and software architecture is optimized based on three main functions:
1. Flow Classification
2. RMON (1, 2,APMand TPM)
3. Expert Monitoring (APM, TPM and diagnostics)

where 1, 2 and 3 above are interrelated as set forth in Table 25 and as shown in FIG. 27, which depicts the major subsystems of a media module 2700 and their dependencies.

TABLE 25

Flow classification is a core function used by RMON and Expert applications
Expert is a core function used by the APM, TPM and other components of RMON
Expert provides advanced APM functions (i.e. added value above RMON APM)
RMON and Expert interfaces are provided to the application server for access and presentation As will be seen in the following sections, the media module is architected to optimize performance for each of these functions. This optimization consists of application specific hardware, distributed filtering and partitioning of software on multiple processors to provide the highest levels of run-time performance. The majority of this optimization revolves around the flow classification function, as this is central to all other functions on the media module.

Hardware Description

Figure 28:
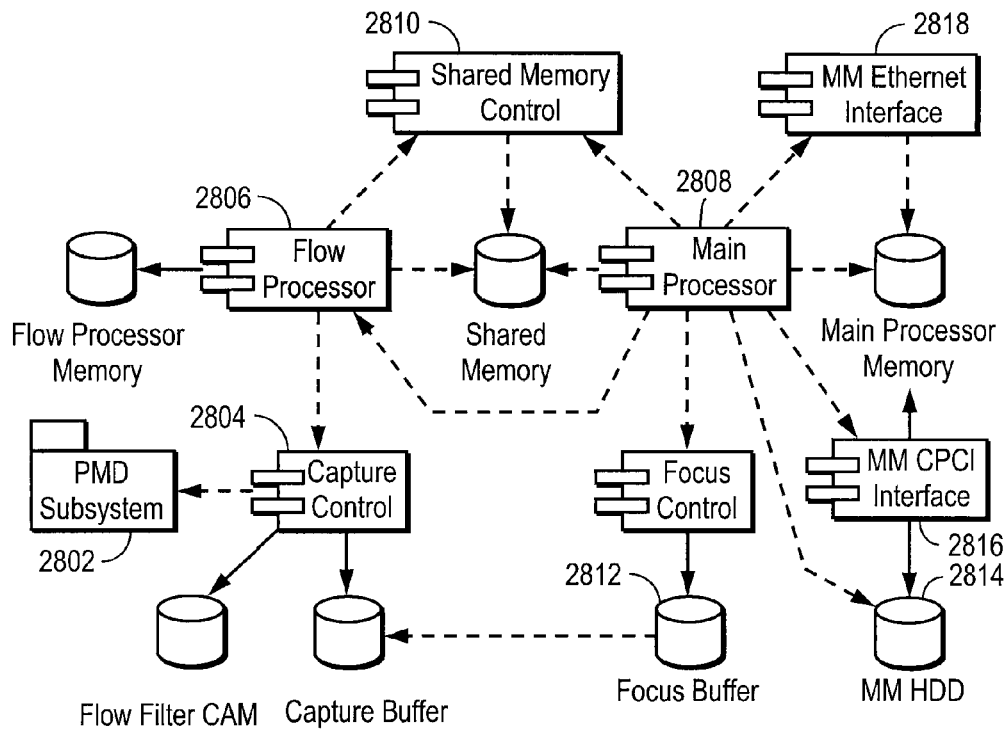
FIG. 28 is a high-level diagram that shows basic components of the media module hardware and dependencies.

As mentioned in a previous section, the media module is preferably a CPCI single board hardware/real-time software module. This board is essentially a high-powered monitor/analyzer on a CPCI module. FIG. 28 is a high-level diagram that shows the basic components of media module hardware and dependencies. Each of the hardware components and subsystems will be described in the following sections.

PMD Subsystem 2802

Figure 29:
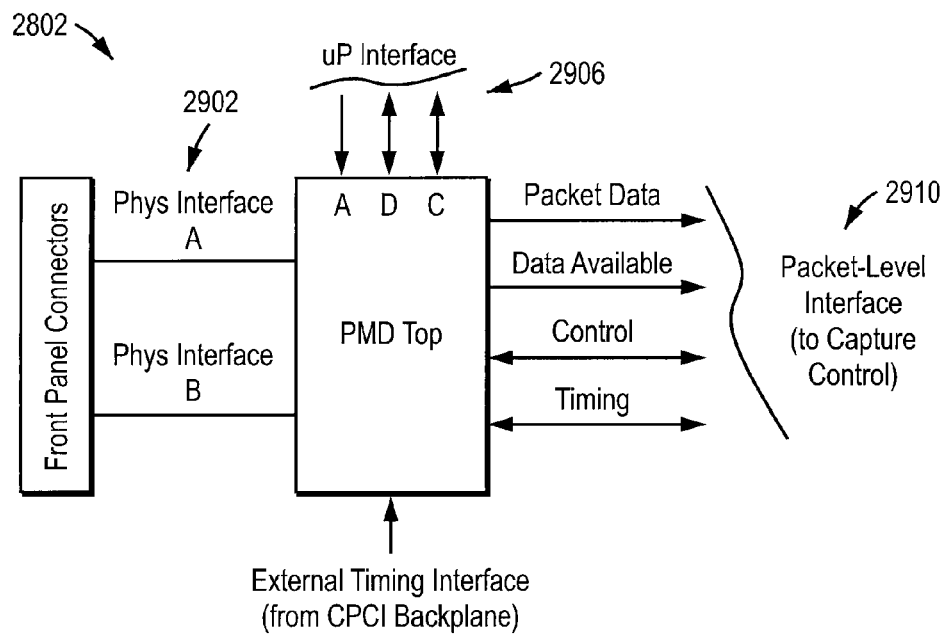
FIG. 29 shows a top-level view of a PMD subsystem.

FIG. 29 shows a top-level view of the PMD subsystem 2802. The PMD subsystem provides the items listed in Table 26.

TABLE 26

A low-level protocol termination (e.g. GbE, ATM, POS, etc.) for each interface
Configuration for each interface according to the application
Alarms, statistics and counts for each interface and protocol termination
Filters for including or excluding low-level protocol units for further processing
Tables for associating endpoints or connections with their respective errors, counts and statistics
Signaling termination for media types that contain control flows (i.e. ATM, etc.)
Synchronizes to external timing sources for frequency traceability (timestamp correlation)
Packet reassembly for processing by the flow classification engine
Pre-pending each packet with a timestamp/status descriptor
Multiplexing packets from multiple interfaces into a single packet stream (PLI)
Performing flow control and elastic buffering for timing decoupling Associated with each PMD type is a "media expert" function, which both encapsulates and provides a well-defined interface to the above functions. The media expert may be implemented as a combination of hardware and software. The software portion may be implemented in a dedicated task on the media module main processor, or in a dedicated PMD processor. For simpler protocols (Ethernet, etc.) the task approach can be used, whereas for more complicated protocols (that involve complex signaling), a dedicated PMD processor is preferable. In addition, the PMD is responsible for providing a packet-level interface to the flow classification engine. Since the flow classifier only understands packets, any cell or other transport streams may be reassembled prior to presentation to the capture control interface.

The PMD subsystem prepends each packet passed on to the capture subsystem with a descriptor containing the information listed in the Table 27.

TABLE 27

Timestamp
Frame type (control, etc.)
Interface ID and direction
Error status (i.e. too short, too long, etc.)
Original length
Truncated length TABLE 27-continued Total length (including prepended descriptor)
Etc.

In addition the PMD maintains all interface counts appropriate to the media (packets, bytes, too long, too short, etc.) as well as any alarm status and control.

Physical Interfaces 2902

The physical interfaces may be optical or electrical, depending on the media type. For Gigabit Ethernet, these interfaces can be optical and can be provided by GBIC devices.

External Timing Interface 2904

The timing interface provides a mechanism to use an outside timing source for providing per-packet timestamps. This may be used to synchronize the timing across multiple media modules in different locations. The external timing interface may be provided to all media modules in a shelf system by a set of predefined signals on the CPCI backplane. The source of these timing signals can be an optional GPS (or other) timing module.

uP Interface 2906

The uP interface provides the media module (main) processor access to all configuration and status registers, memories, etc for the PMD. In the cases where a dedicated PMD processor exists, this interface may utilize a shared memory mechanism.

Packet Level Interface 2910

The packet level interface is used for transferring pre-filtered packets to the capture subsystem. This interface provides a unified (multiplexed) stream containing packets received from all physical interfaces that are destined for capture or queuing. This interface either provides timing to or receives timing from the capture subsystem. Buffering within the PMD resolves the timing boundary issues across this interface. The capture subsystem can use a demand-driven transfer mechanism to retrieve packets when available from the PMD.

Capture Subsystem 2804 (See FIG. 28)

Figure 30:
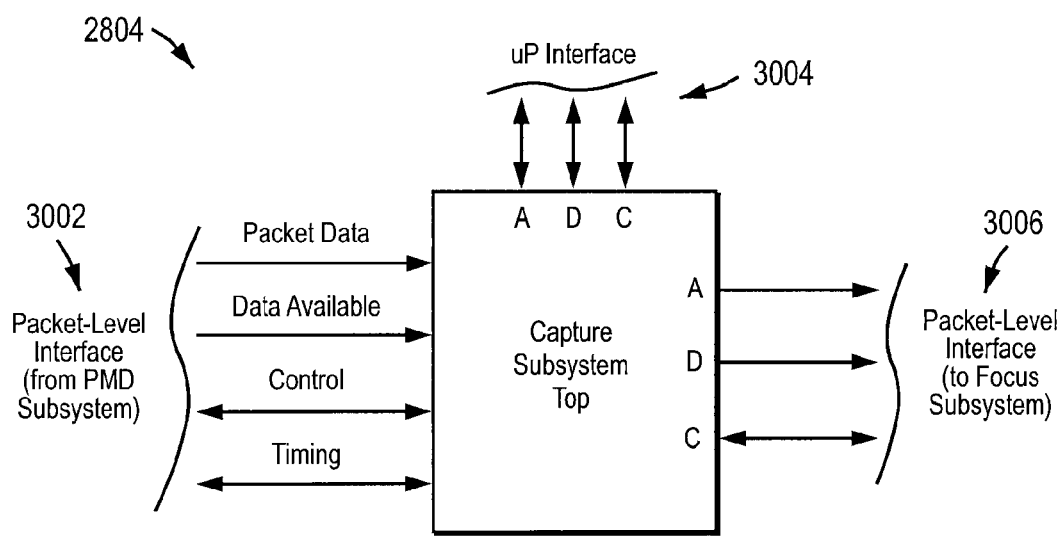
FIG. 30 shows a top-level view of a capture subsystem.

The capture subsystem provides filtering and buffering for packets received from the PMD, an interface to the flow processor for accessing packets in the capture buffer and an interface for forwarding a selected subset of the captured packets to the focus buffer. In this respect, the capture subsystem provides a triple-ported interface to the capture buffer. FIG. 30 shows a top-level view of the capture subsystem 2804.

The capture subsystem provides the functions listed in Table 28.

TABLE 28

Packet buffering (1 Gbyte) supporting multiple operating modes
Raw-mode capture at wire speed (for Gigabit)
Wire-speed packet filtering supporting multiple operating modes
Wire-speed priority queuing for selected flows (128K priority flows)
Packet transfer (DMA) into capture buffer from PMD subsystem
Packet transfer (DMA) from capture buffer to focus buffer TABLE 28-continued Packet transfer (DMA) from capture buffer to flow processor via uP interface
Direct access (non-DMA) for flow processor via uP interface
Hardware triggers for starting and stopping capture in diagnostic mode Packet Level Interface 3002

The packet level interface is the source of all packet data to be processed by the capture subsystem. The capture subsystem retrieves packets from the PMD whenever packets are available as indicated by the PMD. This interface uses DMA to transfer packets into the capture buffer after parsing and filtering each received packet.

uP Interface 3004

The uP interface provides the media module (flow) processor access to all configuration and status registers, memories, etc for the capture subsystem. This interface is the source of all packet data to be processed by the flow processor and is controlled exclusively by the flow processor. This includes setting up filters and triggers, managing queues and initiating DMA transfers for forwarding selected packets on to the focus buffer. This interface can support an on-demand hardware packet transfer mechanism (DMA) into the flow processor's local memory to alleviate timing contention for the capture buffer.

Focus Buffer Interface 3006

The focus buffer interface is used for transferring packets from the capture buffer into the focus buffer. This forwarding uses DMA and is under control of the flow processor. Operationally, once the flow processor has analyzed a packet in the capture buffer, a decision is made whether to forward the packet on or not. If the packet is to be forwarded, the flow processor initiates the transfer across this interface. A control mechanism can exist to indicate when the focus buffer is full.

Capture Modes

The capture subsystem provides two primary modes of operation, and several sub-modes within each primary mode. The primary modes are listed in the Table 29.

TABLE 29

Diagnostic Mode
Monitoring Mode

In diagnostic mode the capture buffer takes snapshots of data from the line and provides basic (pattern) filtering capabilities. The buffer modes supported in diagnostic mode include those listed in Table 30.

TABLE 30

Fill and stop
Wrap

In fill and stop mode, when a capture is initiated (usually by a trigger), the buffer fills linearly until full or a stop trigger is fired. In the wrap mode, the buffer is continuously being overwritten with the most recent data from the line until a stop trigger is fired. The start and stop capture triggers are implemented in hardware and support stop after N (bytes) capability. This allows a user defined capture window with information both before and after the event of interest.

In monitoring mode, the capture buffer acts as a high performance FIFO queue. Table 31 below lists buffer modes supported in monitoring mode.

TABLE 31

Priority queuing
Non-priority queuing

In priority queuing mode, the buffer is segmented into two virtual queues: priority and non-priority. Each queue maintains and is accessed by separate head, tail and current offset pointers. Associated with the priority queue is a priority filter table (CAM), which contains information pertaining to the priority flows (e.g. address pairs, etc.) The buffer space for each queue is varies dynamically based on the arrival of packets that meet the priority criteria (i.e. have an entry in the priority filter). Initially all packets are considered non-priority, but as the flow processor identifies a flow as being "important", information about the stream of packets that comprise the flow is written back to the queue manager and tagged as priority.

As the number of priority flows increases, buffers are reallocated to the priority queue from the non-priority queue. Likewise when the number of priority flows decreases, buffers are reallocated to the non-priority queue. These queues effectively appear as separate FIFOs with varying depth and are completely managed by hardware.

This mechanism allows the flow processor to focus on servicing priority packets over non-priority packets to prevent data loss. To manage the aggregate packet rate and avoid dropped packets, the flow processor monitors the average depth of the priority queue and may selectively discard flows from the priority filter.

In the non-priority queuing mode, the capture buffer appears as a single FIFO and gives no particular preference to the packets being captured. Packets are therefore likely to be dropped in this mode.

Filtering Modes

The capture subsystem supports various hardware filtering capabilities depending on operating mode (i.e. diagnostic or monitor). In any mode, a dedicated 72 bit wide content addressable memory (CAM) is used to provide the filtering on 128K flows. In diagnostic mode, patterns may be entered into the CAM based on information contained in Table 32.

TABLE 32

Information in the PMD prepended descriptor (i.e. errored, interface ID, etc.)
Information contained in the DLC header (i.e. addresses, etc.)
Information contained in the L3 header (i.e. addresses, etc.)
Information contained in higher-layer headers (under evaluation)

In monitoring mode, the CAM is used as a priority flow recognition mechanism, which allows the flow processor to give priority to a set of flows that contain the provisioned L3 (or other) address pairs corresponding to packets of interest. What normally constitutes the criteria for flows of interest is an unbiased rate throttling mechanism, whereby a population of flows are given priority based on being already classified. This mechanism may be extended however by biasing the priority filter to focus on a set of flows which have some significance to the flow processor or other entity. In this case, only flows that match the focus criteria are given priority, effectively filtering out other "non-interesting" flows.

Flow Processor Subsystem 2806 (See FIG. 28)

The media module flow processor is a microprocessor subsystem dedicated to the task of flow classification. This processor is the main client of the capture buffer and pre-processes all packets for further analysis by the main processor. This processor stores the results of classification in shared memory and builds a descriptor for each packet forwarded on to the main processor (through the focus buffer). Tasks on the main processor may identify a flow as being important by tagging its flow record in the shared memory, which the flow processor subsequently uses as criteria for forwarding additional packets of that flow. This mechanism provides another type of adaptive filtering capability to reduce the probability of dropped packets for post-classification analysis. This processor can have its own dedicated program and data memories as well as access to the shared memory. The processor may or may not require an OS.

Main Processor Subsystem 2808 (See FIG. 28)

The media module main processor can be, for example, an 800 MHz PowerPC dedicated to providing general application support for the media module. In addition, the main processor subsystem provides the functionality set forth in Table 33.

TABLE 33

All expert monitoring/analysis functions using results from the flow processor
RMON (1,2 and APM) agent functionality via results from the flow processor and expert
Provides all access to the focus buffer (e.g. for the expert task)
Executes all trigger functions, with the exception of hardware triggers
Provides alarm, event and object access services to application server
Provides persistence and aggregation for transient (expert and flow) objects as required
Provides configuration interface to the application server as well as local applications
Provides FLASH based storage for critical configuration information
1 Gbyte of main (SDRAM) memory
Manages and shares data for all CPCI bus access
Provides 10/100 Ethernet interface
Encapsulation of all filtering and capture diagnostic services
All self-test and maintenance functions This processor can run the VxWorks real-time embedded operating system.

Shared Memory Subsystem 2810 (See FIG. 28)

Figure 31:
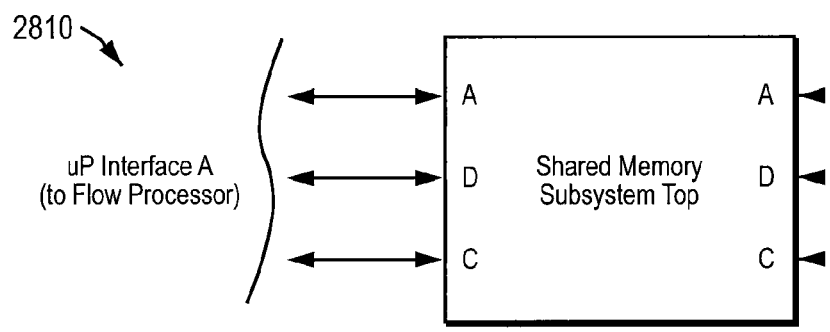
FIG. 31 shows a top-level view of a shared memory subsystem.

FIG. 31 shows a top-level view of the shared memory subsystem 2810. The shared memory subsystem provides a data and event communication mechanism between the flow processor and the main processor. This memory is made equally available to the two processors via arbitration. All flow records created by the flow processor are stored in this memory in addition to per-packet parse descriptors. The descriptors are queued to allow the main processor to perform asynchronous processing of packets from the flow processor. In addition, the main processor may write-back pointers and flow control (filter) information in the shared flow records as a feedback mechanism for selecting a focus set. This subsystem also serves as the download, configuration and status mechanism for the flow processor and FPGAs.

Focus Subsystem 2812 (See FIG. 28)

Figure 32:
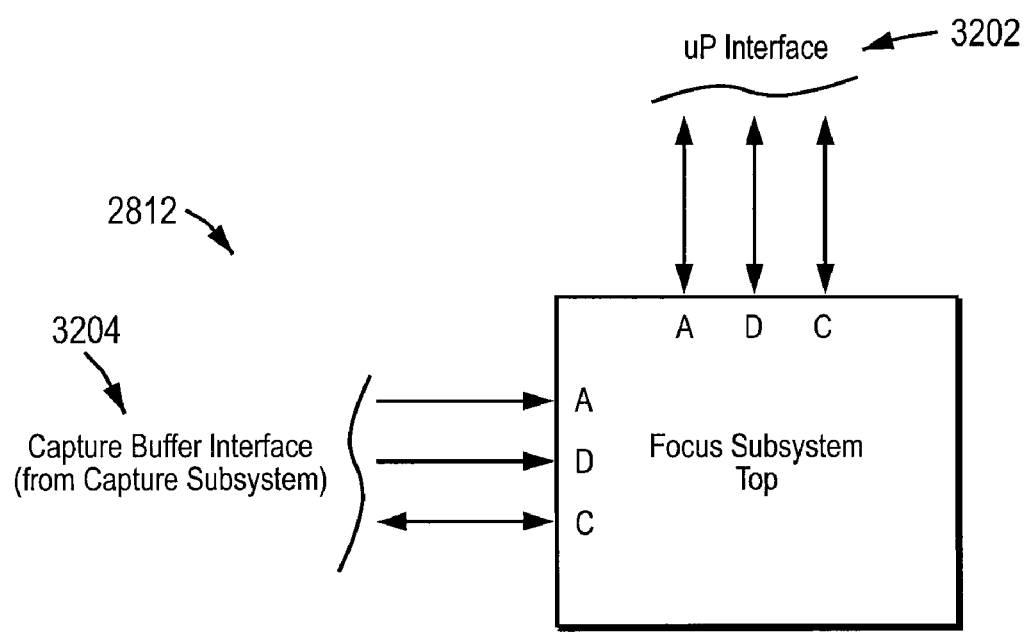
FIG. 32 shows a top-level view of a focus subsystem.

The focus subsystem provides buffering for packets received from the capture subsystem and an interface to the main processor for accessing those packets in the focus buffer. In effect, the focus subsystem provides a dual-ported interface to the focus buffer. FIG. 32 shows a top-level view of the focus subsystem 2812.

The focus subsystem provides the functionality listed in Table 34.

TABLE 34

Packet buffering (512 M byte) supporting multiple operating modes
Post-classification capture mode
Classification based priority queuing for selected flows
Packet transfer (DMA) from focus buffer to main processor via uP interface
Direct access (non-DMA) for main processor via uP interface
Hardware triggers for starting and stopping focus capture in diagnostic mode UP Interface 3202

The uP interface provides the media module (main) processor access to all configuration and status registers, memories, etc for the focus subsystem. This interface is the source of all packet data to be processed by the main processor (expert, etc.) and is controlled exclusively by the main processor. This interface can support an on-demand hardware packet transfer mechanism (DMA) into the main processor's local memory to alleviate timing contention for the focus buffer.

Capture Buffer Interface 3204

The capture buffer interface is used for transferring packets from the capture buffer into the focus buffer. This forwarding uses DMA (in the capture subsystem) and is under control of the flow processor. Operationally, once the flow processor has analyzed a packet in the capture buffer, a decision is made whether to forward the packet on or not. This decision is based on indications fed back from the expert task on main processor for the scope (flows) expert is interested in and is effectively a second level of filtering. If the packet is to be forwarded, the flow processor initiates the transfer across this interface. A control mechanism may be provided to indicate when the focus buffer is full.

Focus Buffer Modes

Like the capture subsystem, the focus subsystem provides two primary modes of operation, and several sub-modes within each primary mode. The primary modes are listed in Table 35 below.

TABLE 35

Diagnostic Mode
Monitoring Mode

In diagnostic mode the focus buffer takes snapshots of data from the capture buffer based on classification (i.e. multi-layer) filtering provided by the flow processor. The buffer modes supported in diagnostic mode are listed in Table 36.

TABLE 36

Fill and stop
Wrap

In fill and stop mode, when a capture is initiated (usually by a trigger), the buffer fills linearly until full or a stop trigger is fired. In the wrap mode, the buffer is continuously being overwritten with the most recent data from the line until a stop trigger is fired. The start and stop capture triggers are implemented in hardware and support stop after N (bytes) capability. This allows a user defined capture window with information both before and after the event of interest.

In monitoring mode, the focus buffer acts as a high performance FIFO queue. Table 37 lists buffer modes supported in monitoring mode.

TABLE 37

Priority queuing
Non-priority queuing

In priority queuing mode, the buffer is segmented into two virtual queues: priority and non-priority. Each queue maintains and is accessed by separate head, tail and current offset pointers. Associated with the priority queue is a priority tagging mechanism provided by the flow processor, which is based on which flows are important to expert. The buffer space for each queue is varies dynamically based on the arrival of classified packets that meet the priority criteria (i.e. have a priority entry in the flow classifier).

Initially all packets are considered non-priority, but as the expert task identifies a flow as being "important", information about the stream of packets that comprise the flow is written back to the flow processor and tagged as priority.

As the number of priority flows increases, buffers are reallocated to the priority queue from the non-priority queue. Likewise when the number of priority flows decreases, buffers are reallocated to the non-priority queue. These queues effectively appear as separate FIFOs with varying depth and are completely managed by hardware.

This mechanism allows the expert task to focus on servicing priority packets over non-priority packets to prevent data loss. To manage the aggregate packet rate and avoid dropped packets, the expert task monitors the average depth of the priority queue and may selectively discard flows from the priority filter.

In the non-priority queuing mode, the focus buffer appears as a single FIFO and gives no particular preference to the packets being captured other than through flow filtering. Packets are therefore more likely to be dropped in this mode.

Filtering Modes

It should be noted that unlike the capture subsystem, the focus subsystem does not provide hardware filtering. Instead, filtering is achieved using a software feedback approach. In this approach, the flow processor is directed by the main processor (expert) as to the focus set of applications, etc. that are forwarded on for expert processing. In addition, the priority queuing of a subset of flows within the focus set is used to provide additional filtering capability.

HDD 2814 (See FIG. 28)

The media module has the ability to use an optional hard drive for the persistent storage of various data. Table 38 lists some of the uses for the HDD module.

TABLE 38

Storing RMON history
Storing expert history
Storing alarm and event logs
Storing aggregated objects
Storing capture data for the MI expert (or other app) on the application server
Storing capture data for post-capture analysis by a sniffer, etc.

The HDD (when equipped) resides on a CPCI rear transition module directly behind the media module. The media module provides an IDE interface on a set of user defined CPCI backplane signals.

CPCI Interface 2816 (See FIG. 28)

The CPCI backplane interface on the media module can be used for all communications with the application server or other client modules. This interface may be set up in transparent or non-transparent modes and provides both target and initiator capabilities. The main processor memory is made accessible to the application server via this interface for general communication (configuration, download, status, etc.) and any shared object access. This interface also allows the application server access to the focus buffer and local HDD.

Ethernet Interface 2818 (See FIG. 28)

The media module provides a dedicated 10/100 interface via the front bezel, which may be used for debugging, alternate access for management systems, etc.

Software Description

This section will describe the software subsystems and interfaces which comprise the media module. A top-down approach will be used to introduce the overall architecture and each of the constituent subsystems. This architecture should be viewed as an illustrative model, which can be changed as more focused resources are added to the development.

Figure 33:
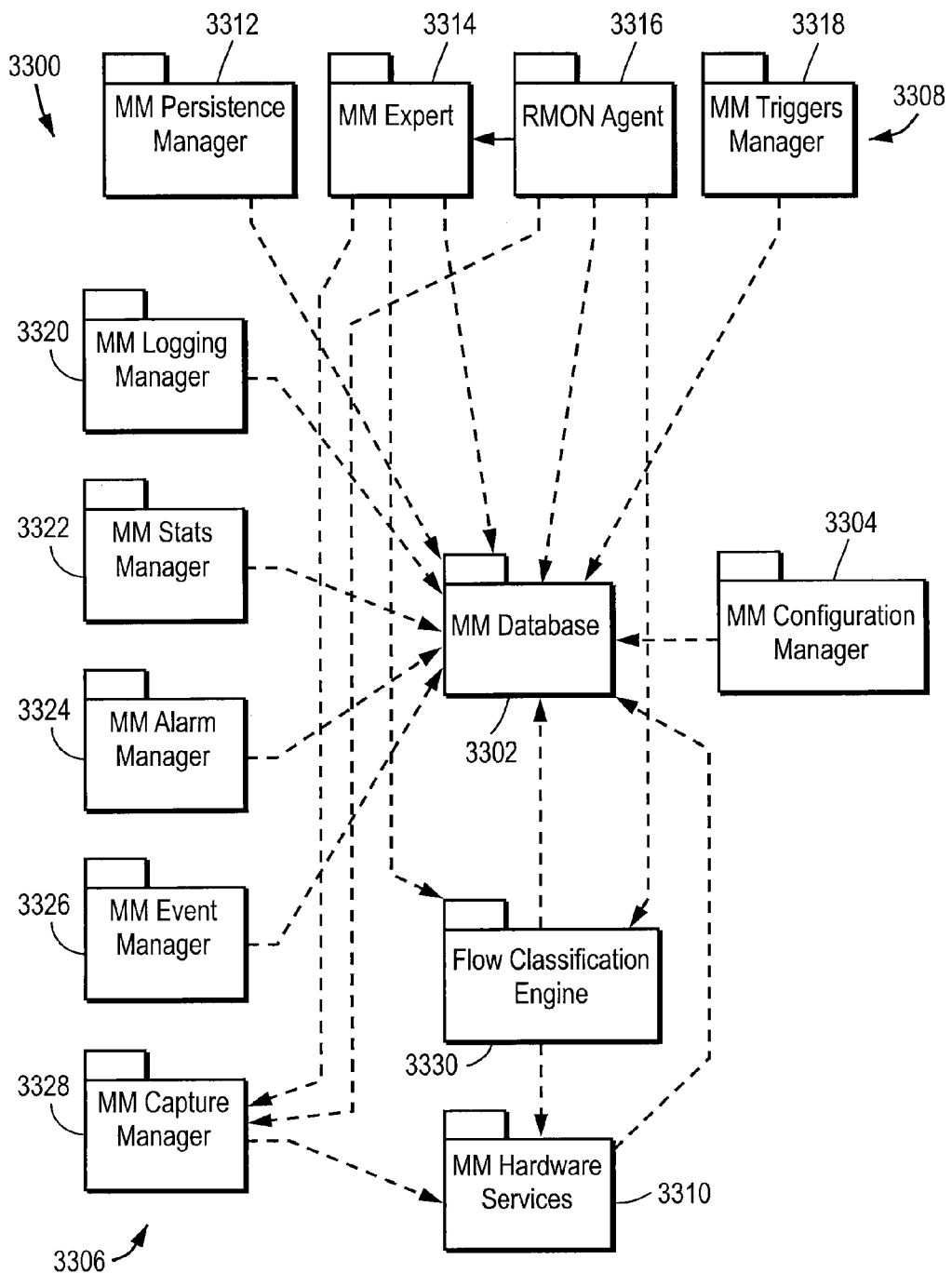
FIG. 33 shows the media module top-level subsystems and dependencies.

FIG. 33 shows top-level subsystems and dependencies of a media module 3300 according to one embodiment. In FIG. 33, a set of top-level packages, representing major architectural components are shown. In the following subsections, each will be described and further decomposed into additional subsystems with their descriptions. As should be obvious, the architecture is very centered around the common data repository 3302 (and configuration manager 3304). This repository is viewed as being a shared memory database, which is accessible by all subsystems. As will be seen, this is an important part of the architecture for supporting inter-subsystem communications and triggering functions.

With continued reference to FIG. 33, a set of common engines 3306 are provided for supporting generic functions (i.e. logging, statistics, alarm and event managers). These engines each provide a consolidated point for managing and maintaining common types of information from various sources for local subsystems and the application server. A set of subsystems 3308 provide analysis, monitoring and triggering services either directly to clients (i.e. expert to RMON) or to the application server. A hardware services subsystem 3310 provides all access to hardware objects (interfaces, HDD, etc.), including events, configuration, statistics, and maintenance functions. Note that throughout this section it is assumed that inter-subsystem object access is provided through the data repository and events are passed between subsystems using OS or hardware mechanisms.

Persistence Manager 3312 (See FIG. 33)

The persistence manager is responsible for gathering any transient objects that require storage beyond their active state. For example, APM requires that objects related to flows (connection between client, server and application) be aggregated beyond the life of a single flow involving the three parts. This requires a type of medium term persistence so that a client may view the behavior of the flow over time. A longer-term persistence (i.e. indefinite) may also be provided for providing history and logging. This type of persistence requires storage to a non-volatile medium such as a hard disk. The persistence manager has access to three types of storage for persisting objects it is responsible for, listed in Table 39 below.

TABLE 39

Main processor memory (i.e. database)
FLASH memory of the main processor
The optional RTM hard drive The primary mechanism for persisting aggregated information can be to store the native flow and expert objects in a hierarchical database. Reports (RMON, etc.) may be generated on an as needed (i.e. per query) basis from these objects eliminating the need to store RMON tables, etc. This aggregation can be performed as a background or periodic task, which collects objects from the flow processor and expert enabling them to focus on current (transient) flows only. There may be a second level to this mechanism whereby the optional media module hard drive is used to provide further long-term storage for these objects.

The FLASH database is used for storing critical configuration data, which may always be available even after power loss or reset events. The type of data to be stored in flash is listed in Table 40.

TABLE 40

General configuration data (modes, parameters, etc.)
Current clients and their enabled report types (RMON community strings, etc.)
Module, software and hardware version and capabilities information
Alarms, critical events and global counts (interface errors, etc.)
Other information The persistence manager may encapsulate all three storage mediums using a common interface (API) to minimize the impact of reassigning data from one storage area to another. The persistence manager therefore is responsible for the collection, storage and deletion (clean-up) of all persistent objects on the media module. The clients of this subsystem are listed in Table 41.

TABLE 41

Media module RMON agent
Media module configuration manager
Media module logging, statistics, alarm and event managers
Media module triggers manager
Application server applications (i.e. MI expert)

Media Module Expert 3314 (See FIG. 33)

The system may support different experts that monitor different protocol layers as well sets of protocols/applications that make up a service. The experts can be turned on and off independent of other experts within the system. The experts can be enabled on a Media Module basis, with all interfaces within the Media Module running the same set of experts. Each individual Media Module within the system can have a different set of experts running.

The media module expert subsystem is a real-time application monitoring and analysis engine running on the media module main processor, which builds information based on receiving per-packet data for selected flows. The main focus for this analysis is application performance monitoring (APM) which supports both RMON and local applications. This information is built upon and enhances information gathered by the flow processor and falls generally into three categories:

1. Monitoring information
2. Diagnostic information
3. Troubleshooting information Where monitoring information generally refers to functions related to providing APM metrics, deep application recognition and application subtype classification (e.g. MIME types over HTTP, etc.). Diagnostic information is gathered in focused monitoring modes and includes APM "drill-down" monitoring (i.e. TPM), as well as detecting any general network related anomalies. Troubleshooting information is gathered in diagnostic mode during fault isolation monitoring where a specific problem exists and a user is searching for an exact cause of the problem. This last type of information may include capture data as well as alarms and diagnoses. The two operating modes for the media module expert are monitoring mode and diagnostic mode. Different expert capabilities exist in each of these modes.

Table 42 below lists some processes that the media module expert subsystem is generally responsible for.

TABLE 42

Selecting a set of flows as candidates for analysis based on flow criteria
Providing deep application analysis on selected flows (depending on operating mode)
Providing application performance functions and metrics in monitoring mode
Providing deep application content (subtype) information in monitoring mode
Providing deep application distribution information including subtypes
Providing session layer information (login names, etc.) to augment APM when enabled
Providing transport performance metrics (TPM) as a diagnostic mode function
Providing transport layer and network layer monitoring in diagnostic mode
Providing focus set selection criteria to the flow processor depending on mode
Prioritizing flows within the selection set to avoid dropped packets
Performing "expert capture" functions in troubleshooting mode
Maintaining a correlation (binding) between expert objects and flow records The media module expert uses the results of flow processing (classification) as a foundation for all of its operations. The flow processor stores the results of its parsing and classification in the shared memory between the two processors. The expert subsystem uses packets, events, flow records and parse descriptors produced by the flow processor in its processing and stores its own results (objects) in main processor memory. Several mechanisms exist which allow the expert subsystem to focus on a particular set of flows that are of interest at a given time. What constitutes flows as being of interest depends on the operating mode and protocol scheduling within the expert task.

Figure 34:
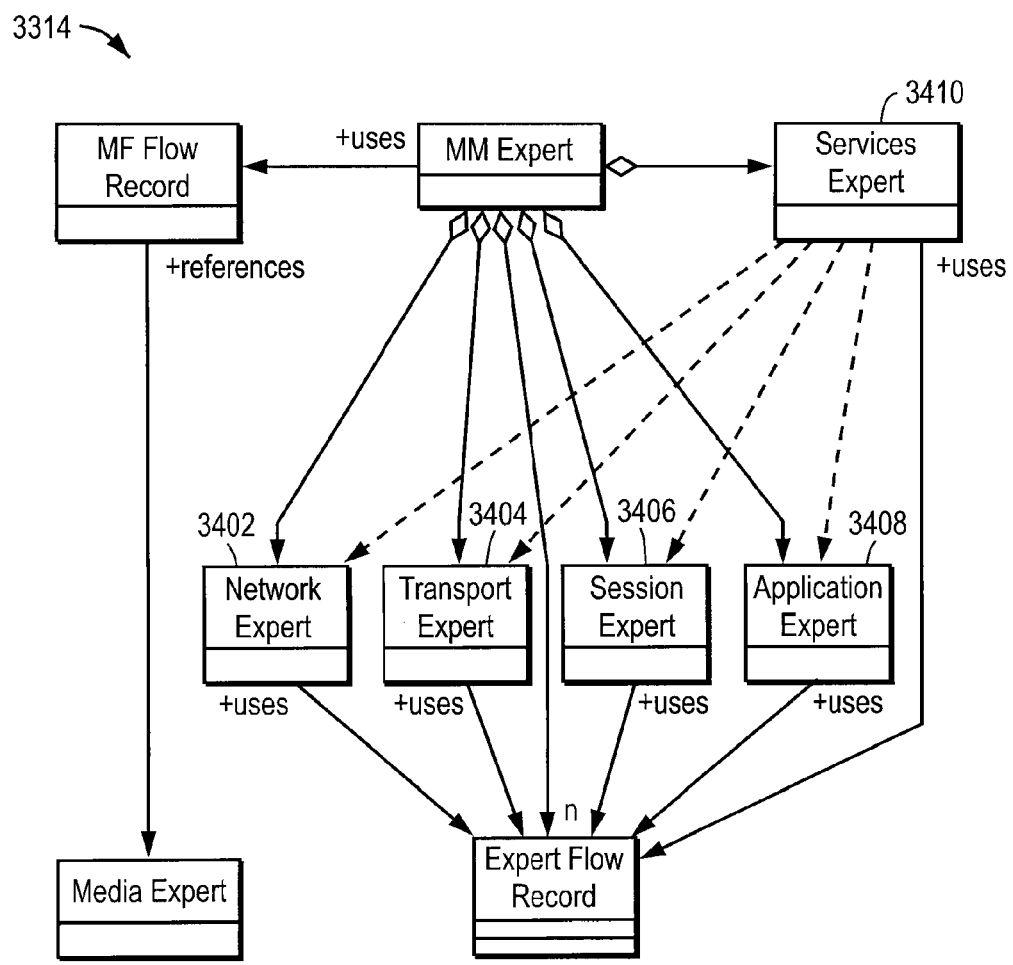
FIG. 34 shows the main components of the media module expert subsystem.

FIG. 34 shows the main components of the media module expert subsystem 3314. As shown in FIG. 34, the media module expert is comprised of a set of component subsystems 3402-3410, which will be described in the following sections. In the system architecture, individual real-time expert components may be enabled independently of each other and do not necessarily require that all lower layers be enabled to process packets. Instead, all expert components rely on the parsing, filtering and classification results from the flow processor as a basis for their operation. In addition, all expert objects are tied to flows in that they are directly traceable (linked) to the flow record for the specific flow. For each flow that the expert processes, an expert flow record, containing parameter areas for each enabled component is created in main processor memory. Each expert component has access to all areas of the flow record which may provide useful information for its processing.

Expert components are generally classified (and subclassified) by layer according to their operations and include the main classes shown in Table 43.

TABLE 43

Network expert 3402
Transport expert 3404
Session expert 3406
Application expert 3408
Service expert 3410

Some experts may rely on other experts. For instance, the Services Experts can rely on multiple subclasses within the Application Expert to evaluate the specific service, or the Application Performance Monitoring Expert may rely on a Transport Expert to drill-down on what could be causing performance problems.

Figure 35:
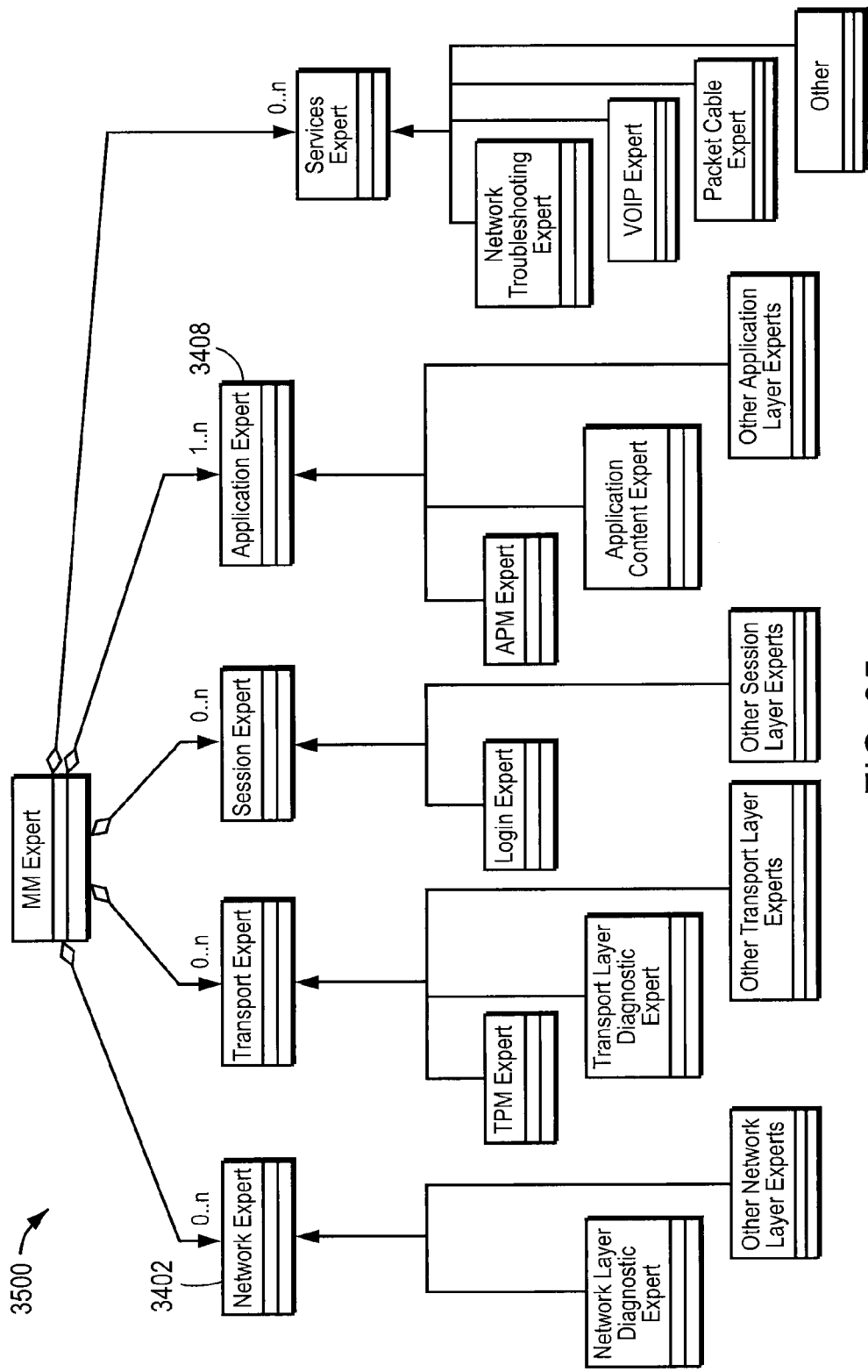
FIG. 35 illustrates a top-level Media Module Expert component classification.

FIG. 35 illustrates a top-level Media Module Expert component classification 3500.

It should be noted that this classification is presented for analysis purposes only and does not imply any particular coding methodology. As can be seen, the only mandatory expert component is in the application monitoring class. The session and transport components (login and TPM in particular) are associated with application monitoring and may be provided to enhance APM functionality. Turning on any optional expert components will have an impact on APM performance.

Network Expert 3402 (See FIG. 34)

The network expert components are available in diagnostic mode and provide network layer analysis of potential problems that may affect application performance. Some of the functionality provided by these optional network layer expert components is set forth in Table 44 below. These expert components would not normally be activated in monitoring mode.

TABLE 44

Network layer symptoms
Network layer diagnoses
Network layer alarms

Transport Expert 3404 (See FIG. 34)

The transport expert components are available in diagnostic mode and provide transport layer analysis of potential problems that may affect application performance. In addition, a special class of transport expert (TPM expert) may provide transport performance metrics and is considered a diagnostic extension of APM that is used in "drill-down" mode. These metrics include statistical means, deviations, etc. and are particular to TPM. Some of the functionality provided by the other optional transport layer expert components are set forth in Table 45. These expert components would not normally be activated in monitoring mode.

TABLE 45

Transport layer symptoms
Transport layer diagnoses
Transport layer alarms
Tunneled transports Session Expert 3406 (See FIG. 34)

The session expert components are available in diagnostic mode and provide session layer analysis of potential problems that may affect application performance. In addition, a special class of session expert (Login expert) may provide discovery and correlation of computer (host) and user names and logins and is considered a desired extension of APM. Table 46 illustrates some of the functionality provided by the other optional diagnostic session layer expert components.

TABLE 46

Session layer symptoms
Session layer diagnoses
Session layer alarms

These expert components would not normally be activated in monitoring mode, with the exception of the login expert. When login monitoring is enabled as a part of application monitoring, filters can be set to include these types of control flows to the media module expert as part of the focus set.

Application Expert 3408 (See FIG. 34)

The application expert components are available in monitoring and diagnostic mode and provide application layer (and sub-application layer) analysis and performance metrics. There are at least two primary classes of application expert components:

1. Application performance monitoring (APM) expert
2. Application content expert Application Performance Monitoring Experts monitor specific protocols/applications (called protocol/application subclasses) to determine the performance of the specific protocol/application from a client's perspective, the server's perspective, and/or network's perspective.

Each protocol/application subclass has a set of metrics (objects) that it can use to measure the performance. The metrics can be applied to different response times of commands/responses, a stream of data, etc. In addition, metrics can be gathered on deeper evaluation of transaction (not just response times) associated with the specific protocol/application that is being monitored. The subclasses can evaluate performance for a single server, a set of servers, a client, a set of clients, and a set of client/server flows.

The APM expert components are concerned with generating metrics related to application performance and are further categorized into three sub-classes, which apply individually or in combination to various application protocols based on transaction types. The sub-classes are listed in Table 47 below.

TABLE 47

Transaction-oriented transactions
Stream-oriented transactions
Throughput-oriented transactions The application content expert components are concerned with identifying application sub-types within a base application (e.g. JPEG MIME types within HTTP, etc.). These components are required for some applications and are used to identify tunneled applications and build more precise APM metrics.

Figure 36:
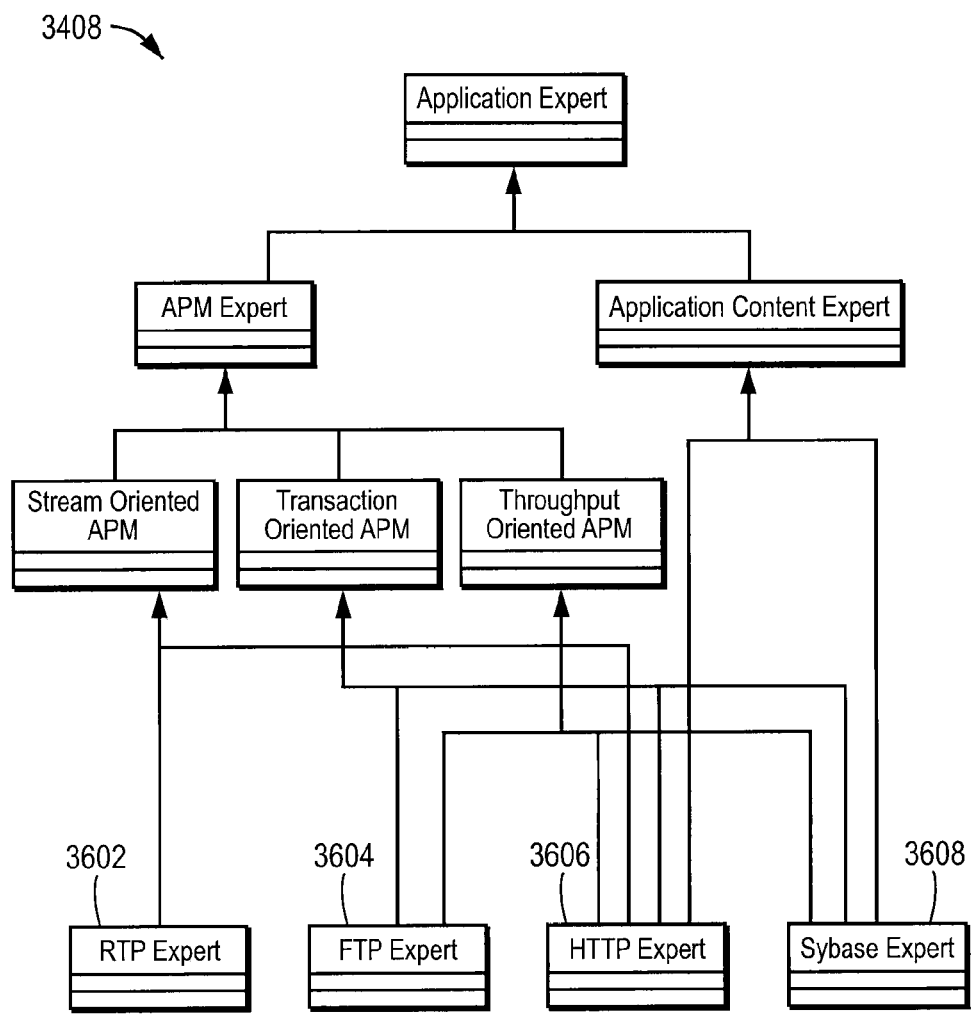
FIG. 36 shows an example sub-classification of application expert components and the relation to a few application protocols.

FIG. 36 shows an example sub-classification of components of the application expert 3408 and the relation to a few application protocols. As shown, different application expert component subtypes have different requirements based on their usage. Table 48 shows several application expert component subtypes.

TABLE 48

The RTP application expert component 3602 is derived
from stream oriented APM class only
The FTP application expert component 3604 is derived
from transaction and throughput oriented APM classes
The HTTP application expert component 3606 is
derived from the stream oriented, transaction
oriented and throughput oriented APM classes as well
as the application content class
The Sybase application expert component 3608 is
derived from the transaction oriented and stream
oriented APM classes as well as the application
content class Again, this model is not meant to imply an object-oriented language, but may be useful for a pattern-based approach to designing similar types of expert components with some degree of reuse.

At any given time one or more application expert components may be enabled for monitoring. In an effort to reduce the occurrence of dropped packets, several operating modes are provided within the application expert as listed in Table 49.

TABLE 49

Flat mode
Roving mode
Focus mode

In all modes, the set of enabled applications is indicated to the flow processor so that it only passes on packets of flows containing those applications. In the classification processor's normal operating mode, a statistically unbiased population of flows is allowed through the capture buffer based on its ability to keep up with traffic. This allows RMON 1 and 2 processing to maintain a balanced view of the network without dropping packets of classified flows. The application expert however can override the classification processor's unbiased operation by giving it a set of applications (or other criteria) to be given classification priority. This "forced" classification mode affects RMON as the filtering for classification is no longer unbiased.

In any case, the application expert works on a subset of flows within the classification set and may process a subset of those flows in a similar (unbiased or biased) approach. This reduced set of flows is referred to as the expert sub-population and depends on the application expert's operating mode.

Flat mode is used to enable concurrent evaluation of a set of enabled applications. The number of applications enabled at a given time may have an impact on performance depending on network load. As the application expert processes the selected flows, it may assign a priority indication to individual flows based on a provisioned application priority.

If no priority is given to specific applications, the application expert may use an unbiased priority tagging approach, whereby selected flows from all applications are relegated to the non-priority queue of the focus buffer as a method to reduce the packet arrival rate. This ensures that the media module expert can keep up with a set of flows from all enabled applications without dropping packets for those flows.

Roving mode is used to enable a sequential evaluation of a set of enabled applications. Within the application expert is a scheduling mechanism to allow each enabled application component to receive an allotted time-slice for monitoring flows containing its application. This is being referred to as "roving mode" whereby a single application at a time has all expert processing bandwidth and requests the flow processor to only forward packets for those flows that contain the application of interest. In this roving mode a picture can be painted of the average performance of a large number of applications, with a much lesser chance of dropping packets.

The number of applications enabled and their priority (e.g. time-slice) at a given time may have an impact on overall performance (i.e. how often the application is evaluated). As the application expert processes the selected application's flows, it may further assign an additional priority indication to individual flows. In this case, selected flows from the current application are relegated to the non-priority queue of the focus buffer as a method to reduce the packet arrival rate. This ensures that the media module expert can keep up with a set of flows from the current application without dropping packets for those flows.

Focus mode is used to enable an evaluation of a particular application. In this mode a single application has all expert processing bandwidth and requests the flow processor to only forward packets for those flows that contain the application of interest. In this mode a detailed view can be obtained for the performance of the selected application with a much lesser chance of dropping packets. Focus mode may be entered manually by a user selecting a particular application or automatically (from one of the other modes) by setting up an auto-focus trigger.

As the application expert processes the selected application's flows, it may assign a priority to individual flows. In this case, selected flows from the current application are relegated to the non-priority queue of the focus buffer as a method to reduce the packet arrival rate. This ensures that the media module expert can keep up with a set of flows from the current application without dropping packets for those flows.

Figure 37:
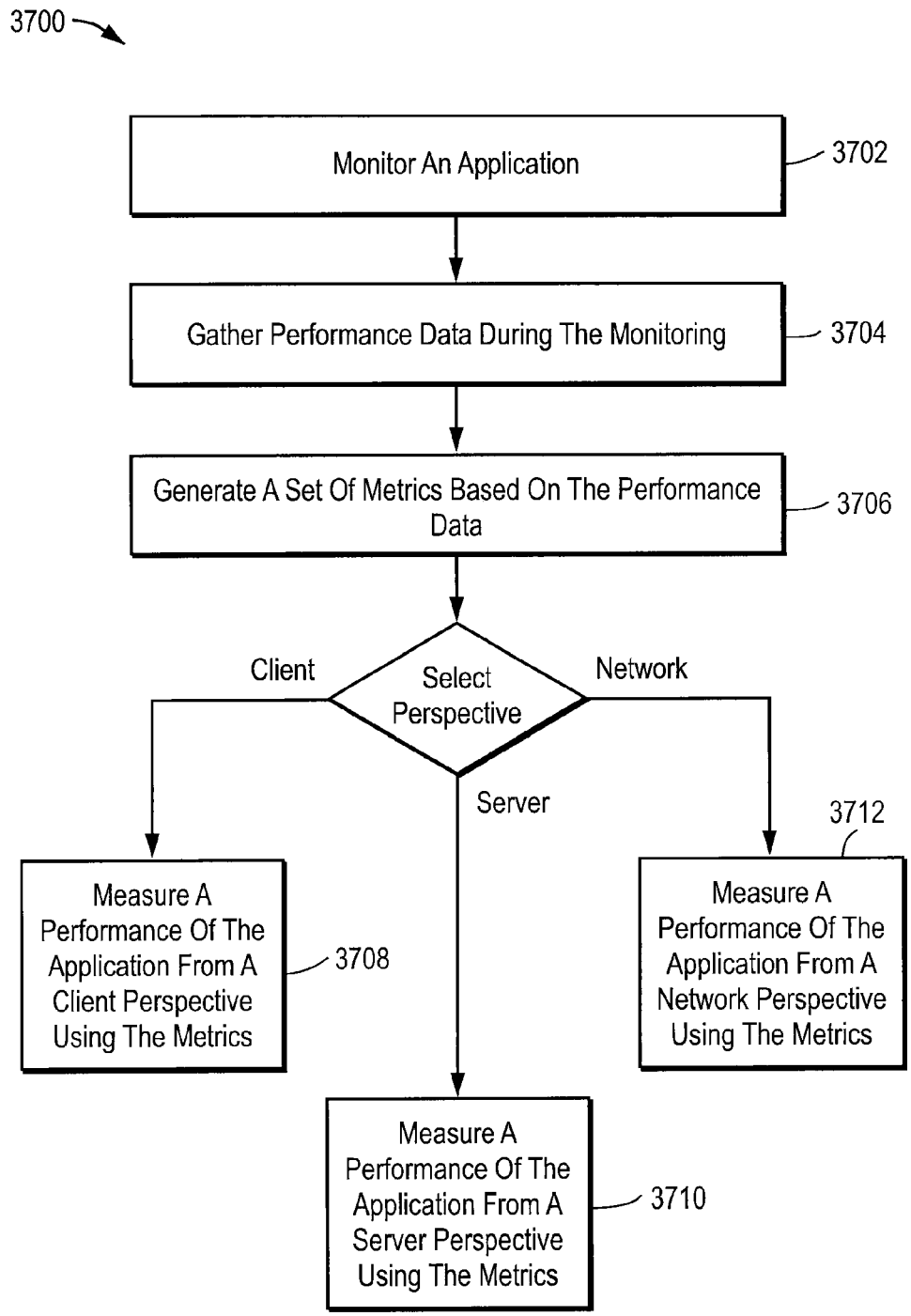
FIG. 37 depicts a process for expert application performance analysis according to one embodiment.

FIG. 37 depicts a process 3700 for expert application performance analysis. In operation 3702, an application is monitored. In operation 3704, performance data is gathered during the monitoring of operation 3702. A set of metrics is generated in operation 3706 based on the performance data gathered in operation 3704. A performance of the application is measured from at least one of a client perspective, a server perspective, and a network perspective using the metrics. Note operations 3708, 3710, 3712.

The system may be able to collect various statistics for a server, client, or protocol to perform the functions listed in Table 50.

TABLE 50

Show the number of attempted transaction for a specific application/protocol
Show the number of unsuccessful transaction for a specific application/protocol
Show the distribution of reasons for the failures
Show the distribution of performance metrics over time and based on transaction size.
Show if other factors at other layers that could be involved in affecting performance (ex. Network Congestion via receiving a PAUSE at the Media)
Application/protocol specific behaviors (ex. Identifying Database Queries that took along time to process)
Accumulated over time for trending
Create a application performance distribution
Which applications respond the best (relative to other applications)
Which applications take the most time to respond (relative to other applications)
Which servers respond the best for a particular application
Which servers takes the most time to respond for a particular application
Which servers respond the best for any application
Which servers takes the most time to respond for any application
Which client or set of clients have the best response for a particular application
Which client or set of clients have the worst response for a particular application
Which part of the transaction was the most time spent for a particular application
Send to the Application Server for MI analysis
Cause an event to trigger Triggers can be set on various objects that are associated with the performance metrics calculated for specific protocol/application. Each protocol/application will publish its triggerable objects. The triggers can cause the system to initiate the events listed in Table 51.

TABLE 51

Generate an event or alarm
Start a capture
Stop a capture
Start a timer
Stop a timer
Increment a trigger count
Start a diagnostic expert for this application/protocol
Start a MI expert for this application protocol.
Others.

A user has control over the functions of the following APM configuration settings listed in Table 52.

TABLE 52

Changing Modes (basically changing the how deep the performance monitoring for an application/protocol actually is done)
Adding and deleting applications/protocols to monitor
Setting up triggers based on objects within the application/protocol set.
Setting aggregation timing intervals
Storing data for trending
Under certain modes isolate a specific server, set of servers, a client, set of clients
Reports view from the Server's perspective, Client's perspective, Application perspective, or Network perspective.

The user can also control how each application/protocol is being monitored. Each application/protocol specifies the reports that can be created, the objects that can be triggerable via threshold, the metrics that are of interest, etc. The capabilities for each Application/Protocol shall be published.

The Supported Protocols/Applications and Metrics section will define the Protocols/Applications that have an associated application/protocol subclass. These subclasses classify the transaction associated as one or more of the classes listed in Table 53.

TABLE 53

Transaction based
Throughput based
Stream based

For the different modes, a specific application/protocol subclass will only generate certain metrics. For instance, in Roving and Flat mode a smaller set of metrics (basically what is defined by APM RMON) will be used than when in Focused or Diagnostics Monitor Mode (much deeper monitoring). For Transaction Orientated Based transactions, the metrics set forth in Table 54 below may be supported.

TABLE 54

Command/Response Timing per transaction (2 metrics)
Metric One - From start of the command to start of
the response (not an ack for the command)
Metric Two - From start of the command to the end of
the response (not closing of a connection)
Minimum response time for Metric One and Two
Maximum response time for Metric One and Two
Average response time for Metric One and Two
Standard Deviation between Metric One and Two
Buckets for Metric One and Metric Two
Number of Failures and if possible differentiate
them in buckets
Size of Response in buckets (if applicable)
If sub-transactions/responses are created within a
response the following metrics should also be
supported:
    From the start of the command to the last response
    (not closing the connection)
    Buckets for the average time between sub-
    transactions/responses.
    Buckets for throughput for each sub-transaction
    (bytes per second)

For Throughput Orientated transactions, the metrics in Table 55 may be supported:

TABLE 55

Number of transactions
Number of successful transactions
Throughput calculations per transaction
Bytes/second once the transaction begins
Minimum transaction time of 10 seconds
Number of transaction below minimum transaction
times
Bins for response distribution
Minimum response
Minimum response transaction size
Maximum response
Maximum response transaction size
Average response
Standard Deviation
Number of failures and if possible differentiate
them in buckets For Stream Orientated transactions, the metrics in Table 56 may be supported.

TABLE 56

Type of service expected during setup
Type of service actually received from the network
Number of transactions
Number of successful transactions
Ratio for the accumulated time of disrupted service
and over transaction time.

Disrupted service is related to the items listed in Table 57.

TABLE 57

Detected drop packets
Detected packets delayed passed a certain threshold
Packets out-of-order
Bins for ratio distribution
Dropped Packets
Average time between packets
Min time between packets
Max time between packets
Standard Deviation Some applications/protocols may use the transport mechanism to monitor application response times. This should not be confused with Transport Expert functions that drill down further on determining whether and where the Transport Layer is having problems.

Application Performance Monitoring Correlation Expert

The Application Performance Monitoring Correlation Expert takes results from the specific application/protocol subclasses and evaluates the performance of the applications/protocols across multiple interfaces. The Correlation Expert interprets the difference in performance between different parts of the network. The results can help give a user a clear understanding of how the network works today, how the network works after changes have been made, and others.

In one example, load sharing is used to see how the applications actually work over the different links (multiple links feeding a set of servers). In this scenario, the user would not be able to see the same flows across the interfaces. In another example, the same flows can be monitored across multiple interfaces. Under this scenario, the user can see where potential bottlenecks are in the system.

When a specific application/protocol correlation expert is in turn for a set of interfaces, the specific application/protocol is turned on those Media Modules that are involved in the correlation.

A Correlation expert can have the modes listed in Table 58.

TABLE 58

Discovery Mode
Monitoring Mode (Flat or Roving)
Focused mode
Diagnostic Mode

In use, the system can allow a user to specify the correlation's aggregation duration. The system may accumulate data over a period of time based on the aggregation duration. The accumulated data may be stored to disk or displayed. The system may allow a user to view the current aggregation period. The system may allow a user look at the performance of flows that are currently active. The system may show a distribution of applications over different links within the system.

Session Experts

The Session Experts provide a mechanism to track a particular client or server within the network. The tracking involves binding client/server MAC addresses, network addresses, Machine Names and User Names. Accurate bindings provide a way to ensure that the information that has been collected by the system can be related to the appropriate client and server.

When history information is involved, the bindings allow a user to track individual servers or clients regardless of the changes in their network addresses. Session Experts can also be useful for tracking User sessions for specific services. For example, when login into a Domain, the system can identify the number of attempts that failed, why a user failed, setup a trigger to monitor a particular user, etc.

Applications/Protocols that are involved with Session Experts still can have other Experts monitoring different issues. For example, an Application Performance Monitoring Expert may exist for DHCP.

Transport Experts

Transport Experts provide mechanisms to monitor transport layer (ex. TCP, SPX) functions. Transport Experts can work with other Application experts to determine whether there are problems occurring at the Transport Layer. For example, if an Application Performance Monitoring Expert detects a performance problem with a particular Server or Client, the Transport Expert can focus on transaction related to that server or client and determine whether the problem is occurring at the Transport Layer. For example, the Transport Expert can determine whether there are too many retransmissions, packets out of order, connection window problems, tunneling problems, etc. In use, the system may support the TPM MIB components.

Network Experts

Network Experts examine problems within the network that will affect application performance. Network Experts are turned on as Diagnostic. The type of network problems that network experts look at can be routes that where used for certain clients have gone through, fragmentation issues, flapping routes, broadcast storms, multicast storms, etc.

Media Experts

Gigabit Ethernet Expert

The Gigabit Ethernet Expert monitors the physical and data link layer. The monitoring looks at basic performance over the physical interface. The performance on the physical interface can have an impact on how the specific application/protocol may get impacted.

In use, the system may keep one or more of the statistics listed in Table 59 below for each link for each interface.

TABLE 59

Frame Counts (64 Bits)
Octet Counts (64 Bits)
Runt Frames < 64 no CRC error
Runt Frames with CRC error
CRC Errors
CV errors
Broadcast Frames
Multicast Frames
Unicast Frames
Frames at 64 Bytes - VLAN Bytes TABLE 59-continued Frames 65 to 127 Bytes - VLAN Bytes
Frames 128 to 255 Bytes - VLAN Bytes
Frames 256 to 511 Bytes VLAN Bytes
Frames 512 to 1023 Bytes VLAN Bytes
Frames 1024 to 1518 Bytes - VLAN Bytes
VLAN Frame Count
Jumbo Frame Count
Jumbo Frame Byte Count
Number of Pauses from link 1
Number of Pauses from link 2
Total Pause Time from link 1
Total Pause Time from link 2

When the interface receives a Pause from one of the links, the system may perform any of the functions listed in Table 60.

TABLE 60

Update Counts
Send an Event with the following information:
Link number
System Time
Pause Timer Value
Number of packets during last interval
Number of bytes during last interval When the interface receives the first packet after the Pause from the link, the system may perform one or more of the functions in Table 61.

TABLE 61

Update Counts
Send an Event with the following information:
Link number
System Time Service Expert 3410 (See FIG. 34)

Service Experts provide analysis of a particular service that is based on multiple applications/protocols. An example of this would be a Voice Over IP Expert that deals with multiple applications/protocols that are involved in making a call, keeping the call up, the call stream, etc. Another example is a Packet Cable Service Expert that analyzes different applications/protocols that are involved in providing Packet Cable Services. Another Service Expert could be a Network Troubleshooting Expert that uses experts at different layers to detect and evaluate problems with the network that could affect application performance.

The services expert components can be made available in monitoring and diagnostic mode to provide a mechanism for using expert components from multiple layers to support complex, multi-protocol, multi-application services or diagnostics. These experts have a detailed understanding of the service that is being provided by a service provider or network owner and will typically involve multiple interrelated control plane and data plane protocols and endpoints with many states. Some examples of possible services experts are given in Table 62 below.

TABLE 62

Voice over IP experts
Packet Cable expert
3G/4G Wireless expert
QOS experts

TABLE 62-continued

Multi-layer diagnostic experts
Etc.

These services experts orchestrate and use the results of multiple (layer based) expert components. For example, a PacketCable services expert would need to support the following protocols: DOCSIS, GbE, ATM, POS, IP, RSVP+, MGCP, TGCP, SS7, COPS, RADIUS, TCP, RTP, IPSec, Kerberos, DQOS, etc. All of these protocols are interrelated and involved in setting up a single voice or video call in the PacketCable architecture. The signaling, policy enforcement, QOS, transport, billing and security planes all interoperate according to a specified model which an expert for this service would need to understand. A less extreme example would be a diagnostic expert which requires processing from multiple layer expert components.

RMON Agent 3316 (See FIG. 33)

Figure 38:
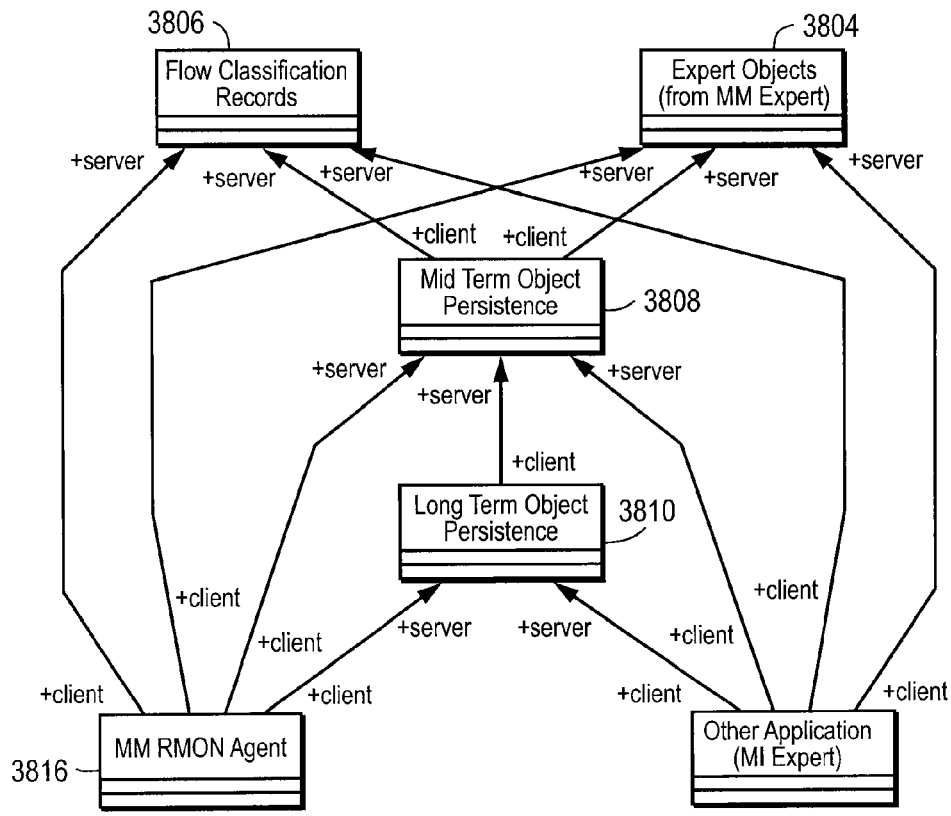
FIG. 38 illustrates RMON object dependencies and persistence levels.

FIG. 38 illustrates RMON object dependencies and persistence levels. The media module RMON agent 3316 uses data and services provided by the flow processor, APM and TPM experts, persistence manager and other subsystems to provide SNMP (v1/v2) clients access to the objects listed in Table 63 below.

TABLE 63

RMON 1 MIB objects, alarms, events and reports
RMON 2 MIB objects, alarms, events and reports
APM MIB objects, alarms, events and reports
TPM MIB objects, alarms, events and reports
SMON MIB objects, alarms, events and reports Operationally, the media module RMON agent builds tables, events, etc. based on information provided by the flow processor (i.e. flow records) and information provided by the expert subsystem (expert flow records/objects).

The RMON agent subsystem uses three levels of information to build reports for managers:

1. Dynamic objects (provided by the expert and flow processor subsystems 3804, 3806)
2. Mid-term aggregated objects (provided by the persistence manager 3808)
3. Long-term aggregated objects (provided by the persistence manager 3810)

Each source can have two associated time intervals for managing its objects:

1. An object collection interval
2. An object persistence window

The collection interval is based on the sampling rate of the fastest higher-level client process (i.e. the most frequent client's retrieval rate of RMON tables, etc.). This interval is used to normalize the rate at which all selected objects at a given level are updated. The exception to this is the expert subsystem and flow processor subsystem, which use packet arrival rates as the update interval for their objects. This rate may be limited to some minimum interval at each level, which all clients are constrained to.

The persistence window is based on the sampling rate of the slowest higher-level process (i.e. the least frequent client's retrieval rate of RMON tables, etc.). This interval dictates how long all selected objects may be maintained at a given level. This rate may be limited to some maximum interval at each level, which all clients are constrained to.

After expiry of the time for this interval, inactive objects may be reclaimed for further processing.

Triggers Manager 3318 (See FIG. 33)

The triggers manager 3318 is responsible for the creation, deletion, activation and deactivation of media module triggers and is optionally responsible for the scheduling and invocation of actions based on triggers (the exception being hardware based triggers). This includes listening for events for enabled triggers, evaluating conditions required to fire the trigger, and invoking the action(s) for the trigger. The set of triggerable events and actions needs to be published by each media module subsystem via the configuration manager (i.e. through the managed objects for the subsystem). Trigger groups may be created per-user or globally via the registry.

Configuration Manager 3304 (See FIG. 33)

The configuration manager 3304 is responsible for providing all access to managed objects on the media module. This includes managing the state and availability of hardware objects, compatibility objects, application objects, objects and trigger objects. The managed objects accessed by the configuration manager are not the actual transient objects produced by applications, but are rather configuration objects, which control and reflect the state of applications, hardware, etc. Note that the media module managed objects are created upon power up and reside on the media module. These objects are available for presentation via the higher-level application server configuration manager.

Logging Manager 3320 (See FIG. 33)

The media module logging manager subsystem 3320 is responsible for creating and storing media module specific logs, which include time-stamped events, alarms, statistics, and other information as requested on a per session basis. In addition, the logging manager provides the requested log information to users via the higher-level logging manager on the application server. The logging manager uses the optional media module hard drive to persist this data and may additionally use secondary storage (i.e. a file server) for extended capability. The logging manager on the application server treats the logging manager on each media module as a remote file server.

Statistics Manager 3322 (See FIG. 33)

The statistics manager 3322 is a common shared resource for all application engines (i.e. RMON, Expert, etc.) on the media module. This subsystem is used to provide (dispatch) statistics to the application server as well as to the local logging manager. The various statistics may be dispatched based on intervals, change occurrence, etc. as defined in the user and SYSTEM registry entries on the application server. This subsystem provides dispatch filtering on a per user basis for multiple client sessions. System triggers may be provided by this subsystem to invoke actions based on statistics. The actual statistics objects are maintained in the main processor database.

Alarm Manager 3324 (See FIG. 33)

The alarm manager 3324 is a common shared resource for all application engines (i.e. RMON, Expert, etc.) on the media module. This subsystem is used to provide (dispatch) alarms to the application server as well as to the local logging manager. The various alarms may be dispatched based on severity, intervals, change occurrence, etc. as defined in the user and SYSTEM registry entries on the application server. This subsystem provides dispatch filtering on a per user basis for multiple client sessions. System triggers may be provided by this subsystem to invoke actions based on alarms (i.e. dial a pager, etc.). The actual alarm objects are maintained in the main processor database.

Event Manager 3326 (See FIG. 33)

The event manager 3326, like the alarm manager 3324 is a common shared resource for all application engines (i.e. RMON, Expert, etc.) on the media module. This subsystem is used to provide (dispatch) alarms to the application server as well as to the local logging manager. The various events may be dispatched based on severity, intervals, change occurrence, etc. as defined in the user and SYSTEM registry entries. This subsystem provides dispatch filtering on a per user basis for multiple client sessions. System triggers may be provided by this subsystem to invoke actions based on events.

Capture Manager 3328 (See FIG. 33)

The capture manager subsystem, like the logging manager is responsible for creating and storing trace files, which include filtered packets as requested on a per session basis. In addition, the capture manager provides the requested information to various clients including RMON clients and application server clients (e.g. MI expert) based on capture criteria set on a per session basis. The capture manager uses the optional media module hard drive to persist this data and may additionally use secondary storage (i.e. a file server) for extended capability. The capture manager on the application server treats the capture manager on each media modules as a remote file server.

Flow Classification Engine 3330 (See FIG. 33)

The flow classification engine 3330 is the first part in the media module processing chain for packets received from the line. The flow classification engine receives packets from and controls the filtering for the capture subsystem (see capture subsystem in the hardware description section).

The flow classification engine is generally responsible for the functionality listed in Table 64.

TABLE 64

Parsing all received packets up to application level
Creating and updating flow records (in shared memory) based on received packets
Maintaining state information for flows which contain state-based protocols
Maintaining and updating per-flow counts for all packets received for each flow
Indicating when a new flow has been created or has terminated
Building a parse descriptor per packet (containing layer offsets, etc.) in shared memory
Reclaiming flow records for flows that are no longer active
Providing application-level filtering for packets passed on to the expert subsystem
Managing the capture queues based on processing headroom or other criteria
Managing the DMA of packets from the capture buffer into the focus (expert) buffer Deep application processing (sub-type classification, string based recognition, etc) can be packaged into application content experts. In addition, performance metrics can be packaged into a transport (TPM) expert. This takes advantage of the dual pipelined processors on the media module and to provide maximum performance for parsing and basic classification in the flow processor. Since RMON 1 and 2 do not require this deep level processing, these functions can be relegated to the second (main/expert) processor allowing the RMON process to always operate at the full rate (independent of APM, TPM, etc).

In monitoring mode, the capture subsystem may provide two packet queues to the flow classification engine:

1. Priority queue
2. Non-priority queue

These queues are configured by the flow classification engine and are based on hardware filtering at the ingress of the capture buffer. Operationally, the flow classification engine writes back L3 (or other) addresses for selected flows to the CAM priority filter in the capture subsystem. This gives packets for these flows priority in the capture buffer as well as the ability to reclaim buffers from the non-priority queue. This can be thought of as a type of intelligent flow throttling whereby a set of flows can always be processed without dropping packets. This may require an adaptive algorithm for maintaining an average deficit based on capture buffer depth. This will be explained in detail in a later section.

Filtering and Capture Modes

Figure 39:
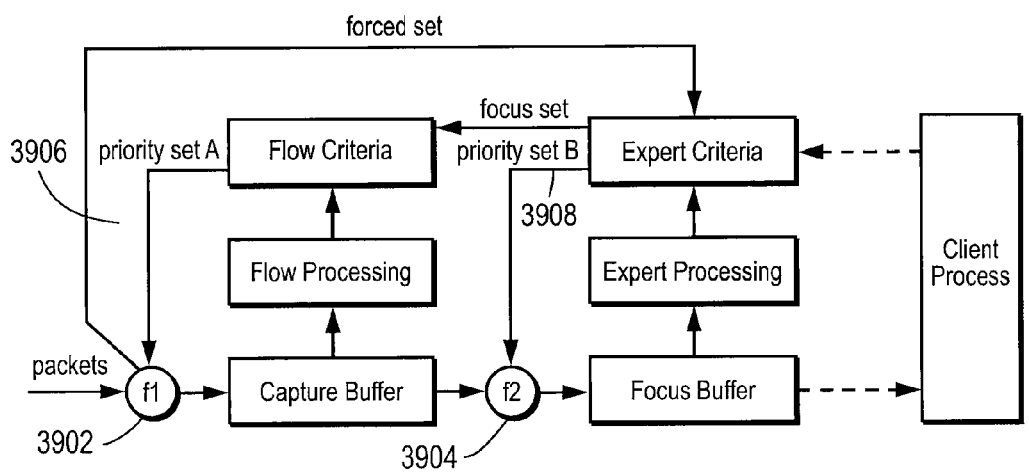
FIG. 39 shows the pipelined (flow processing and expert processing) filter and buffer components provided by the media module.

This section will provide an operational description of the overall filtering and capture modes for the media module as a whole. FIG. 39 shows the pipelined (flow processing and expert processing) filter and buffer components provided by the media module. In FIG. 39, two filters are shown (f1 and f2) 3902, 3904. The representation of these filters is logical rather than physical in order to provide a generalized description of the overall operation and interaction. The arrows pointing downward into the filters represent coefficient paths 3906 for the filters. The first filter (f1) 3902 provides ingress filtering for the capture buffer. This filter can be configured to operate in several modes:

1. As a static capture filter (diagnostic mode)
2. As an adaptive priority filter (monitor mode)
3. As a static focus filter with adaptive priority (diagnostic monitor mode)

In all modes the filter is based on an inclusion set, meaning that matching criteria is established for what gets into the capture buffer (diagnostic mode) or into the priority queue (monitor mode). This obviously implies that all packets that do not match the criteria set either do not go into the buffer (diagnostic mode) or are placed into the non-priority queue (monitor mode). As mentioned in a previous section, the capture buffer operates in two modes: diagnostic mode and monitoring mode.

Figure 40:
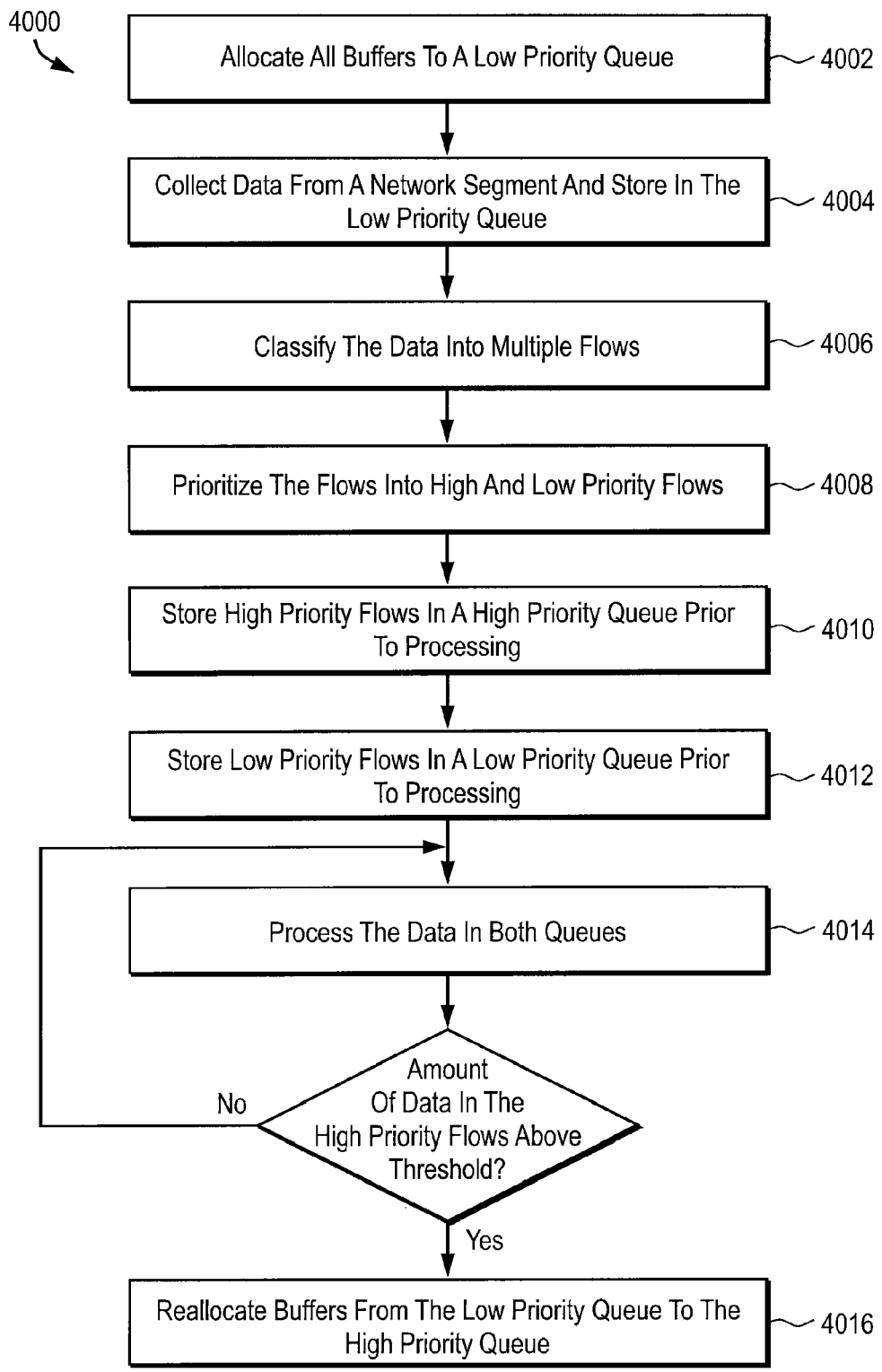
FIG. 40 depicts a process for adaptive priority data filtering according to an embodiment.

FIG. 40 depicts a process 4000 for adaptive priority data filtering according to an embodiment. In operation 4002, all buffers are initially allocated to a low priority queue. In operation 4004, data is collected from a network segment and stored in the low priority queue. In operation 4006, the data is classified into multiple flows. The flows are prioritized into high and low priority flows in operation 4008. In operation 4010, high priority flows are stored in a high priority queue prior to processing, while in operation 4012 low priority flows are stored in a low priority queue prior to processing. Each of these queues preferably acts as a high performance first in-first out (FIFO) queue. Data in both the high and low priority queues is processed in operation 4014. In operation 4016 buffers from the low priority queue can be reallocated to the high priority queue if the amount of data in the high priority flows surpasses a predetermined threshold. Alternatively, if the amount of data in the high priority queue surpasses a predetermined threshold, high priority flows are selected from the high priority queue and relegated to the low priority queue. These mechanisms allow the flow processor to focus on servicing priority data over non-priority data to prevent data loss.

Diagnostic (Capture) Mode

In the first (diagnostic) mode, the buffer acts as a raw capture interface, whereby snapshots of data from the line are buffered based on matching include filter criteria. This mode will typically use the "forced set" mechanism shown in FIG. 39 as driven directly or indirectly by the expert subsystem. This forced set is static (provisioned) in this mode and can include patterns that correspond to header fields (up through layer 3) or information from the PMD descriptor, which is prepended to each packet. In this mode RMON processing and filter 2 are disabled and the expert subsystem or an external client handles all processing of the captured packets. In this mode, the flow classification engine may or may not pre-process the captured packets depending on the configuration.

One case where the flow processor does pre-process the packets is when the local expert is the post-processing client of the data. In this case, the flow processor processes the captured packets in batch once the capture stops and then forwards them to the expert subsystem. The second filter (f2) is not required, since the captured packets match exact criteria. If the expert subsystem is not the processing client for the captured data, the flow processor does not analyze the packets and they are simply transferred to the external client through the focus buffer (again the second filter is not used).

Monitor Mode

In the second (monitor) mode, the buffer acts as a FIFO interface, whereby data from the line is continuously buffered in one of two queues based on matching priority filter criteria. This mode will typically use the "priority set A" mechanism shown in FIG. 39 as driven directly or indirectly by the flow processor subsystem. This priority set is dynamic in this mode and can include L3 address pairs that correspond to flows that the flow classification engine has selected to be treated as priority. There are two sub-filtering modes within monitor mode, which are:

1. Unbiased priority mode
2. Biased priority mode

The unbiased mode is used to provide broad coverage of as many flows as can be processed by the flow processor. This allows RMON to paint a full picture of all activity observed on the line. The result of this monitoring is a statistically unbiased population of flows, which can be fed on to the expert subsystem for further processing (i.e. APM, etc.). The size (number of flows) of population is dynamic over time and is created by the flow classification engine using the general algorithm set forth in Table 65 below.

TABLE 65

The capture ingress filter (f1) has no priority criteria (i.e. "priority set a" is empty)
All buffers in the capture subsystem are allocated to the non-priority queue
As packets are received from the line, they are placed into the non-priority queue
Flows are created by the flow classification engine for the processed packets
L3 Address pairs for classified flows are added to "priority set a" in the filter (f1)
As the number of priority flows increases, the priority queue depth increases by taking buffers from the non-priority queue (i.e. reducing its depth).
The buffer depth of the priority queue is averaged in time to provide a "water-level"

TABLE 65-continued

This continues and both queues are processed by the flow classification engine
As the priority queue water level approaches a "minimum headroom" threshold, flows are randomly discarded from priority set a, relegating them back to the non-priority queue.
During this time, the flow processor may only service the priority queue
This continues until the priority queue water level subsides to an acceptable level
As priority flows become inactive, they are removed from the priority set which increases the non-priority queue depth, allowing additional flows to be processed The flows that are sent on to the expert subsystem via the focus buffer are based on scoping criteria received from the application expert ("focus set" 3908 in FIG. 39) based on its current monitoring mode (i.e. flat, roving, etc). Within this set of flows, the expert subsystem may use a similar mechanism via the second filter (f2) to reduce the expert sub-population of flows to a level it can keep up with. This second filter is actually implemented in software by expert setting a priority tag in the flow records of selected flows. The overall behavior is essentially the same as that of the first filter described above.

The biased mode is used to provide focused coverage of as many flows as can be processed by the flow processor. In this mode, expert is in the drivers seat and adds weight to the priority mechanism used for filter (f1) 3902. This affects RMONs ability to paint a full picture of all activity observed on the line. The result of this monitoring is a biased population of flows, which can be fed on to the expert subsystem for further processing (i.e. APM, etc.). The size (number of flows) of population is dynamic over time and is created by the flow classification engine using the same algorithm described above, with the exception that the flow discard mechanism is now biased by the expert provided focus set. This is effectively a weighted random discard traffic shaping technique. Again as in the unbiased mode, within the resulting set of flows sent on to the focus buffer, the expert subsystem may use a similar mechanism via the second filter (f2) 3904 to reduce the expert sub-population of flows to a level it can keep up with.

Diagnostic Monitor Mode

In this third mode which is a highly focused combination mode (i.e. subset of diagnostic and monitor), the buffer acts as a FIFO interface exactly as in monitoring mode, but the (f1) filtering is overridden using the "forced set" mechanism described in the diagnostic mode to enter the L3 addresses of one or more servers and or clients. This mode still however uses the "priority set a" and "priority set B" mechanisms shown in FIG. 39 to throttle the number of flows that the flow engine and expert can keep up with. In this mode, a particular server, set of servers, client or set of clients may be entered or "forced" into filter (f1) 3902 by the expert subsystem, which restricts all flows the flow processor sees to this forced set. Within this set of flows, the same techniques exist as in the monitoring mode to perform priority queuing at both the capture focus buffers. This mode again affects RMON's ability to paint a full picture of all activity observed on the line.

It should be noted that many additional modes are possible.

General Flows

Figure 42:
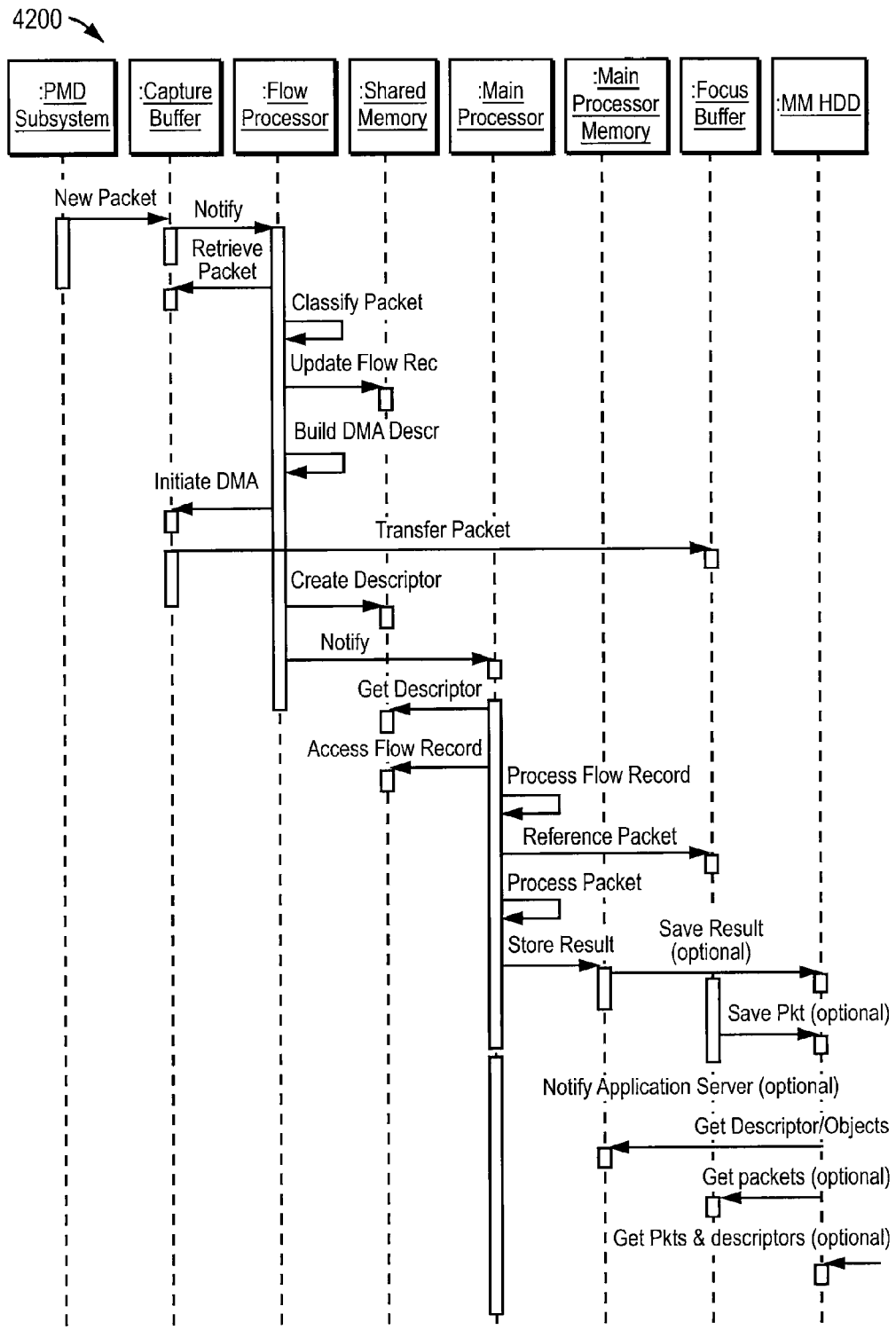
FIG. 42 is a high-level media module packet processing sequence diagram.

FIGS. 41 and 42 present an example of "the life of a packet" within the media module during normal (monitoring) mode. More specifically, FIG. 41 is a media module general processing flow 4100. FIG. 42 is a high-level media module packet processing sequence diagram 4200.

System Functionality

This section will provide a mapping of the elements described in relation to the Figures, equipment, and functional elements discussed above to equivalent (black-box) system elements. New applications, protocols and procedures are introduced as required to support elements for which there is no corresponding system element. Entities from the system architectural model may be included to frame the relationships between standards and marketing defined black-box entities and actual architectural components or subsystems End User Applications The end user applications described in this section represent a set of high-end application monitoring functions, which the system can support. The applications described may be implemented partially or in entirety, based on scope, required effort and development capability. Common to all of the described applications, is the fact that they are directly or indirectly based on flow classification, a core function of the system platform. It should also be stated that the applications described here are particularly useful in providing primary value to the mid and upper tiers of corporate enterprise IT organizations (e.g. CIOs and network managers). This initial focus is not intended to preclude the lower tier (network technicians), who are more focused on network troubleshooting, but rather to gain a foothold in the high performance application monitoring arena.

Security Management

Intrusion detection

Intrusion detection (as provided by the system) refers to the ability to augment and enhance a firewall or router's ability to identify and block malicious attempts at gaining access to protected services, intellectual property, or other network resources. Since most firewalls use primitive packet filtering and rules as a mechanism to detect intrusions, many holes may exist for high-layer or state-based protocols to break through undetected. Since many firewalls only operate through layer 4, and can only decode well-known port numbers, the rule coverage is limited. With deep-packet classification and the ability to understand state-based protocols, this capability can be greatly extended. Since the system can associate these complex applications with users, VLANs, etc., an opportunity is provided to apply sophisticated ACLs in real-time, and notify the network manager when intruders break through the firewall. Once detected, the network manager can "plug the hole" or take other action. Further, the function can be automated, whereby the node directly communicates back to the firewall installing new ACL rules.

Theft of Service

Theft of service, like intrusion detection, is a malicious attempt to gain access to unauthorized resources. A common example of this is a hacker masquerading as an authorized user, thereby consuming resources, which may either be a source of revenue (i.e. a subscribed web-site) or of some intellectual value.

Denial of Service (DOS)

Denial of service (DOS) attacks are typically an attempt at shutting down or overloading a server (or other network element) rendering them inoperable. This again has a net effect of lost revenue for the provider of the service. Many times this is accomplished by flooding traffic at the server or network. By observing traffic patterns (e.g. distribution by user) and provisioned policies, the node may identify and log such attacks for the network manager.

Distributed denial of Service (DDOS)

Like DOS, distributed denial of service (DDOS) attacks are aimed at overloading a network or server. These types of attacks however are more dangerous in that the attacker uses multiple machines to generate the offending streams of traffic. With enough sources of traffic, the network or service under attack may be rendered completely useless.

Policy Monitoring

Policy monitoring, unlike security management is typically focused on the violation of company networking policies by "trusted" users.

Unauthorized Access

The user is not allowed to access the resource.

Membership Violation

The user is not a member of the privileged group (VLAN, VPN, user group, etc.)

Illegal Content Detection

The user is downloading or sending restricted or non-allowed content

Bandwidth Hogging

The user is running an application which is using excessive network resources (i.e. streaming, etc.)

Performance/SLA Management

Application Response Time

See the section entitled Application Expert.

Overbooked Bandwidth Detection

A physical or virtual pipe is overloaded.

Underutilized Bandwidth

A physical or virtual pipe is not being efficiently utilized (stranded bandwidth).

Application Distribution

See the Application Expert section.

User Utilization

See the Application Expert section.

Network Engineering

Reports on over-booked/under-booked resources (nodes, pipes, VLANs, etc.)

Fault Management

Unresponsive applications

See Application Expert section.

Network Problem Analysis

Detecting network anomalies and failures.

Trending Application

The trending application allows users to view application performance and utilization over a period of time. The system allows trending to be done either in real-time or periodic sampling over a period of time. For trending to be done in real-time, the system collects the trending data continuously for the trending duration. For periodic sampling trending, trending data is collected and stored for a sample duration, then another sample at some other time is taken and processed. Between sampling, other monitoring applications and modes can be enabled.

The system uses baseline mode for trending, therefore the system may not allow changes to configuration when trending data is being collected. A user can set up various parameters for trending. These parameters can not change when trending is being enabled. In addition, the user is able to set up thresholds based on changes to the collected data.

Depending on the trending setup, the system can collect data in one of the Baseline sub modes set forth in Table 66.

TABLE 66

Focused
Flat
Roving

The system can allow users to start trending with the configuration set forth in Table 67.

TABLE 67

Trending duration
Trending collection windows.
Real-time trending or periodic sampling trending
Trending session name The system can allow the user to configure the trending collection parameters listed in Table 68.

TABLE 68

Set of Servers
Set of Clients
Set of Applications
Set of Statistics for each application
Set of Metrics for each application
Network response metrics
Time intervals for aggregation of statistics and metrics
Set of location groupings
Operating sub mode (Note: When focusing on a set of servers, clients, or location, you automatically go into Focus sub mode)

The system may allow thresholds related to trending data, as listed in Table 69.

TABLE 69

Rate of change for collected metric or statistics
Percent deviation from the start of the trending session.

RMON View Application

When collecting data in the various operating modes, the system can keep track of RMON 2 like statistics. These statistics can be viewed based on protocol distribution, host tables and matrix tables.

The operating modes that RMON views can be looked at include those set forth in Table 70 below.

TABLE 70

Discover
Baseline Roving
Baseline Flat

TABLE 70-continued

Monitoring Flat
Monitoring Roving

The time bins for the collection of the statistics are based on the operating mode's configuration.

The system may allow users to view RMON 2 statistics per application that can be classified. Such statistics are presented in Table 71.

TABLE 71

Packet Count
Byte Count

The system can allow users to perform the actions listed in Table 72.

TABLE 72

View the protocol distribution for the protocols that the system can support.
View per application matrix counts for flows that have been observed.
Allow users to view per application host counts for hosts that have been observed.
Allow users to set up and then view the TopN hosts for a particular application or set of applications.
Allow users to set up and then view the TopN conversations for a particular application or set of applications.
Allow users to see a view from the monitored link perspective.
Allow users to see a view form the location grouping perspective.

When a change in the system operating mode to Focused or Diagnostic occurs, RMON Views may not be accessible the system. The system can inform the user.

Multiple Link Ana

The system can collect information from multiple links and provide aggregated or correlated results. The can also allow users to create groupings across multiple links. When a grouping is created, the links associated with the groupings operate in the same operating mode or sub mode. The system can allow users to configure application monitoring across the multi-link group. The system can also allow users to configure trending across the multi-link interface. The system can further allow users to configure the multi-link group as a single interface.

The links within the group can operate with the same parameters, as listed in Table 73.

TABLE 73

Time intervals
Application that are being monitored
Sub modes
Other

When a link is switched to a diagnostic mode, the system may temporarily take the link out of the grouping and log the event.

RAMON View Over Multiple Links

The system may provide an aggregated view across the link. Items viewable are listed in Table 74.

TABLE 74

Protocol Distribution
Application Matrix table
Application Host table
Application TopN Matrix
Application TopN Hosts The system can provide a mechanism to compare the views in the previous table with individual links that are part of the multi link group.

Application Monitoring Over Multiple Links

The system may allow users to set up aggregation of statistics and metrics across multiple interfaces.

The system can allow the user to set up aggregation across the multiple interfaces combining the items listed in Table 75 below.

TABLE 75

Application
Servers
Location Groupings
Clients

The system can also provide a mechanism to compare the above aggregation with individual links that are part of the multi link group.

Application Monitoring Application

Application Monitoring in the system provides end users the tools to discover applications on the network, monitor the performance of those application and diagnose problems detected with the applications. Application monitoring also provides ways of monitoring the response time associated with defined URLs and the type of applications that are being downloaded from Websites. Each Media Module may operate independent of other Media Modules within the system.

Each application has a set of metrics (objects) that it can use to measure the performance. The metrics can be applied to different response times of commands/responses, a stream of data, etc. In addition, metrics can be gathered on deeper evaluation of transaction (not just response times) associated with the specific application that is being monitored. Application monitoring can evaluate performance for a single server, a set of servers, a client, a set of clients, and/or a set of client/server flows.

The metrics are preferably generated in real-time. They can then be calculated/collected over a time window (ex. average and/or in buckets). The system may also able to collect various statistics and metrics for a server, client, or protocol to perform the functions set forth in Table 76.

TABLE 76

Show the number of attempted transaction for a specific application
Show the number of unsuccessful transaction for a specific application
Show the distribution of reasons for the failures
Show the distribution of performance metrics over time and based on transaction size.
Show if other factors at other layers that could be involved in affecting performance (ex. HTTP Tunnel, network congestion via receiving a PAUSE at the Media)

TABLE 76-continued

Application/protocol specific behaviors (ex. identifying Database Queries that took along time to process)
Set up a baseline
Provide application trending data
Create a application performance distribution
Identify which applications respond the best (relative to other applications)
Identify which applications take the most time to respond (relative to other applications)
Identify which servers respond the best for a particular application
Identify which servers takes the most time to respond for a particular application
Identify which servers respond the best for any application
Which servers takes the most time to respond for any application
Identify which client or set of clients have the best response for a particular application
Identify which client or set of clients have the worst response for a particular application
Identify which part of the transaction was the most time spent for a particular application Events can be generated based on a set on objects associated with the statistics and metrics calculated and collected for the applications. Each application can publish its events.

Actions that can occur related to application monitoring are listed in Table 77.

TABLE 77

Switch to a different monitoring mode
Switch to a different configuration for the current mode A user can be given control over general Application Monitoring configuration settings, some of which are listed in Table 78.

TABLE 78

Monitoring modes and sub modes
Enabling/Disabling applications to monitor (including End user defined applications)
Setting up triggers based on objects within the configuration set.
Setting timing intervals for baseline, collection of metrics and statistics for trending, reports, and other views.
Set up groupings based on network addresses for location metrics and views
Storing data for reports and trending
Isolate a specific server, set of servers, a client, or a set of clients for focus or diagnostics The user can also control what metrics and statistics are monitored for each application. The capabilities for each application can be published.

Application monitoring can be performed for each interface as well as a set of interfaces. When monitoring a set of interfaces (Multi-Interface Monitoring), the system may provide an aggregation view of the metrics and statistics collected.

The system can provide the functions set forth in Table 79.

TABLE 79

The capability to create an Application Monitoring configuration.

TABLE 79-continued

The capability to delete an Application Monitoring configuration.
The capability to enable an Application Monitoring configuration.
The capability to disable an Application Monitoring configuration.
The mechanism to switch between Application Monitoring configuration by way of a trigger.

Each media module can be capable of being configured with a different Application Monitoring configuration. When multiple media modules are involved in a multi-link group for Application Monitoring, all media modules within the group are preferably configured with the same Application Monitoring configuration.

Application Monitoring Configuration

The system allows the users to configure many parameters, including those listed in Table 80.

TABLE 80

The Operating Mode.
The sub-modes for each Operating Mode.
The applications that could be monitored within the mode.
For each application the metrics that will be collected for the mode.
For each application the statistics that will be collected for the mode.
The triggers that would be used to switch Monitoring Modes.
Triggers that would load a new configuration.
The time intervals for aggregating and calculating configured statistics and metrics.

When a user is configuring Application Monitoring, the system can provide a mechanism to show system resource availability as the user is creating the configuration. The system can also provide a mechanism to create and change an Application Monitoring configuration off-line. The system can further provide a mechanism to save an Application Monitoring configuration.

The system may provide a mechanism to change an Application Monitoring configuration while the system is monitoring with the conditions listed in Table 81.

TABLE 81

The operating mode allows for the configuration to be changed
If resources can support the requested change
If the resources are not locked from change.

Application Monitoring Triggers

Each application monitored provides a list of events that can be generated. Each application that is being monitored lists a set of metrics and statistics that can generate an event based on threshold crossings.

The system may allow thresholds to be created using the methods listed in Table 82.

TABLE 82

Percentage off of baseline that has been created
User entered fields

The system can provide a mechanism for users to create triggers off of these events. The system can also provide a mechanism for users to use the trigger actions related to application monitoring, as set forth in Table 83.

TABLE 83

Switch operation mode with the appropriate parameters.
Switch the operating mode's sub mode with the appropriate parameters.
Switch to a new application monitoring configuration
Send an alarm with the appropriate application monitoring information
Send an event with the appropriate application monitoring information Network Versus Server Analysis Under Monitoring and Diagnostics Modes, the system can be capable of providing information to the user on whether application performance changes are due to server or network issues. The system can also provide the views listed in Table 84 to help make the network versus server determination.

TABLE 84

Comparing application performance changes from baseline versus network delay fluctuations provided by the network responsiveness metrics associated with the location grouping
Comparing application performance changes from baseline versus utilization fluctuations within the monitored link
Comparing application performance changes for a server from baseline versus server utilization
Comparing application performance changes from baseline versus link utilization for all network links that are being monitored URL Monitoring The system may allow users to monitor the performance of specific UTRLs that have been added to the system. For the URLs that have been added in the system, the system can monitor the items set forth in Table 85.

TABLE 85

Statistics defined for base application
Metrics defined for the base application carrying the URL (Ex. HTTP)

The system can allow triggers to be created based on objects defined by the items listed in Table 86 below.

TABLE 86

Statistics and thresholds associated with the base application.
Number of occurrence of URL access within the a given period Topology Mapping and Groupings Different locations within the network have different characteristics when monitoring applications. To get an accurate understanding of application performance without understanding the location characteristics would be difficult.

The system allows users to create groupings based on location. The system can use the items listed in Table 87 to create the groupings.

TABLE 87

A set of network addresses manually entered
A range of network addresses
Subnets
Multiple subnets The system can allow users to view metrics and statistics for applications from the grouping's perspective.

Operating Modes

Each Media Module can operate in different modes. Each mode can be used by the end user to provide different application information. The Media Module can switch between different modes either by using triggers or manually.

When operating in a certain mode, the user that set up the mode's configuration can be given exclusive control over the media module. For example, when creating a baseline for a specific set of applications with a specific configuration, no other user can change the configuration.

A user can lock a configuration from being changed even if the operating mode allows users to make changes. When a user unlocks the configuration, any user can change the configuration as long as the mode allows it.

The Media module can operate in one of the monitoring modes set forth in Table 88 below.

TABLE 88

Discover Mode
Baseline Mode
Monitoring Mode
Diagnostic Mode

The system provides the functionality set forth in Table 89.

TABLE 89

Provide users a mechanism to switch between
monitoring modes on a per Media Module basis.
Provide users a mechanism to switch between
monitoring modes for all Media modules (Global)
within the system.
Provide users a mechanism to switch between
monitoring modes for multi-interface groupings.
Allow users to switch modes manually.
Allow a user to set up triggers to switch modes when
a particular event occurs.
Provide a mode configuration options.
Provide a mechanism to store different mode
configuration options.

When a mode is changed for any media module, the system can log the change. To change the mode, the new mode may have the appropriate parameters.

Discover Mode

In Discover Mode the system identifies the applications that are running in the monitored network as well as the servers that are running those applications. In addition, since the system has the capability to perform deep application classification (including MIME types), the system can present a distribution of the type of traffic or file types that have been sent over the network. For example, amount of traffic that was used to transfer Word documents over HTTP.

In addition to identifying the applications that are on the network, the Discover Mode collects statistics related to application usage and transfer over the network. The usage statistics can be collected from the perspectives listed in Table 90.

TABLE 90

Per Server for a specific application
Per Application
Per Location Groupings

After running Discover Mode, the system can use the information to determine actions to take in the other modes (ex. which set of applications should be turned on for monitoring or baseline). For Discover Mode, time intervals can be set up to indicate how often statistics are collected for viewing.

When in Discover mode, if the network that is being monitored exceeds a certain utilization, the system may start dropping packets from flows that are currently not being monitored. Dropping packets from these flows are going to be done randomly. If a burst occurs on the flows that are being monitored for which the system can not keep up with the processing of packets for those flows, the system may discard existing flows. This may start dropping packets for those existing flows that have been discarded. The system logs the occurrence of these two events.

The system can provide the functionality set forth in Table 91 when in Discover Mode.

TABLE 91

Allow a user to put the system into Discover Mode
manually.
Allow a user to put the system into Discover Mode
using a trigger.
Allow a user to put the system into Discover Mode by
loading an Application Monitoring configuration
Allow a user to configure how long the Discover Mode
will run.
Disable performance monitoring when in Discover
mode.
Learn many of the different application within the
network.
Learn many of the different servers that are running
the applications.
Learn the server's location if location grouping is
enabled for the location group associated with the
server.
Learn the applications that are running from the
different location groups defined by the system.
The applications that are detected for the groups
are those that are being used across the monitored
interface.
Collect statistics for the following:

Application
Application for each server
Application for each location grouping
Accumulate the following statistics:

Packets per Application
Bytes per Application
Allow users to turn on and control the time interval
for aggregating statistics.
Keep track of port numbers that could not be
classified.
Allow a user to view the collected information using
trees for the different applications, sub-
application, and supported Application content that
are on the network.
Identify the servers and clients based on their
location groupings.
Make available to Baseline Mode and Monitoring Mode
configuration the list of applications that have
been found in the network that can be supported by TABLE 91-continued the system for performance monitoring.
Have the capability to turn on monitoring for the
supported applications after Discover Mode is
complete.
Start dropping packets from flows that are currently
not being monitored if the network that is being
monitored exceeds a certain utilization.
Provide a configuration option to log the beginning
of the occurrence of dropping packets.
Provide a configuration option in Discover mode to
log when the condition for dropping packets is no
longer in existence.
Discard existing flows if a burst occurs on the
flows that are being monitored for which the system
can not keep up with the processing of packets for
those flows.
Provide a configuration option in Discover mode to
log the beginning of the occurrence of dropping
flows.
Provide a configuration option in Discover mode to
log when the condition for dropping flows is no
longer in existence.
Keep a count of dropped packets.
Keep a count of dropped flows.

Baseline Mode

Baseline mode provides the mechanism for collecting a set of statistics and metrics that can be used for setting up thresholds when monitoring against the collected baseline, and observing changes in the monitored network.

The system can have the sub modes listed in Table 92 for the baseline.

TABLE 92

Roving - Allowing a specific application to be
monitored exclusively for a given time slice. Once
the time slice is over, another application is then
being monitored exclusively.
Flat - All configured application are being
monitored at the same time
Focused - A set of application are being monitored
for a set of servers, clients, and/or location
group.

Preferably, when the system is running a baseline, no user can change any parameters for the active baseline (ex. add a new application for baseline or new items to a focus set). Therefore Baseline mode always runs in locked mode. If the user wants to add a new application, the user would have to stop the current baseline and start a new one with the new application.

When in Baseline mode, if the network that is being monitored exceeds a certain utilization, the system starts dropping packets from flows that are currently not being monitored. Dropping packets from these flows can be done randomly. In addition, existing flows that are currently being monitored for statistics but are not being monitored for performance monitoring can also be dropped. The system logs the occurrence of this event.

If a burst occurs on the flows that are being monitored for which the system can not keep up with the processing of packets for those flows, the system can discard existing flows. Under this condition, flows may be dropped randomly. This may start dropping packets for those existing flows that have been discarded. The system logs the occurrence of these events.

The system can provide the functionality listed in Table 93 when in Baseline mode.

TABLE 93

Allow a user to put the system into Baseline Mode
manually.
Allow a user to put the system into Baseline Mode
using a trigger.
Allow a user to put the system into Baseline Mode by
loading an Application configuration
Allow the users to configure the baseline into one
of the three sub-modes:
    Roving
    Flat
    Focused
Allow a user to configure how long the Baseline Mode
will run.
When a trigger puts the system into a Baseline mode,
run a baseline based on the supported applications
found during Discover Mode.
Not allow any user to change the configuration of
the Baseline when in Baseline Mode.
Allow a user to save Baseline data.
Allow a user to save Baseline configuration
Provide a mechanism baseline to be created for the
following:
    Server (Focused only)
    Set of Servers (Focused only)
    Application (Focused, Flat or Roving)
    Set of Applications (Focused, Flat or Roving)
    Application for location group (Focused only)
    Application for a Set of clients (NOT ALL
    CLIENTS) (Focused only)
Allow a user to configure the type of information
that they want to collect for the specific baseline
from the following:
    Which metrics to collect for the monitored
    applications
    Which statistics to collect for the monitored
    applications
    Utilization of the monitored interface
    Distribution of other activity on the monitored
    interface (ex. other applications)
    Utilization of the location grouping
    Distribution of the other activity of the
    location grouping
    Utilization of the server
Allow a user to set the time intervals over which
metrics and statistics are being calculated and
aggregated.
When in Roving mode, collect the performance
monitoring statistics for all applications that have
been turned on.
When in Roving mode, monitor only one application at
a time for a given time period.
For Roving Mode, providing the following methods to
control the time period for a specific application:
    The time period can be even distributed over a
    larger time block and all applications have an
    equal time period within the time block.
    (default)
    The time period can be manual changed by the
    end user
When in Roving Mode, collect RMON2-like statistics
for application that are not being monitored for
performance.
When in Flat Mode, collect the performance
monitoring statistics for all applications that have
been turned on.
When in Flat Mode, collect RMON2-like statistics for
application that are not being monitored for
performance.
When in Focused mode, only collect performance
information for a specific application or
application set focused on the following:
    Server
    Set of Servers
    Application
    Set of Applications TABLE 93-continued Application for location group
Application for a Set of clients (NOT ALL
CLIENTS)
Application for Individual Clients
When in Focused mode, not collect RMON2-like
statistics for application that are not being
monitored for performance.
When in Focus mode, only concentrate on the focus
set (application, server, set of servers, etc),
therefore the system may observe only those flows
that are associated with the focus set. No other
flows are monitored, therefore those packets from
non-monitored flows are dropped.
When in Baseline mode, if the network that is being
monitored exceeds a certain utilization, dropping
packets from flows that are currently not being
monitored.
Provide a configuration option in Baseline mode to
log the beginning of the occurrence of dropping
packets.
Provide a configuration option in Baseline mode to
log when the condition for dropping packets is no
longer in existence.
Discard existing flows when in Baseline mode if a
burst occurs on the flows that are being monitored
for which the system can not keep up with the
processing of packets for those flows.
Provide a configuration option in Baseline mode to
log the beginning of the occurrence of dropping
flows.
Provide a configuration option in Baseline mode to
log when the condition for dropping flows is no
longer in existence.
Keep a count of dropped packets.
Keep a count of dropped flows.

Monitoring Mode

Monitoring mode provides the mechanism for collecting a set of statistics and metrics that can be used for generating reports, alarming when monitoring thresholds are crossed, and observing changes in the monitored network.

Monitoring can be against a baseline or Plain monitoring mode. When monitoring against baseline, the system can use the exact same configuration that was used to create the baseline. When plain monitoring, the user can create his or her own configuration. The system can have the sub modes listed in Table 94 for the monitoring.

TABLE 94

Roving - Allowing a specific application to be
monitored exclusively for a given time slice. Once
the time slice is over, another application is then
being monitored exclusively
Flat - All configured application are being
monitored.
Focused - A set of application are being monitored
for a set of servers, clients, and/or location
group.

Application Monitoring can be set up to provide the functionality set forth in Table 95 below.

TABLE 95

Execute triggers when thresholds are crossed (See
Application Monitoring Triggers)
Provide views based on aggregation timers
Allow users to view the current active transactions When in Monitoring mode, the system can provide the functionality listed in Table 96.

TABLE 96

Allow a user to put the system into Monitoring Mode
manually.
Allow a user to put the system into Monitoring Mode
using a trigger.
Allow a user to put the system into Monitoring Mode
by loading an Application configuration.
Allow a user to configure how long the Monitoring
Mode will run.
Allow application configuration to monitor against a
specific Baseline.
Allow application configuration to just Plain
monitor.
For monitoring against the Baseline, use the submode
that was configured during the creation of the
Baseline.
When monitoring against a Baseline, not allow any
user change the configuration of the Baseline.
When monitoring against a Baseline, monitor use the
Baseline configuration including:

Monitoring sub-modes (Roving, Flat, or Focused)
Sub mode configuration
Applications to monitor
Time Intervals for collection
Set of servers
Set of clients
Set of location groups
Set of Metrics
Set of statistics
When Monitoring against a Baseline, provide a mechanism
to set up thresholds for monitoring using the Baseline
data.
When Plain monitoring, turn on individual applications
for monitoring on a per Media Module basis.
when Plain monitoring, turn off individual applications
for monitoring on a per Media Module basis.
When a trigger puts the system into a Plain monitoring
mode, monitor the supported applications found during
Discover Mode.
When Plain monitoring, allow the users to configure
the monitoring into one of the three sub-modes:

Roving
Flat
Focused
When in Plain Monitoring mode, allow a user to set the
time intervals over which metrics and statistics are
being calculated and aggregated.
When in Roving mode (Baseline and Plain), collect
the performance monitoring statistics for all
applications that have been turned on.
When in Roving mode (Baseline and Plain), monitor
only one application at a time for a given time
period.
For Roving Mode (Plain Monitoring only), provide the
following methods to control the time period for a
specific application:

The time period can be even distributed over a
larger time block and all applications have an
equal time period within the time block.
(default)
The time period can be manual changed by the
end user
When in Roving Mode (Baseline and Plain), collect
RMON2-like statistics for application that are not
being monitored for performance.
When in Flat Mode (Baseline and Plain), collect the
performance monitoring statistics for all
applications that have been turned on.
When in Flat Mode (Baseline and Plain), collect
RMON2-like statistics for application that are not
being monitored for performance.

TABLE 96-continued

When in Focused mode (Baseline and Plain), only collect performance information for a specific application or application set focused on the following:

Server
Set of Servers
Application
Set of Applications
Application for location group
Application for a Set of clients (NOT ALL CLIENTS)
Application for Individual Clients
When in Focused mode, not collect RMON2-like statistics for application that are not being monitored for performance.
Turn on Focus mode from Baseline mode or Plain mode for a specific application by a trigger (Called Auto Focus).
Create a Auto Focus parameter for a set of triggers.
When in Focus mode, concentrate only on the focus set (application, server, set of servers, etc), therefore the system may only observer flows that are associated with the focus set. No other flows are monitored; therefore those packets from non-monitored flows can be dropped.
When in Monitoring mode, if the network that is being monitored exceeds a certain utilization, start dropping packets from flows that are currently not being monitored.
Provide a configuration option in Monitoring mode to log the beginning of the occurrence of dropping packets.
Provide a configuration option in Monitoring mode to log when the condition for dropping packets is no longer in existence.
When in Monitoring mode, if a burst occurs on the flows that are being monitored for which the system can not keep up with the processing of packets for those flows, discard existing flows.
Provide a configuration option in Monitoring mode to log the beginning of the occurrence of dropping flows.
Provide a configuration option in Monitoring mode to log when the condition for dropping flows is no longer in existence.
Keep a count of dropped packets.
Keep a count of dropped flows.

Diagnostics Mode

In Diagnostics Mode, the system is focusing on a particular problem. During Diagnostic mode the system monitors data on a very focused set. During Diagnostics mode, the system may be capable of turning on Transport metrics to measure potential problems at the transport layer associated with a set of flows.

Diagnostic Mode is the only operation mode that the system can allow users to set up a capture. In addition the system may also allow the user to set up a filter that only allows packets to be analyzed and/or captured.

During Diagnostic Mode, some application may have additional metrics and components that can be measured or analyzed. The specific application publish those metrics and components.

Diagnostics can be performed on the items found in Table 97.

TABLE 97

Application
Server
Client
Location grouping
Monitored link

When in Diagnostic Mode, the system can provide the functionality listed in Table 98.

TABLE 98

Allow a user to put the system into Diagnostics Mode manually.
Allow a user to put the system into Diagnostic Mode using a trigger.
Allow users to capture packets during Diagnostic Mode (See Capture Section in the DSR).
The capability to switch out of Diagnostics Mode after a certain criteria has been met via a trigger.
Allow users to stop Diagnostic Mode.
Allow users to set up filters for monitoring.
Allow users to turn on transport metrics for the flows that are being monitored.
Allow users to turn on additional metrics or monitored components for the specific application that is being monitored if applicable.
Allow users to set up diagnostic for the following:
    Server problems
    Application Problems
    Client Problems
    Location grouping problems
    Monitored link problems Application Monitoring Basic Statistics Application monitoring statistics keeps track of basic statistics associated with transaction that are occurring on the monitored network. Since transaction may involve multiple application layers, statistics can be collected for each application layer. The first layer that application statistics can be kept involves the first application layer involved in the transaction called the base application layer (ex. HTTP, FTP, POP3, etc.). If the base layer application is a tunnel for another application (Oracle over HTTP) then a second layer of statistics is kept. The layer can continue. Further breakdown of a specific application can be done at the application verb level.

Another set of statistics that can be kept involves Content type, basically the type of data that is being transferred (ex. number of bytes involved in a JPEG transfers, number of MS Word documents transferred, etc.)

Statistic collection time intervals are based on how a specific Operating Mode is configured.

The system can provide the monitoring capabilities listed in Table 99.

TABLE 99

The capability to turn on the specific statistics to be collected for each application base layer and additional tunneled application layers.
The capability to turn on the specific statistics to be collected for each application verb.
The capability to turn on the specific statistics to be collected for each application content type.
The capability to collect statistics from the following perspectives (based on mode setup):
    For configured applications or application verbs from a specific location group
    For configured applications or application verbs from client perspectives
    For configured applications or application verbs from server perspectives
    For configured applications or application verbs from client/server perspectives
    For configured content type from a specific location group
    For configured content type from client perspectives
    For configured content type from server perspectives

TABLE 99-continued

For configured content type from client/server
perspectives
The capability to collect the following base
application layer statistics for each application:
    Number of transactions
    Number of packets
    Number of bytes
    Number of failed transactions
    Breakdown of error type for the failed
    transaction for the specific application
The capability to collect the following tunneled
application layer statistics for each application:
    Number of transactions
    Number of packets
    Number of bytes
    Number of failed transactions
    Breakdown of error type for the failed
    transaction for the specific application
The capability to collect the following application
verb statistics for each verb supported:
    Number of transactions
    Number of packets
    Number of bytes
    Number of failed transactions
    Breakdown of error type for the failed
    transaction for the specific application
The capability to collect the following Content type
statistics for each Content type supported:
    Number of file transfers
    Size of file
    Count of file size occurrence placed in file
    size count bins
    Average
    Packet Count associated with each transfer
    Count of packet count occurrence placed in
    packet count bins
    Average
    Byte Count associated with transfer
    Count of byte count occurrence placed in byte
    count bins
    Average Application Basic Monitoring Metrics Application monitoring collects metrics associated with specific applications. Metrics are used to determine how the application is performing within the given network. Performance can be characterized by the application's availability and responsiveness. Availability is measured by its number of successful transaction versus the total transactions for a specific application. This characteristic of the transaction is covered by the Application Monitoring Statistics part of the DSR.

Responsiveness for a specific application can be characterized by looking at the application verbs and classifying them by the transaction types set forth in Table 100.

TABLE 100

Transaction based
Throughput based
Stream based

Because the system is measuring application responsiveness through the monitoring network, the system would need to determine not just how the server performs for an application, but also how the location of the entities in the network impact the application responsiveness. Since the system sits near the core of the network or in front of the servers, the metrics collected may be capable of determining responsiveness from the client's or group of clients' perspective. Metric collection time intervals are based on how a specific Operating Mode is configured.

The system can collect metrics based on the time intervals set up by the operating mode. Further, application metrics can be collected from the perspectives listed in Table 101.

TABLE 101

For each application/application verb from a
specific location group
For a server for a specific application/application
verb
For an application/application verb from a server
perspective
For a server from multiple applications/application
verbs
For each application/application verb from a client Generics for all Transactions All transactions can have a basic set of metrics. These metrics are related to the beginning of the transaction. The system can keep the metrics listed in Table 102 for all transactions.

TABLE 102

Time between the end of the request to the start
response
Bin based on transaction time in milliseconds
Averaged Transaction Based Transactions For Transaction Orientated Based transactions, the metrics listed in Table 103 can be supported.

TABLE 103

On a per packet count basis for the request in bins
Average time between start of request to start of
response in milliseconds
Average time between start of the response to the
end of the response in milliseconds
On a byte count basis for a request in bins
Average time between start of request to start of
response in milliseconds
Average time between start of the response to the
end of the response in milliseconds
On a per packet count basis for the response in bins
Average time between start of request to start of
response in milliseconds
Average time between start of the response to the
end of the response in milliseconds
On a byte count basis for a response in bins
Average time between start of request to start of
response in milliseconds
Average time between start of the response to the
end of the response in milliseconds
Bins for request packet counts
Bins for request byte counts
Bins for response packet counts
Bins for response byte counts
Bins for time between start of request to start of
response in milliseconds
Bins time between start of the response to the end
of the response in milliseconds Throughput Based Transactions For Throughput Orientated transactions, the metrics shown in Table 104 below can be supported.

TABLE 104

Number of transactions
Average KBytes/second

TABLE 104-continued

Average Packets/second
Average packets/transaction
Average bytes/transaction
Bins for packets/transaction
Bins for bytes/transaction
Bins for packet/second
Average Kbytes/second Stream Based Transactions For Stream Orientated transactions, the metrics shown in Table 105 below can be supported.

TABLE 105

Number of transaction
Ratio of Quality of service expected during setup/Type of service actually received from the network
Ratio for the accumulated time of disrupted service and over transaction time. Disrupted service is related to the following:

Detected drop packets
Detected packets delayed passed a certain threshold
Packets out-of-order
Bins for ratio distribution in each direction
Bins for Kbytes/second during the duration of the stream in each direction
Bins for number Dropped Packets in each direction
Bins for time between packets in each direction
Bins for size of packets in bytes in each direction
Bins for number of packets in each direction
Bins for number of bytes in each direction
Average Kbytes/second during the duration in each direction
Average time between packets in each duration Derived Metrics The system may have the capability to derive new metrics using the collected metrics and other collected statistics.

Application Protocol Specific Capabilities and User Defined Applications

Each application that is being monitored has its own unique characteristics. The applications have a set of commands and responses (verbs), a set of content information that they transfer, set of errors, set of potential anomalies that can be detected, and specific data transmission characteristics (ex. tunneled, streamed, bulk transfer). Each monitored application may publish its characteristics. In addition, the system can allow users to add their own application with a set of limited monitoring capabilities.

Each application supports the basic set of application monitoring statistics (See Application Monitoring Statistics) and a basic set of metrics (See Application Monitoring Metrics). If the application has decomposed the application into verbs, each verb can also support the basic statistics and metrics.

Each application may provide deeper analysis for monitoring the application and diagnosing any anomalies that have been detected. The system can provide a mechanism to publish how each application is decomposed and which application characteristics are being monitored.

Each application can have a set of metrics, statistics and verbs that it monitors when in Baseline, Monitoring and Diagnostic mode. Each application can also have a set of triggerable objects in Baseline, Monitoring and Diagnostic mode.

Table 106 lists additional functionality of the system.

TABLE 106

Allow a user to add user-defined applications upon supported application and transport layers by defining certain port numbers, tags and location within a packet for tags.
Allow a user to select the set of basic generic metrics that could be collected.
Allow a user to select the set of basic generic statistics that could be collected.

Transport Metrics

Transport metrics are used to help determine if there are problems that are occurring at the transport layer, such as retransmissions, dropped, out-of orders etc. Preferably, Transport metrics can only be turned on when in diagnostic operating mode The system can have the capability to turn off and on transport metric collection when in diagnostics mode. Further, the system can allow users to chose the transport metrics that they want to collect. The transport metrics listed in Table 107 can be supported.

TABLE 107

Retransmission
Out-of-orders
Dropped packets

Network Responsiveness Metrics

Network responsiveness can be independent of the application that is being monitoring. It is used approximate network delay that could impact the application's responsiveness and availability. The network responsiveness may be determined for all groupings, including between the monitored link and the servers. The Network Responsiveness Metrics can be turned on in Baseline, Monitoring and Diagnostic modes The system can allow users to control how often network responsiveness metrics are taken. Further, the system may allow users to control the duration for collecting the metric. The system can also allow the user to chose the set of metrics they want to use for the calculation from the items listed in Table 108.

TABLE 108

Connection Time (For connection orientated connections)
Any client acknowledgment times.
Any server acknowledgment times.
Graceful disconnect connection times During the duration of collecting the metrics, the system can calculate the approximate network delay for each location grouping. When the metrics are being collected, the system may have a decrease of performance.

Trigger Functions

General Description

Triggers may be used in the system. Table 109 lists functions that the triggers control.

TABLE 109

How applications/protocols are being monitored
Transition between operating modes
Which application receives the processing focus

TABLE 109-continued

Which server(s) and or/client(s) receive the processing focus
When and how users get alerted of occurrence of events
When data gets saved to disk
When packet filters are applied
When capture starts and stops
When trending starts and stops
When a log entry is created
Others Triggers are mechanisms that produce certain actions in response to specified events. Furthermore, triggers may require certain conditions to be satisfied before an event results in an action. For example, when a specific metric is calculated after a flow is completed (event—metric calculated), the system can check if the metric is below a certain threshold (condition). If the condition is true, the system may send an alert to the set of users specified in a specific list (action).

Both the application server and the media modules may be implementing triggers. The system can be capable of creating triggers for the application server. The system may also be capable of creating triggers for any media module. Ideally, the system is capable of creating triggers for all media modules.

Trigger Syntax

Creation of a trigger requires associating an event with an action or actions and, possibly, with conditions. Trigger syntax may allow the user to combine simple conditions using logical operators. The following operators can be defined: NOT, AND, and OR, with NOT having the highest precedence, and OR the lowest precedence. There can also be a mechanism for changing this precedence when combining simple conditions (having the same effect as parentheses in a mathematical expression).

The above operators are sufficient for defining logical expressions of arbitrary complexity. However, the logical functions set forth in Table 110 can also be defined as a convenience to the user.

TABLE 110

At least one in a list (TRUE when one or more conditions from a specified list are TRUE);
N in a list (TRUE when exactly N conditions from a specified list are TRUE);
At least N in a list (TRUE when N or more conditions from a specified list are TRUE);
At most N in a list (TRUE when N or fewer conditions from a specified list are TRUE);
At least N but no more than M in a list (TRUE when N or more, but no more than M conditions from a specified list are TRUE);
All in a list (TRUE when all conditions from a specified list are TRUE).

Events

Each part of the system that wishes to offer some of its events as trigger events needs to publish them. Publishing an event makes it available for use in creating triggers. The system can support the media module trigger events listed in Table 111.

TABLE 111

Date and time
Timers
Application Monitoring events associated with collection of statistics on various monitoring objects
Application Monitoring events associated with creation, change of state, or deletion of monitoring objects
Instantaneous events when a packet arrives
A metric associated with the completion of a flow.
A metric associated with an aggregation of object data over a certain time period.
Packet received in the capture buffer
Certain type of packet has been received Table 112 lists application server trigger events supported by the system.

TABLE 112

Date and time
Timers
Multiple Interface events associated with collection of statistics on various monitoring objects
Multiple Interface events associated with creation, change of state, or deletion of monitoring objects
An event received from a Media Module
Media Module reset
Media Module installed
Media Module removed Conditions Two types of conditions are available:

1. Binary conditions, which express the presence or absence of a feature. An example of a binary condition is capture being active (or non-active)
2. Relational conditions, which verify whether a numerical value belongs to a specified set. Examples of relational conditions are application/protocol being in certain states (if there are more than two possible states) or bandwidth utilization by a certain application being above a threshold.

Each part of the system that wishes to define conditions available for constructing triggers publishes them. If a condition is relational, the type and range of associated values are published as well. Table 113 below lists several supported conditions.

TABLE 113

A monitored value is below a threshold
An monitored value is above a threshold
An monitored value is equal to a threshold
An monitored object is in a certain state
A timer counted down to zero
The time of day equal a certain value
Capture is active Actions Each part of the system that wishes to define actions to be initiated by triggers needs to publish them. If initiating an action requires a specification of some parameters, the type and range of acceptable values have to be published as well.

Table 114 lists several Media Module actions supported by the system.

TABLE 114

Switch operating mode
Turn on or off a specific application with specified parameters (ex. which server, client, set of clients, etc.)
Send an alert
Clear an alert
Activate another trigger or a set of triggers
Send an event to the application server
Start Capture
Stop Capture
Start timer
Stop timer
Increment/decrement a count The system can also support the Application Server actions set forth in Table 115.

TABLE 115

Switch operating modes on a Media Module or Multiple Media Modules.
Turn on or off a specific application with specified parameters (ex. which server, client, set of clients, etc.) on a Media Module or Multiple Media Modules
Send an alert to a set of users
Clear an alert to a set of users
Activate another trigger or a set of triggers
Start Capture on a Media Module or multiple Media Module
Stop Capture on a Media Module or multiple Media Module
Store data to disk
Move data to another server
Start timer
Stop timer
Increment/decrement a count Creating Triggers Triggers can be creatable through the GUI interface or they can be downloadable from the remote computer and installable on the node. In either case they are checked against a user's security and permission ACLs (Access Control Lists). The user can be allowed to create single triggers or groups of triggers. Acceptance and activation of a trigger group can be an atomic operation: all (whole group checked for correctness and checked against ACL) or none.

Trigger Builder (Wizard)

The Trigger Builder can expose all published events, conditions, and actions to the user. For each event selected by the user, the Trigger Builder may indicate which conditions are defined by the same Media Module (or Application Server Module), and which ones are defined by a different Media Module (or Application Server Module).

When the user defines a trigger whose event or (at least some) conditions are associated with a Media Module, the Trigger Builder may offer the possibility of defining a similar trigger for other Media Modules by copying the defined trigger's configuration. The Trigger Builder can support a simple and an advanced mode of operation. In the simple mode one creates trigger's logical expressions using preloaded list boxes and combo boxes. In advanced mode one can input trigger expressions by free hand.

During expression creation the expression can be checked for correctness with visual indicator change when the expression is not correct as typed in advanced mode or assembled in simple mode.

Trigger Files

The user can be allowed to make trigger scripts/expressions persistent on the Application Server with assigned user friendly names. These saved triggers can be reinstallable through the GUI and transferable between the node and the client machine as trigger script files.

Chaining Triggers

The system may allow triggers to generate an event to activate another trigger (called chaining). Chaining of triggers within media module triggers is allowed, as is chaining of triggers within application server triggers. The system can also provide chaining of triggers between an application server and media modules.

Activating Triggers

The system can allow a user to activate triggers. Another trigger can also activate a trigger. When the system activates a trigger, the trigger becomes active immediately. The user can also activate trigger groups. The system can allow another trigger to activate a trigger group. Preferably, when the system activates a trigger group, all triggers in the group become active immediately.

Deactivating Triggers

The system is capable of having a user and/or another trigger deactivate triggers. When the system deactivates a trigger, the trigger can be deactivated immediately. The user and/or another trigger can also deactivate trigger groups. When the system deactivates a trigger group, the trigger group is deactivated immediately.

Deleting Triggers

Triggers and trigger groups can be deleted.

Capture Functions

The Capture Functions provide a mechanism for the network manager to view packets that where received over a specific interface. The network manager may be able set various filters that focus the view. The filtering can be done at the point of the actual capture or filter within a captured set. Captured data can also be stored for further later viewing as well as additional processing by other software programs outside the scope of the system.

The system can present captured information to a user interface and store captured information in a file. Each Media Module can have a capture capability.

Timestamps

The timestamp provides way to determine when packets are received relative to each other. Accuracy of the timestamp varies. If no external time source is driving the timestamp mechanism between multiple interfaces, the error of timestamps between these interfaces could be very significant. The system may have the capability to synchronize timestamp subsystems (See the System Timing subsection) within the chassis as well as between chassis. This timestamp scheme can provide a network manager and software programs to analyze captured data across different interfaces with a high degree of accuracy.

Timestamping capabilities are set forth in Table 116.

TABLE 116

Add a timestamp to every capture packet.
Use an external time source for synchronizing timestamps with other systems.
Use an internal time source for synchronizing timestamps within the system.
Provide a timestamp field of captured data, preferably with 10 ns of resolution.

The size of the timestamp can be 52 bits for example, which may wrap after 521 days.

Filters

The system provides a capture capability that allows the user to see everything on the network interface. On a very high-speed network interface, the amount information that the user and system has to processing can be overwhelming. The system may provide filter mechanism that focus the captured information that the user or software program sees. Filters can be simple (ex. source MAC address) or complex (ex. Set of IP address within this subnet that are using FTP). The filtering provided by the system can be categorized with the groups listed in Table 117.

TABLE 117

Media Filters
Protocol Filters
Pattern (String) Matching Filters
Complex Filters The system can provide inclusion-filtering capability and exclusion-filtering capability.

Media Filters

The system can support 16 or more pattern-matching filters that start from the beginning of the packet. As an option, only packets that have a certain error condition are filtered. As a further option, only packets that match a specific set of MAC Addresses (Source or Destination) may be included. Additionally, only packets that include a specific VLAN Group can be included. The system can also support including only packets below/above/equal to a certain size.

Protocol Filters

The system can support filters to include packets of a certain protocol or sets of protocols. The system can also support filters to include packets from a specific network address or a set of network addresses.

Pattern Matching Filters

The system may support filters that apply a pattern based on an offset from the start of a protocol encapsulation that is supported by the system.

Complex Filters

The system may support combining multiple filters with BOOLEAN logic to create complex filters.

Capture Triggers

Capturing packets from an interface can be triggered by a user starting a capture from the capture user interface or by an event that occurs within the system.

When the system receives a Start Capture Trigger, the system can start capturing packets using the criteria found in Table 118 below.

TABLE 118

Enabled filters
Slicing Options
Buffer Mode
Destination (Trace file or User Screen)

The system can stop a capture when it receives a Stop Capture Trigger. The system can also stop capture when the capture buffer is full if the buffer mode is not Wrap Mode. The system can also capture N Bytes after a stop trigger is received when the capture interface is in Wrap Mode.

Packet Truncation

The system preferably supports the frame slicing options listed in Table 119 below.

TABLE 119

64 Bytes
128 Bytes
256 Bytes
384 Bytes

Capture Buffer Mode

The system may support the buffer modes listed in Table 120 below.

TABLE 120

Full Mode - Capture stops when the buffer is full
Wrap Mode - When the capture gets to the end of the
capture buffer, the system can overwrite the oldest
packets that were received.

Capture File Format

The system can support any suitable file format for the captured packet.

User Interface Functions

The system can provide many user interface functions. Table 121 below sets forth several such user interfaces.

TABLE 121

Security Management Interface
Policy Monitoring Interface
Performance Management Interface
Network Engineering Interface
Fault Management Interface
Accounting Interface
Software License Interface - The system can support
user interfaces to provide end users to enable
various system features described in the License
section herein.
Capture Interface - The system may support the
Capture functionality described in the Capture
Section. The system can also provide a mechanism to
transfer captured trace files to a sniffer located
within the network.
Triggers Interface - The system may support the user
interfaces to provide end users with control over
Trigger functionality described in the Triggers
section. This can be done for Media Modules and
Application Server.
PMD Configuration - The system can provide the User
Interfaces for the mode that the physical interface
is monitoring including:
    Normal
    SPAN Port
    Repeater
System Configuration - The system can include user
interfaces that allow end users to control the
system configuration functionality described in the
System Configuration section of.
System Faults - The system can support the user
interfaces to permit end users to control the system
faults functionality described in the Alarms
section.
Software Upgrade - The system can support the user
interfaces to allow end users to upgrade the system
software as described in the Upgradeability section.
Client Registry - The system is capable of adding
and removing users from the Client Registry. The
Client Register may also control the type of
operations/privileges the users can have.

TABLE 121-continued

User Configuration Interface - Each user may have
the capability to create their own configurations.
Several configuration options are:
    Type of reports
    Type of graphs
    Triggers
    Protocols to monitor
    Others
Trending
Web Interface
Programmer's API
Event Notifications Interfaces - These include:
    a user interface to control how events are
    being notified to the end users.
    a user interface for creating event groups.
    a user interface for deleting event groups
    a user interface for adding users to the event
    group.
    a user interface for removing users from the
    event group.
    a user interface to allow a user to set up the
    events within the system that the user wishes
    to be notified for (NOTE: Events can be created
    through the Trigger Interface, or Expert
    Interface).
    a user interface to remove an event that a user
    or an event group has set up.
    a user interface for displaying all the
    available events within the system.
    a user interface to configuring event
    notification on a per user basis on an event
    basis.
The options for event notification can be any one of
the following:
    An event message to a client machine.
    An email sent to a specific e-mail address
    A page sent to a specific pager number with the
    appropriate message
    Log to the event log
Event Logs - The system may allow a user to view the
event log on a per user basis based on the events
specified by the user. The system can allow a user
to view the event log on a event group basis based
on the events specified for the event group.
Statistics Logs
Reports
Alarm Interfaces Alarms Crucial parts of the Application Server, parts of the OS and node services, can be located in flash memory. In the case of a critical fault (Hard Drive crash) the Application Server, logging and notification services stay intact and may attempt to notify the end user about the problem.

Interface

Media Module faults are logged and the end user is notified about the fault. Means for fault notification can be configurable with a predefined default. The client interface may display all the alarms that are received from the Node. The alarms that get displayed can be based on any filters a user may set.

The system can display the summary information of Table 122 (for every alarm) in each alarm window.

TABLE 122

Alarm ID. Alarm ID is preferably generated by the
system. It is a sequential number.

TABLE 122-continued

State. State can have the values active,
acknowledged, cleared.
Severity.
Alarm type.
Source.
Alarm (event) date/time.

Alarm Processing

The system can process the types of alarms set forth in Table 123.

TABLE 123

Communication
Equipment
Processing

The system can also display the properties listed in Table 124 below for each alarm.

TABLE 124

Alarm ID.
Source
Specific problems.
Perceived severity.
Threshold information.
Triggered threshold.
Threshold level.
Proposed repair actions.
Event type.
State.
Alarm date/time.
Clear date/time.
Acknowledge date/time.

The system preferably displays alarms received from a node to the user within 5 seconds of receipt. The system can graphically indicate the location of a module with a fault on the topology. The system can also allow users to set the state of an alarm to "acknowledged".

Clearing Alarms

The system allows users to manually set the state of an alarm to "cleared". This is also known as a force clear. The system may process "clear" notifications received from the Node. The system can set the state of all active alarms to "cleared" whose source, event type and attributes match the clear notification's attributes. In response to a clear notification from the Node, the system does not attempt to clear an alarm that has already been "cleared" manually by a user.

Alarm Filtering

The system allows users to set different filters for different alarm windows. The system may allow users to filter alarms displayed in an alarm window. The filter can be based on the attributes listed in Table 125 below.

TABLE 125

Severity (critical, major, minor, warning,
informational, clear).
State (cleared, acknowledged, active).
Start date/time.
End date/time.

To define alarm filters, the system can allow users to specify any combination of the values listed in Table 126 below for severity.

TABLE 126

Critical.
Major.
Minor.
Warning.
Informational
Clear.

To define alarm filters, the system can allow users to specify any combination of the values in Table 127 for state.

TABLE 127

Active.
Acknowledged.
Cleared.

Alarm Discovery and Synchronization

The system can discover all current and cleared alarms upon initial connection to the Node. In case of communication loss with the Node, the system synchronizes all alarms (current and cleared) with the Node's current alarms (current and cleared) upon reconnection to the Node. The system may allow users to manually invoke synchronization of alarms (current and cleared).

Alarm Logs and Aging

The system may store all alarms in a persistent store. The persistent store is known as the alarm log. The size of the alarm log can be set by the user. The system can wrap the alarm log if it exceeds the size set by the user. The oldest alarm is preferably overwritten first.

The system can periodically perform an alarm aging process on all alarms in the on-line alarm log. A copy of all alarm records for which the difference from the time that the alarm occurred to the current time is greater than the alarm aging interval can be placed in an offline log. Each alarm record that is copied to the offline log can be removed from the on-line log. The system can create a new backup log each time the system performs the alarm aging process. Each time the aging process starts, a new backup log is created and alarms are moved to it.

The time period (interval) for alarm aging can be user configurable. The user can specify the interval in any one of the units listed in Table 128.

TABLE 128

Hours.
Days.
Weeks.
Months.
Years.

Alarm Bubble-up

The system can provide the ability to graphically display faults on lower level entities to the higher level supporting entity(s), i.e. if a monitoring interface is in fault, the fault can be highlighted all the way from the media module to the system to the site to the network.

Management Interfaces

Physical

10/100 Ethernet

The management interface can support 10/100BASE-T physical layers, and another 10/100BASE-T interface for redundancy. The management interface also provides a shielded RJ-45 modular connector.

Serial Interface

Terminal Interface

The system can support management through a terminal interface using the serial interface. The terminal interface preferably uses secure communications.

Modem Interface

The system supports a serial interface for an external modem, including a PMC modem. The modem interface also uses secure communications. The system also allows dial-out access for paging support through the modem interface. Dial-in access through the modem interface can be allowed, but can also be disabled by an administrator if a customer policy dictates. Dial-in access preferably supports PPP as would be provided by a dial-up Internet account through a traditional Internet access provider (ISP).

VGA, Keyboard, and Mouse Interface (S)VGA, Keyboard and Mouse Interfaces provide an emergency UI for local management of the System. During normal operation the system can boot and run without the monitor, keyboard or mouse.

Logical

HTTP/Java

The system can support all GUI through an HTTP/Java Web interface. The Java interface may support Java Beans based User Interface servlets. The system can also support Microsoft Internet Explorer and Netscape Navigator/Communicator.

The Java Beans servlets support the following illustrative Operating Systems: Windows NT, Windows 2000, Linux, and SunOS.

If a Browser does not support the version of Java, the system can provide a link for the user to download the appropriate JVM.

Telnet

The Telnet type interface provides the system administrator with direct emergency access to the Unix shell and the operating system. The system can support SSH (Secure Shell).

PPP

The PPP interface provides remote emergency access via modem to the system when regular network connection is not available. The system may support PPP through the Serial Interface.

FTP

The FTP type interface provides means for downloading software updates to the Node and uploading data from the node. Preferably, the system does not allow unsecured FTP services. The system supports SFT (Secure File Transfer).

Mail

The Unix/Linux mail system can be used by the node for automated email type event notifications.

System Faults

Software

The system can emit an alarm if a software load has been corrupted, if a software download fails, and if a software download is successful.

Application Server

In an event that the Application Server is no longer able to communicate to its clients, the client can emit an alarm that it is no longer in contact with the application server.

In an event that the Application Server re-establishes communication to its clients, the system is responsible for clearing the original loss of communication alarm. The clearing of this alarm is notification that communication has been re-established.

In an event that the Application Server is no longer able to communicate to the Rear Transition Module Hard Drive, the system can emit an alarm that the RTM Hard Drive is no longer operational. Note: The assumption is the OS is installed and running on on-board CompactFLASH. This configuration allows the OS to operate and emit alarms until the RTM Hard Drive has been repaired or replaced.

In an event that the Application Server is no longer able to communicate to the Rear Transition Module, the system can emit an alarm that the Rear Transition Module is no longer operational. This event can also emit several other critical alarms for all of the Rear Transition Module Interfaces listed in Table 129.

TABLE 129

Serial Interface
Ethernet Interface
Hard Drive interface

The system can emit a Loss of Communication alarm when it is no longer able to communicate with a media module. This alarm is not emitted if the Media Module is removed from the system. The fault that is generated is Card Removal fault.

The system can also emit an alarm to its clients before the application server enters a reset mode from a watchdog timeout. In the event a reset occurs the clients may also have the ability to detect that the application server is no longer communicating and generate faults to the user so they are aware that the application server is unavailable. The clients during this condition may try to reinitiate the connection.

The system supports Card Insertion alerts for the card types of severity Informational. Illustrative card types are set forth in Table 130.

TABLE 130

Gigabit Ethernet Module
Rear Transition Interface Module
Application Server

The system supports Card Removal alerts for card types of severity Major, listed in Table 131.

TABLE 131

Gigabit Ethernet Module
Rear Transition Interface Module
Application Server

The system supports Card Mismatch alerts for the card types, listed in Table 132, of severity Major.

TABLE 132

Gigabit Ethernet Module
Rear Transition Interface Module
Application Server

Power

The system supports Power Supply High Temperature Alerts of severity Critical. This alert is generated by the signal pin DEG#, which reports an error when the power supply is within 10° C. of shutting down.

The system can support Power Supply Failure Alerts of severity Critical. This alert is generated by the signal pin FAIL#, which reports an error when the power supply has failed.

The system may support +12-volt Power Supply Voltage Failure Alerts of severity Critical. This alert is generated by the signal pin +12S, which reports an error when the +12-volt power supply has failed.

The system may support +5'-volt Power Supply Voltage Failure Alerts of severity Critical. This alert is generated by the signal pin +5 S, which reports an error when the +5-volt power supply has failed.

The system may support +3.3-volt Power Supply Voltage Failure Alerts of severity Critical. This alert is generated by the signal pin +3.3S, which reports an error when the +3.3-volt power supply has failed.

Airflow/Temperature

The system may support all Fan Failure Alerts of severity Critical. The system can also support High Temperature Alerts for the card types of severity Critical in Table 133.

TABLE 133

Gigabit Ethernet Module
Application Server
Rear Transition Module

System Administration

Security Administration controls access to the management functions of the management system and equipment. It tracks all changes that affect the operation of the network.

Security and Privilege Levels

The system can limit access to the node via user-id and password verification.

The system can maintain four levels of user access, as set forth in Table 134.

TABLE 134

Administration Level (Level 1)
Session Manager Level (Level 2)
Technician Level (Level 3)
Reporting Level (Level 4)

The system can maintain a profile for each user. The items in Table 135 are maintained.

TABLE 135

User Name.
Password.

TABLE 135-continued

Last login date/time.
Access level.

The system authenticates each user action, based on user information, related to fault, configuration and/or performance. The system can maintain a log of all user logins. The system can also maintain a log of all user sessions. This log includes the information listed in Table 136.

TABLE 136

User Name
Object Name
Date
Time
Operation
List of:
Attribute Name
Attribute Value
Revised Attribute Value Administration Level (Level 1)

The administrative account level may have access rights to all machine configuration and monitoring capability. The system can provide the functionality in Table 137 to an Administrative (Level 1) user.

TABLE 137

Create / delete users accounts.
Assign default passwords.
Network configuration, IP address, hostname DNS, and Gateway, trap manager address assignment.
Establish connection with new Nodes.
Backups and log file cleanup.
View all session logs.
Manage file systems.
Create / delete objects.
Set alarm states (to clear and/or acknowledge).
Modify object attributes.
Disable objects (i.e. set the administrative state to "locked" in the partition.
Perform supported actions on objects.
View notifications (and the information contained within the notification).
Create all Reports available by the system.

Session Manager Level (Level 2)

The session manager account level has privilege access to all functionality as it pertains to the monitoring and analysis capability. The system can provide the functionality listed in Table 138 to a Session Manager (Level 2) user.

TABLE 138

Establish connection with new Nodes.
Create / delete objects.
Set alarm states (to clear and/or acknowledge).
Modify object attributes.
Disable objects (i.e. set the administrative state to 'locked') in the partition.
Perform supported actions on objects.
View notifications (and the information contained with-in the notification)
View configuration and fault logs
Create all Reports available by the system.

Technician Level (Level 3)

The system may provide the functionality listed in Table 139 to a Technician Level (Level 3) user.

TABLE 139

Modify object attributes.
Disable objects.
Set alarm states to acknowledge.
Perform supported actions on objects.
View notifications (and the information contained with-in the notification)
View fault logs
Create all Reports available by the system.

Reporting Level (Level 4)

The system can provide the functionality listed in Table 140 to a Reporting Level (Level 4) user.

TABLE 140

View object attributes.
View notifications.
Create all Reports available by the system.

System Configuration

Application Server

The Application Server detects when a Media Module is plugged in to the chassis. When the Application Server detects a new Media Module in the system, the Application Server performs the functions listed in Table 141.

TABLE 141

Log the event in to the system log with the media module information including:
    Slot ID
    Media Module type
    Media Module serial number
    Hardware Version number
    Software version number
Verify that the Media Module has the most recent software version number (if not up to date, the Application Server can download the new code)
Provide any configuration required for the Media Module if available (configuration may match the Media Module type)

When the Application Server detects a Media Module reset, the Application Server logs the event into the system log with the media module information and the reason for the reset if known. The Application Server can allow users to preprogram configuration information for all anticipated Media Modules.

The Application can also have the capability to configure multiple Media Modules to monitor the same interface when Media Modules are using the repeater function. When multiple Media Modules are monitoring the same interface, the Application Server can configure each Media Module differently (ex. One in diagnostic monitoring mode for a specific application, while one running flat or roving mode basically doing APM based metrics). The Application Server can preferably configure interfaces on multiple Media Modules as a single Multiple Interface Correlation group.

The Application Server is preferably configured with an IP Address, a Server Name, and a Domain Name Server Address. The system can also add users with different rights. The system can also remove a user with different rights.

User Authentication

The Application Server may be capable of using TACAS+ or RADIUS client functionality for user authentication. The Application Server is capable of configuring TACAS+ or RADIUS client functionality. The Application Server may be capable of being a RADIUS Server for managing user authentication. The Application Server can also use SRS for user authentication.

Application Server Span Port Configuration

The Application Server may provide a mechanism to control SPAN ports that are attached to the Media Modules. The Application Server can communicate with the switches for controlling the monitored ports via SNMP through the Application Server's Management Interface. SPAN port switching can be controlled either manually by a user or by a configured trigger.

When a monitored port is switch, the Application performs one or more of the functions listed in Table 142.

TABLE 142

Log the event
Inform the Media Module of the change with the new port identity
Save any persistent information for the old port
Start the analysis based on the previous port configuration
Identify the new port (any persistent data can be associated with the new port)

When two interfaces on a Media Module are monitoring via SPAN ports, the system analyzes both interfaces using the same monitoring mode and application/protocol experts Since the Media Module can be attached to two SPAN ports, the Application Server can control each SPAN port independently (except with monitoring mode and active experts).

Application Server Notification Interface

The system allows configuration of how users get notified of configured alarms. A configuration interface is also provided for adding pager numbers that are associated with a specific user, for sending a page to a user or a group of users when an alarm occurs, for sending an e-mail to user(s) when an alarm occurs, and to send an SNMP trap to a user or group of users when an alarm occurs.

Software License Functions

The Application Server can have a License Key Manager that manages the software license for all software modules in the system. A software license function only turns on features that have been purchased by the end customer and denies any access to features that the end user has not purchased. The features can be licensed on a per Media Module basis or a corporate wide license.

Media Module

When a media module is installed it communicates with the application server and performs the functions listed in Table 143.

TABLE 143

Send an event in to the system log with the media module information including:
    Slot ID
    Media Module type
    Media Module serial number
    Hardware Version number
    Software version number
Update the Media Module code if the Application Server has a more recent software version.
Receive any configuration from the Application Server The Media Modules in the System has one of the states set forth in Table 144 below.

TABLE 144

Configured but not installed - Configuration is created for a Media Module in a specific slot but the Media Module is not installed
Installed but not configured - A media module is installed, but it is not yet configured
Initialization Initializing the system and then transition to Active
Active Each Media Module has the object listed in Table 145 associated with it.

TABLE 145

Module Type
Module Serial Number
Hardware Version
Software Version

Each Media Module has the configurable objects listed in Table 146.

TABLE 146

Media Module Name
Interface Name (For Span Port there may be two names that change when the monitored port changes)

Multiple Media Modules may have the capability to be attached to the same network interface either by using external splitter or using the repeater function of the Media Module.

Media Module SPAN Port Configuration

The Gigabit Ethernet Media Module can support two or more span ports. When a port is switched, the Media Module is informed of the change and performs the functions listed in Table 147 below.

TABLE 147

Store any persistent data that has not yet been stored and tag with the appropriate interface name
Reclaims all Media Module resources with the changed port
Starts processing data with the Media Module configuration prior to Port change (ex. Experts, RMON configuration when applicable, etc.)
Sends an event to RMON managers when applicable Repeater Functionality Media Modules can provide a repeater function. When the repeater function is enabled on the Media Module, the input data is transmitted on the associated output interface, and the system may or may not provide any auto negotiation. The system preferably allows multiple Media Modules to monitor the same interface by using the repeater function. When multiple Media Modules are monitoring the same interface, the interface name can be the same. Ideally, when multiple Media Modules are monitoring the same interface, the Media Modules may have the capability to monitor items in different modes and applications/protocols. A media module may or may not be capable of supporting SPAN Port and repeater functionality simultaneously.

Monitoring Interfaces

Gigabit Ethernet

Physical

The monitoring interface allows the use of hot-swappable industry standard GBIC devices. The monitoring interface can provide a pair (2) of identical GBIC devices to allow for monitoring of both sides of a duplex channel. The system can support full- and half-duplex operation. Different GBIC devices can be mixed for an application. The GBIC devices preferably provide low-loss, duplex SC-type, push-pull, optical fiber connectors for optical implementations. Ideally, the GBIC devices provide a shielded RJ-45 modular connector for CAT5 UTP implementations, a HSSC or DB-9 connector for 1000BASE-CX implementations, and support for the physical layer of the ANSI Fiber Channel standard and the IEEE Gigabit Ethernet standard. The monitoring interface preferably supports the layers in Table 148.

TABLE 148

1000BASE-LX physical layers, which allow the attachment of 50/125 um and 62.5/125 um MMF fiber cables and the attachment of 10/125 um SMF.
1000BASE-SX physical layers, which allow the attachment of 50/125 um and 62.5/125 um MMF fiber cables.
1000BASE-CX physical layers.
1000BASE-T physical layers.

End Station (SPAN Port) Physical Interface

The system can include a 2 SPAN port interface behaving as an end station. Each SPAN port physical interface may have the capability to auto-negotiate with the switch.

Repeater Function Physical

When the system is configured to provide the repeater function, the system sends to the transmit interface all data that it receives on its receiving interface. Preferably, the system only provides repeater functions to other system monitoring devices (Media Modules).

Logical Full Duplex Non-SPAN Port

The system can recognize the Pause Command. The state of the interface is one of the states listed in Table 149.

TABLE 149

Disabled - Default
Enabled/Waiting for Initial Sync from Line 1/2
Enabled/Waiting for Initial Sync from Line 1
Enabled/Waiting for Initial Sync from Line 2
Enabled/Pause from Line 1/2
Enabled/Pause from Line 1
Enabled/Pause from Line 2
Enabled/Loss Sync from Line 1/2
Enabled/Loss Sync from Line 1
Enabled/Loss Sync from Line 2
Enabled When the system enables an interface, the interface can attempt to synchronize to both sides of the full-duplex link and move to Enabled/Waiting for Initial Sync from Line ½ state.

Logical

The state of the interface is one of the states listed in Table 150.

TABLE 150

Disabled - Default
Enabled/Waiting for Initial Sync from Line 1/2
Enabled/Waiting for Initial Sync from Line 1
Enabled/Waiting for Initial Sync from Line 2
Enabled/Pause from Line 1/2
Enabled/Pause from Line 1
Enabled/Pause from Line 2
Enabled/Loss Sync from Line 1/2
Enabled/Loss Sync from Line 1
Enabled/Loss Sync from Line 2
Enabled When the system enables an interface, the interface can attempt to synchronize to both sides of the full-duplex link and move to Enabled/Waiting for Initial Sync from Line ½ state.

Protocols

The system can be programmed to support any desired protocol.

Gigabit Ethernet Statistics

The monitoring looks at basic performance over the physical interface. The performance on the physical interface can have an impact on how the specific application/protocol may get impacted. Table 151 below lists statistics collected by the system for each link for each interface.

TABLE 151

Frame Counts (64 Bits)
Octet Counts (64 Bits)
Runt Frames <64 no CRC error
Runt Frames with CRC error
CRC Errors
CV errors
Broadcast Frames
Multicast Frames
Unicast Frames
Frames at 64 Bytes - VLAN Bytes
Frames 65 to 127 Bytes - VLAN Bytes
Frames 128 to 255 Bytes - VLAN Bytes
Frames 256 to 511 Bytes - VLAN Bytes
Frames 512 to 1023 Bytes - VLAN Bytes
Frames 1024 to 1518 Bytes - VLAN Bytes
VLAN Frame Count
Jumbo Frame Count
Jumbo Frame Byte Count
Number of Pauses from link 1
Number of Pauses from link 2
Total Pause Time from link 1
Total Pause Time from link 2

The system can allow the triggerable events for the Gigabit Ethernet module as listed in Table 152.

TABLE 152

Start of a Pause
Start of data transmission after a PAUSE
Threshold crossing of any collected object
VLAN Group occurrence When the interface receives a Pause from one of the links and an event is sent, the event can include the information in Table 153.

TABLE 153

Link number
System Time
Pause Timer Value
Number of packets during last interval
Number of bytes during last interval When the interface receives the first packet after the Pause from the link, and an event is sent, the event includes the link number and system time.

Supported Applications/Protocols

The system can support many different protocols and applications with varying support for each. The specific protocol/application provides a description of the level of support and then the specific detail description of how it is supported. Table 154 lists the different levels of support that a protocol/application may have.

TABLE 154

RMON 2 Like Statistics Support - This is defined as supporting the collection and displaying basic statistics that are defined by the RMON2 Like Application.
Application Monitoring - This is defined as supporting application performance monitoring. Included in this level of support can be the application verbs, basic metrics, and statistics
Application Expert Support - This is defined as deeper application support.
Base Layer Support - This is defined as the protocols that are the base layer of encapsulation.
Extensibility - This is defined as a vase layer for having user defined applications.

The system can support the illustrative protocols/encapsulations listed in Table 155.

TABLE 155

Base Layer

Ether2
802.q VLAN
LLC
SNAP
VSNAP
ISL
Network Layer

IPv4
IPv4 over IPv4
IPX
IPX over IPv4

Table 156 sets forth several exemplary Performance Monitoring and Expert protocols (TPM and APM protocol support also included) that can be supported by the system.

TABLE 156

Transport layer

TCP
UDP
SPX
Session Layer
Internet Application Protocol Group

DNS
DHCP

TABLE 156-continued

FTP
FTP Passive
HTTP
IMAP v2,v3,v4
LDAP
NNTP
POP2/POP3
SMTP
SNMP
TELNET
TFTP
Microsoft Applications Protocol Support MS RPC
MS-Exchange
MS-SNA Server
MS-System Management Server
MS-Message Queue Server
MS-Terminal Server
SMB
WINS
Any other Protocol/Application that is used for
a Microsoft Solution (excluding MS SQLServer)
Lotus Notes Protocol Support
UNIX Application Support Mount
Sun NFS
NIS
PortMapper
SunRPC
Any other UNIX Application that would be
applicable to bringing a system up
Database Application Support Microsoft ODBC over Oracle TNS
Microsoft OLE Over Oracle TNS
Microsoft SQL Monitor
Microsoft SQL Server
Oracle Forms over Oracle TNS
Oracle SQL Plus over Oracle TNS
Oracle SQL Net
Oracle TNS
PeopleSoft over Oracle TNS
SAP R/3 Database over Oracle TNS
SAP R/3 Service Manager
SAP R/3 Application Gateway
Sybase Adaptive SQL Anywhere
Sybase jConnect/JDBC
Sybase PowerBuilder
Sybase Tunneled TDS
Sybase Web.SQL
JDBC ODBC-Bridge
IBM DB2
IBM DB2 JDBC
Ingres
Gupta SQLbase
Gupta SQLbase JDBC
HTTP based Database (MIME Type)

sybase-web-sql
sybase-tunneled-tds
Jdbc
Odbc-bridge
Sybase-jdbc
Gupta-jdbc
Ibm-jdbc The system can also support HTTP MIME types for deep classification.

Table 157 below lists several additional protocols for RMON 2 that can be supported by the system.

TABLE 157

SNA
America On-Line
Finger
Gopher
UUCP
HTTP over SSL
SMTP over SSL
NNTP over SSL
Shell over SSL
LDAP over SSL
FTP over SSL
TELNET over SSL
IMAP over SSL
IRC over SSL
POP3 over SSL
3210 Mapper
CVS Source Control
DB Session Manager
OpenWindows
PcNFS
RJE Mapper
RSTAT
X Windows
Yellow Pages
Talk
Ntalk
IRC
IChat
IVisit
ThePlace
GRE
L2TP
PPTP
Citrix
PCAnywhere
Timbuktu
IPSec
CU-See Me
FreeTel
Net2Phone
RealAudio
Streamworks
VDOLive
QuickTime
VivoActive
Shockwave
CosmoPlayer (VRML)
MS-Media
T.120
H.323/H.245/Q.931
H.323/H.245/Q.931 Gatekeeper
RTSP
RTP/RTCP (H.323 streams)
RTP/RTCP (RTSP streams)

System Timing

The system Timing Interface (ETI) preferably includes a female BNC-style 50-ohm connector for the time-code input, and a high-density DB26-female connector for the secondary time-code input and associated time standard signals.

Illustrative design parameters for the Timing Interface are provided in Table 158 below.

TABLE 158

The ETI can support Modulated IRIG-A, B code type inputs.
The ETI may support 250 mV to 10V pk-to-pk code input amplitudes.
The ETI may provide greater than 10K ohm of code input impedance.
The ETI may provide 1 u-s of code sync accuracy.
The ETI may provide 100 n-s of 1PPS input sync accuracy.

TABLE 158-continued

The ETI may provide TTL-level positive edge response on the 1 PPS input.

Backup and Restore

System

The system may restrict all backup and restore operations to Administrative Level 1 users.

User Configuration Data

The system can allow users to backup configuration data from the primary memory to a secondary memory located on the Application Server. The user can specify the secondary memory name. The system may also allow users to back up configuration data from a secondary memory located on the Application Server to a remote location. The user can specify the backup file name, backup server name, and secondary memory name.

The system can allow users to restore configuration data from a remote location to a secondary memory located on the Application Server. The user can specify the backup file name and secondary memory name.

Prior to restoration of configuration data from a remote location to the secondary memory located on the Application Server the system may verify that the node ID for the backup data matches the target node ID.

The system may allow users to switch primary and secondary memories i.e. the secondary memory becomes the primary and vice versa. The user can specify the secondary memory name.

The system can also allow users to view primary/secondary memory properties. The attributes set forth in Table 159 below can be displayed.

TABLE 159

| Administrative state. | Availability status. |
|---|---|
| Alarm status. | Date installed. |
| File date. | Last backup time. |
| File location. | Last restore source. |
| File size. | Last restore time. |
| File type. | Operational state. |
| Last backup destination. | Software Id. |
| | Version. |

The system allows users to change the name assigned to a secondary memory on the node.

Upgradeability

System

The system upgrade procedure preferably does not require reentry of system database information (e.g. user security, configurations, modules, etc.) by the user. The system upgrade can be fully automated and menu-driven. The system preferably uses secure communications when downloading files from the network. Ideally, the system is capable of upgrading all software within the system remotely. Further, the system can upgrade all software within the system locally, i.e., through a media that is local to the node. i.e. a CD-ROM. The system can report the status of the software download from a remote location and local to the Node.

The system can allow users to download a set of executable programs from a remote location to the node. This executable may contain Media Module/Application Server firmware, configuration data and applications. The user can specify the node name and software generic name. Note: A set of executable programs is commonly referred to as a software generic. A software generic can have the following states: delivered, installed, executing. The system allows users to install a software generic on the node as well as activate (execute) a software generic. The system reports the status of all software generics present in the Node on demand. The status of a generic can be delivered, installed or active.

For each software generic present in the node, the system can retrieve values for the attributes listed in Table 160.

TABLE 160

| | |
|---|---|
| Administrative state. | Last backup destination. |
| Alarm status. | Last backup time. |
| Availability status. | Last restore source. |
| Checksum. | Last restore time. |
| Date delivered. | Operational state. |
| Date installed. | Procedural status. |
| Date of creation. | Software Id. |
| Date of last modification. | Usage state. |
| File location. | User label. |
| File size. | Version. |
| File type. | |

Preferably, the system can upgrade all system software (excluding Boot Code) at once with the following sequence:
1. Application Server First
2. Individual Media Modules Next Upon detection of failure during an upgrade, the system may provide a back out procedure that automatically and completely restores the system to its original condition prior to beginning the upgrade. The system can automatically revert back to the last known committed feature package if the system abnormally exits prior to the user executing a formal "commit" process. The system can also provide a "downgrade" process that allows a system with a committed software package to be downgraded to a prior release of software. Preferably, the software loads within the system are managed by a specific license key that only allow purchased software loads.

Application Server

The Application Server is capable of upgrading separate software modules on the application server. Newly upgraded software modules within the Application Server can be started immediately after download. Newly upgraded software modules within the Application Server can be started when the Application Server Services are re-started.

The complete Application Server software including the Operating System can be upgraded. Preferably, after an Application Server upgrade no configuration, user registry, statistics, logs, etc. are corrupted or lost.

When a new Application Server software load with a new Operating System version is loaded, the system may reset and execute the new Operating System version and Application Server Services. The Application Server can retrieve new software loads either through an attached CD-ROM or the network from a client station.

Media Module

The Media Module can be upgraded through the Application Server. Preferably, all Media Module components are upgraded at once. Software upgrades to the Media Module can be accomplished in the background. After the software has been loaded on the Media Module, the system executes the new load the next time the system does a hard reset.

The Media Module may always have a load in ROM that can always download a new software image. If the watchdog has fire two times in a row within five minutes, the system informs the Application Server and then executes out of ROM until it has received a new load. Preferably, each Media Module type (Gigabit Ethernet, OC3/12 ATM, etc.) has a separate load that can be stored on the Application Server. Ideally, the Media Module always executes the latest load that is stored on the Application Server.

Testability

Testability can be described as the ease with which the functionality of a system or a component of a system can be determined to a desired degree of accuracy. The compliance of a product performance "to the specification" extends throughout the product lifecycle from concept to design, manufacture and service. The system may be designed in a manner that facilitates testability. The system can reference the design for testability criterion presented in the Testability Guidelines Standard TP-101B (SMTA Testability Committee).

Ideally, the system conforms to general industry-recognized Design for Testability (DFT) practices including but not limited to the tests set forth in Table 161.

TABLE 161

In-circuit test (ICT) provisions
Built-in Self Test (BIST) capabilities
Diagnostic test support for field repairs
Boundary scan test support for high pin count devices
Functional test support The system can support the use of on-board programming of flash memory devices and isolation of the microprocessor subsystems during ICT procedures. The system may also allow the control of all clock and timing sources during ICT procedures. The system can terminate unused component input pins through the use of pull-up or pull-down resistors.

While various embodiments have been described above, it should be understood that they have been presented by way of example only, and not limitation. For example, any of the network elements may employ any of the desired functionality set forth hereinabove. Further, any type of heuristic can be used in identifying suspicious content. Further, the list of techniques for releasing quarantined data should not be considered exhaustive. Thus, the breadth and scope of a preferred embodiment should not be limited by any of the above-described exemplary embodiments, but should be defined only in accordance with the following claims and their equivalents.

What is claimed is:

1. A probe apparatus for application monitoring comprising:
   (a) a data collection module for collecting data from a network segment;
   (b) a flow processor coupled to the data collection module for classifying the collected data into a plurality of flows;
   (c) a capture system coupled to the flow processor for filtering and buffering the collected data based on the collected data and the flow corresponding to the collected data, the capture system comprising a plurality of buffers allocated to the collected data, the capture system reallocating buffers if a number of priority flows changes; and
   (d) a main processor for processing the filtered data based on the collected data and the flow corresponding to the filtered data;

wherein the data collection module prepends the data with descriptor information, wherein the descriptor information is used by the capture system to filter the collected data;

wherein the capture system includes a capture buffer and a focus buffer, wherein the capture system filters the collected data stored in the capture buffer, wherein the filtered data is sent to the focus buffer;

wherein the capture system captures the collected data in the capture buffer in at least one of a fill and stop mode, a wrap mode, a priority queuing mode and a non-priority queuing mode;

wherein in priority queuing mode the capture buffer is segmented into priority and non-priority queues, wherein the buffer space for each queue varies dynamically based on the arrival of data that meets priority criteria; and wherein buffers are reallocated to the priority queue from the non-priority queue as the number of priority flows increases.

2. The probe apparatus as recited in claim 1, wherein buffers are reallocated to the non-priority queue from the priority queue as the number of priority flows decreases.

3. The probe apparatus as recited in claim 1, wherein the capture system selectively discards flows from the priority queue based on predetermined criteria.

4. The probe apparatus as recited in claim 1, wherein the main processor identifies a flow as being important, wherein the flow processor uses the identification as criteria for forwarding additional data from the identified flow to the main processor.

5. The probe apparatus as recited in claim 1, wherein at least a portion of the probe apparatus is implemented on a Field Programmable Gate Array (FPGA).

6. The probe apparatus as recited in claim 5, wherein the portion of the probe apparatus implemented on the FPGA includes dedicated FPGA engines for capture and filtering of the data.

7. A method for application monitoring, comprising:
(a) collecting data from a network segment;
(b) classifying the collected data into a plurality of flows;
(c) prepending the data with descriptor information wherein the descriptor information is used to filter the collected data;
(d) filtering and buffering the collected data based on the collected data and the flow corresponding to the collected data, the buffering being allocated to the collected data;
(e) storing the collected data in a capture buffer, filtering the collected data stored in the capture buffer and sending the filtered data to a focus buffer;
(f) capturing the collected data in the capture buffer in a priority queuing mode;
(g) segmenting the capture buffer into priority and non-priority queues in the priority queuing mode, wherein buffer space for each queue varies dynamically based on the arrival of data that meets priority criteria;
(h) reallocating buffers to the priority queue from the non-priority queue as the number of priority flows increases; and
(i) processing the filtered data based on the collected data and the flow corresponding to the collected data.

8. The method as recited in claim 7, further comprising reallocating buffers to the non-priority queue from the priority queue as the number of priority flows decreases.

9. The method as recited in claim 7, wherein the capture system selectively discards flows from the priority queue based on predetermined criteria.

10. The method as recited in claim 7, further comprising identifying a flow of data as being important, and using the identification as criteria for forwarding additional data from the identified flow for processing.

11. A probe apparatus for application monitoring, comprising:
(a) a data collection module for collecting data from a network segment;
(b) a flow processor coupled to the data collection module for classifying the collected data into a plurality of flows;
(c) a capture system coupled to the flow processor for filtering and buffering the collected data based on the collected data and the flow corresponding to the collected data; and
(d) a main processor for processing the filtered data based on the collected data and the flow corresponding to the collected data;
(e) wherein the data collection module prepends the data with descriptor information, wherein the descriptor information is used by the capture system to filter the collected data;
(f) wherein the capture system includes a capture buffer and a focus buffer, wherein the capture system filters the collected data stored in the capture buffer, wherein the filtered data is sent to the focus buffer;
(g) wherein the capture system captures the collected data in the capture buffer in at least one of a fill and stop mode, a wrap mode, a priority queuing mode, and a non-priority queuing mode;
(h) wherein in priority queuing mode the capture buffer is segmented into priority and non-priority queues, wherein the buffer space for each queue varies dynamically based on the arrival of data that meets priority criteria;
(i) wherein buffers are reallocated to the priority queue from the non-priority queue as the number of priority flows increases;
(j) wherein buffers are reallocated to the non-priority queue from the priority queue as the number of priority flows decreases;
(k) wherein the capture system selectively discards flows from the priority queue based on predetermined criteria including at least one of an amount of priority data exceeding a processing capability of the system, user specifications, and the flow matching a randomly selected identifier;
(l) wherein the main processor identifies a flow as being important, wherein the flow processor uses the identification as criteria for forwarding additional data from the identified flow to the main processor;
(m) wherein at least a portion of the probe apparatus is implemented on a Field Programmable Gate Array (FPGA);
(n) wherein the portion of the probe apparatus implemented on the FPGA includes dedicated FPGA engines for capture and filtering of the data.

* * * * *

UNITED STATES PATENT AND TRADEMARK OFFICE
CERTIFICATE OF CORRECTION

PATENT NO.         : 7,299,277 B1
APPLICATION NO. : 10/045820
DATED                 : November 20, 2007
INVENTOR(S)       : Mike Moran, Tauras Liubinskas and Jack Goral It is certified that error appears in the above-identified patent and that said Letters Patent is hereby corrected as shown below:

Title Page, Insert Item (60) Related U.S. Application Data:

--Continuation of Ser. No. 10/043,501, Jan. 10, 2002, pending--

Signed and Sealed this

Fifteenth Day of April, 2008

JON W. DUDAS
*Director of the United States Patent and Trademark Office*